US008428461B2

(12) United States Patent
Boduch et al.

(10) Patent No.: US 8,428,461 B2
(45) Date of Patent: *Apr. 23, 2013

(54) APPARATUS FOR MANAGING AN OPTICAL SIGNAL

(75) Inventors: Mark Boduch, Geneva, IL (US); Kimon Papakos, Chicago, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1039 days.

This patent is subject to a terminal disclaimer.

(21) Appl. No.: 11/776,994

(22) Filed: Jul. 12, 2007

(65) Prior Publication Data

US 2008/0008474 A1      Jan. 10, 2008

Related U.S. Application Data

(63) Continuation-in-part of application No. 11/319,338, filed on Dec. 27, 2005, now Pat. No. 7,630,634, and a continuation-in-part of application No. 11/697,513, filed on Apr. 6, 2007, and a continuation-in-part of application No. 11/697,527, filed on Apr. 6, 2007.

(60) Provisional application No. 60/692,994, filed on Jun. 22, 2005, provisional application No. 60/830,216, filed on Jul. 12, 2006.

(51) Int. Cl.
*H04J 14/02*      (2006.01)

(52) U.S. Cl.
USPC .............................................. 398/83; 398/68

(58) Field of Classification Search ..................... 398/83
See application file for complete search history.

(56) References Cited

U.S. PATENT DOCUMENTS

| 4,903,338 | A | * | 2/1990 | Funke ........................... 398/173 |
| 5,500,756 | A | | 3/1996 | Tsushima et al. ............. 398/181 |

(Continued)

FOREIGN PATENT DOCUMENTS

| EP | 1 202 595 | 5/2002 |
| EP | 1 434 374 | 6/2004 |

(Continued)

OTHER PUBLICATIONS

Earnshaw et al, "Planar Lightwave Circuit Based Reconfigurable Optical Add-Drop Multiplexer Architectures and Reusable Subsystem Module", Mar./Apr. 2005, IEEE Journal of Selected Topics in Quantum Electronics, vol. 11, No. 2, pp. 313-322.*

(Continued)

*Primary Examiner* — Nathan Curs
*Assistant Examiner* — Tanya Ngo
(74) *Attorney, Agent, or Firm* — Fitzpatrick, Cella, Harper & Scinto

(57) ABSTRACT

An apparatus for managing an optical signal includes a system optics card including an add filter, a drop filter, electrical backplane connector, and a mechanical front panel including express input and output ports providing channels to other system optics cards. The card transports information over a first optical transport link and receives information over a second optical transport link. The card identifies at least one network channel on the second optical transport link destined for a client device. The drop filter delivers the identified network channel to the optical converter card for delivery to the client device. The add filter receives client channels from the optical converter card generated by the client device. The card also transports the client channels of the client device over the first optical transport link. The electrical backplane connector is connectable to a chassis for housing the system optics cards and other system optics cards and/or other optics cards.

35 Claims, 31 Drawing Sheets

U.S. PATENT DOCUMENTS

| | | | | |
|---|---|---|---|---|
| 5,864,414 | A | 1/1999 | Barnsley et al. | 398/71 |
| 5,940,197 | A * | 8/1999 | Ryu | 398/83 |
| 6,466,348 | B1 * | 10/2002 | Izumi | 398/177 |
| 6,525,852 | B1 * | 2/2003 | Egnell | 398/83 |
| 6,535,309 | B1 * | 3/2003 | Terahara | 398/79 |
| 6,594,046 | B1 * | 7/2003 | Nishino | 359/239 |
| 6,606,427 | B1 * | 8/2003 | Graves et al. | 385/17 |
| 6,822,860 | B2 * | 11/2004 | Owens et al. | 361/690 |
| 6,868,201 | B1 * | 3/2005 | Johnson et al. | 385/24 |
| 6,999,677 | B2 * | 2/2006 | Graves et al. | 398/5 |
| 7,133,616 | B2 * | 11/2006 | Caroli | 398/83 |
| 7,155,124 | B2 * | 12/2006 | Peddanarappagari et al. | 398/37 |
| 7,184,666 | B1 * | 2/2007 | Li et al. | 398/83 |
| 7,236,704 | B1 * | 6/2007 | Cao | 398/83 |
| 7,292,786 | B1 * | 11/2007 | Barbarossa et al. | 398/83 |
| 7,630,634 | B1 * | 12/2009 | Boduch | 398/30 |
| 7,751,714 | B2 * | 7/2010 | Zhong et al. | 398/83 |
| 7,781,714 | B2 * | 8/2010 | Lee et al. | 250/208.1 |
| 8,089,683 | B2 * | 1/2012 | Holmes | 359/279 |
| 8,320,759 | B2 * | 11/2012 | Boduch | 398/48 |
| 2001/0030797 | A1 * | 10/2001 | Kosaka et al. | 359/337.5 |
| 2002/0021862 | A1 * | 2/2002 | Zhou et al. | 385/24 |
| 2002/0057477 | A1 | 5/2002 | Rocca et al. | 359/141 |
| 2002/0080440 | A1 * | 6/2002 | Li et al. | 359/110 |
| 2002/0093707 | A1 * | 7/2002 | Katagiri et al. | 359/124 |
| 2002/0097469 | A1 * | 7/2002 | Yee et al. | 359/154 |
| 2002/0101636 | A1 * | 8/2002 | Xiao et al. | 359/127 |
| 2002/0145779 | A1 * | 10/2002 | Strasser et al. | 359/124 |
| 2003/0002104 | A1 * | 1/2003 | Caroli et al. | 359/127 |
| 2003/0007209 | A1 * | 1/2003 | Liu et al. | 359/127 |
| 2003/0179741 | A1 * | 9/2003 | Goergen | 370/351 |
| 2004/0028407 | A1 | 2/2004 | Noheji | 398/59 |
| 2004/0033079 | A1 * | 2/2004 | Sheth et al. | 398/135 |
| 2004/0042795 | A1 * | 3/2004 | Doerr et al. | 398/83 |
| 2004/0076438 | A1 * | 4/2004 | Lee | 398/171 |
| 2004/0175179 | A1 * | 9/2004 | Xiao et al. | 398/83 |
| 2004/0184809 | A1 * | 9/2004 | Miyata et al. | 398/85 |
| 2004/0190901 | A1 * | 9/2004 | Fang | 398/59 |
| 2004/0247239 | A1 * | 12/2004 | Eldada | 385/27 |
| 2005/0047795 | A1 * | 3/2005 | Windover et al. | 398/164 |
| 2005/0078461 | A1 * | 4/2005 | Dobbs et al. | 361/756 |
| 2005/0111504 | A1 * | 5/2005 | Nishikawa et al. | 372/38.01 |
| 2005/0195737 | A1 * | 9/2005 | Rajan et al. | 370/216 |
| 2005/0197720 | A1 * | 9/2005 | Morrison et al. | 700/2 |
| 2005/0281558 | A1 | 12/2005 | Wang et al. | 398/85 |
| 2006/0034610 | A1 * | 2/2006 | Akiyama et al. | 398/83 |
| 2006/0115210 | A1 * | 6/2006 | Nakagawa | 385/24 |
| 2006/0133804 | A1 | 6/2006 | Boduch et al. | 398/5 |
| 2006/0133807 | A1 * | 6/2006 | Jenkins et al. | 398/59 |
| 2006/0177225 | A1 * | 8/2006 | Paraschis et al. | 398/87 |
| 2007/0237524 | A1 * | 10/2007 | Gerstel et al. | 398/83 |
| 2008/0013953 | A1 | 1/2008 | Boduch et al. | 398/83 |
| 2008/0013954 | A1 | 1/2008 | Boduch et al. | 398/83 |
| 2009/0148166 | A1 * | 6/2009 | Akiyama et al. | 398/83 |

FOREIGN PATENT DOCUMENTS

| | | |
|---|---|---|
| EP | 1 628 424 | 2/2006 |
| EP | 1 628 424 A2 * | 2/2006 |

OTHER PUBLICATIONS

Christophe Chauvet, European Search Report in Application No. 07 796 705.7-2415, Mar. 5, 2011, p. 3-5.*
PCT International Search Report and Written Opinion of International Search Authority in PCT/US2007/015541 issued Jun. 5, 2008.
European Search Report dated Nov. 29, 2010, in European Application No. 07 796 705.7-2415.
European Office Action dated Nov. 29, 2010, issued in European Application No. 07 796 705.7 2415.

* cited by examiner

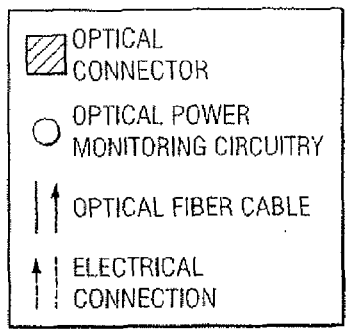
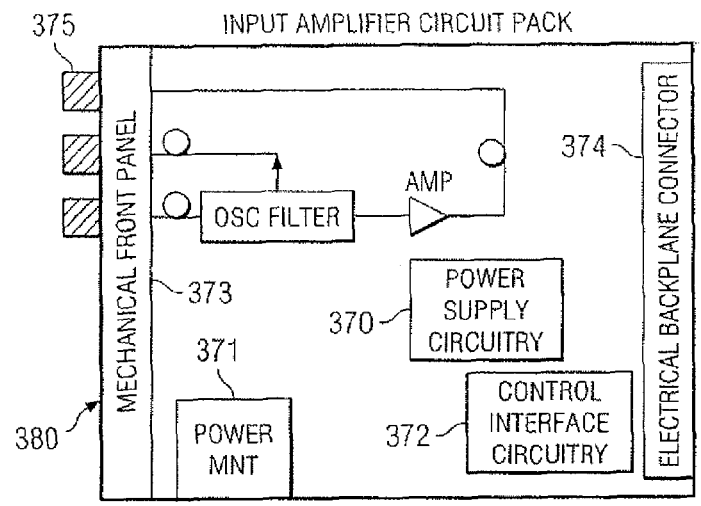
*FIG. 3A*
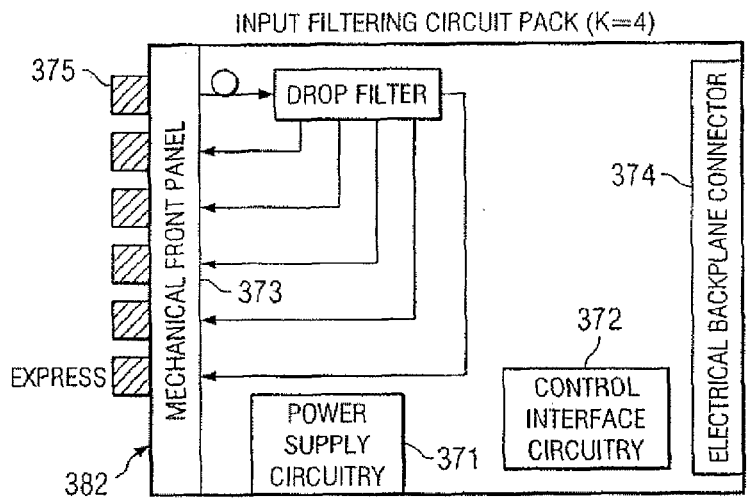
*FIG. 3B*
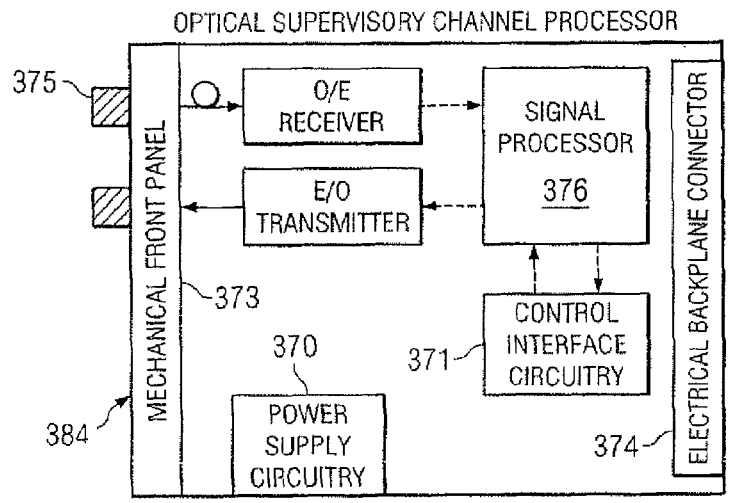
*FIG. 3C*

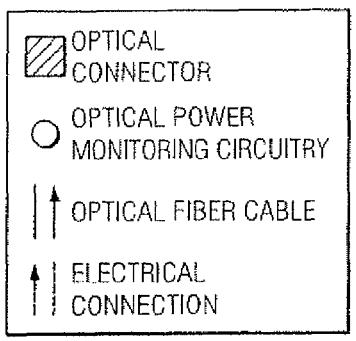
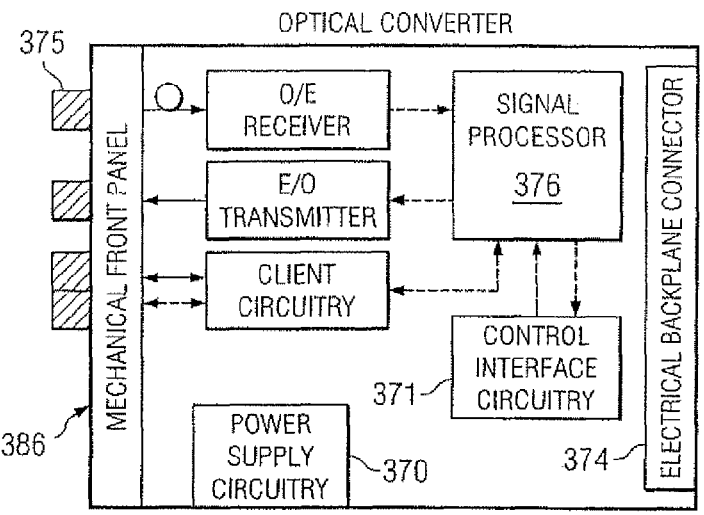
FIG. 3D
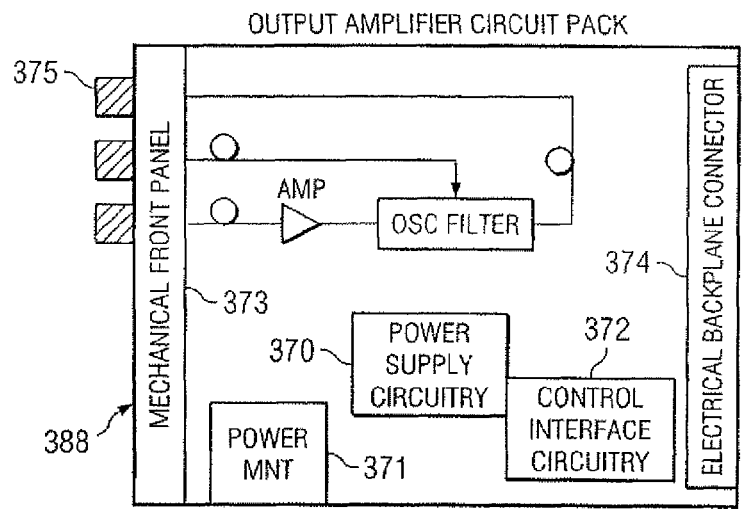
FIG. 3E
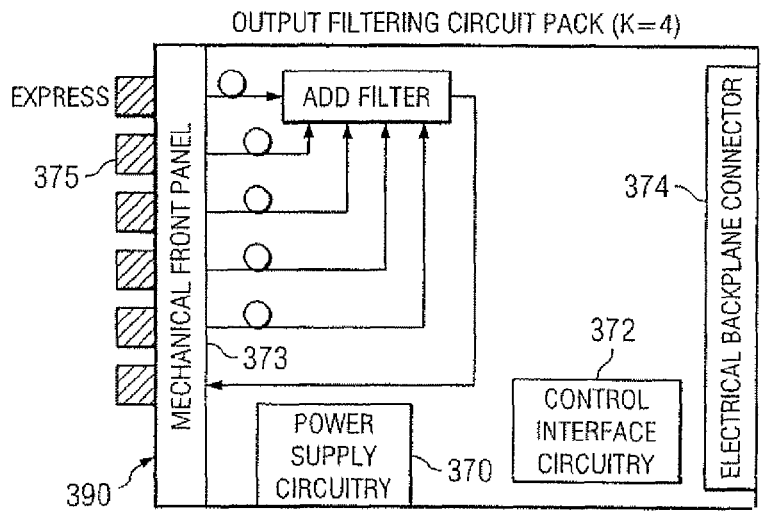
FIG. 3F

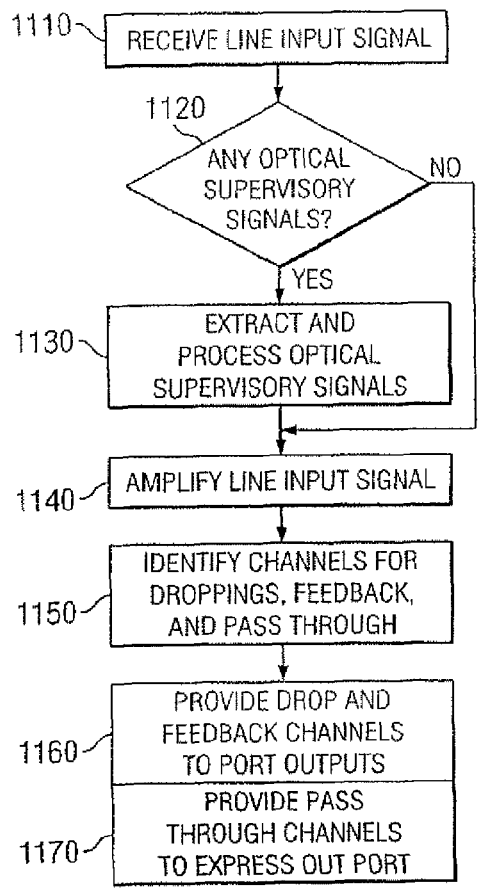
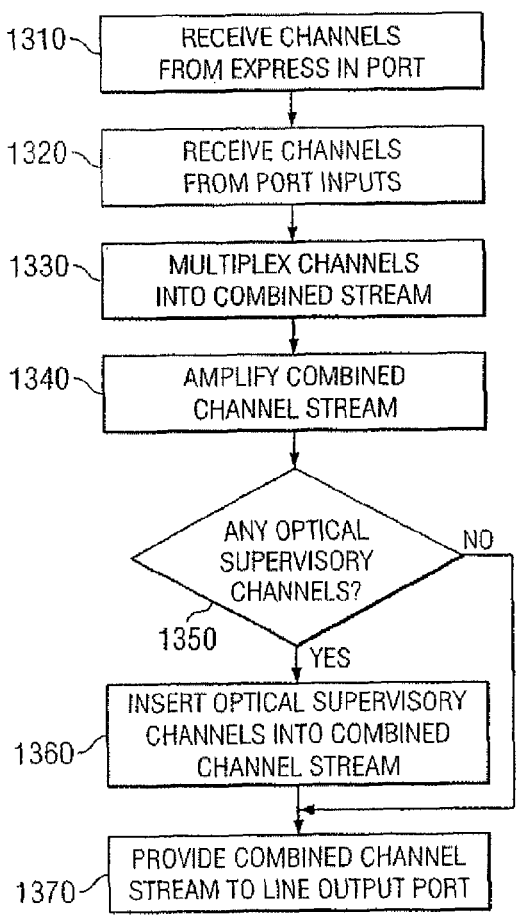

Light Distributor (Type 3)

1 to $k$ Optical Switch

Light Combiner (Type 3)

$k$ to 1 Optical Switch

Add Filter 1
(Optical Power Adder)

*VOAs are Optional*

Drop Filter 1
(Wavelength Router Type 1A)

VOA = Variable Optical Attenuator

APPARATUS FOR MANAGING AN OPTICAL SIGNAL

RELATED APPLICATIONS

This application is a continuation-in-part of U.S. patent application Ser. No. 11/319,338 filed Dec. 27, 2005, pending, which claims the benefit of U.S. Provisional Application Ser. No. 60/692,994, filed Jun. 22, 2005. In addition, this application is a continuation-in-part of U.S. patent application Ser. Nos. 11/697,527 and 11/697,513, both filed on filed Apr. 6, 2007, both pending, and both of which claim the benefit of U.S. Provisional Application Ser. No. 60/830,216, filed Jul. 12, 2006.

INCORPORATION BY REFERENCE

The entire disclosures of U.S. patent application Ser. Nos. 11/697,527, 11/697,513, and 11/319,338, filed respectively on Apr. 6, 2007, Apr. 6, 2007, and Dec. 27, 2005 are hereby incorporated by reference thereto.

TECHNICAL FIELD OF THE INVENTION

This invention relates in general to the field of wavelength division multiplexing and more particularly to a method and apparatus for managing an optical signal.

BACKGROUND OF THE INVENTION

Wavelength Division Multiplexing (WDM) and Dense Wavelength Division Multiplexing (DWDM) are technologies that enable a multitude of optical wavelengths of differing frequencies to be transported over a single optical fiber. A DWDM network is constructed by interconnecting multiple DWDM network elements. Each network element typically contains functions such as optical multiplexing equipment (filtering), optical de-multiplexing equipment (filtering), optical amplifiers, optical power monitors, optical supervisory channel processors, network element control processors, and optical converters. In existing DWDM network elements, each individual function within the network element was placed on individual circuit packs. Each circuit pack then had to be plugged into a common backplane which supplied power and control to each circuit pack. In order to construct a working DWDM network element, many of the circuit packs had to be further interconnected with one another using optical cables which often attached to the front panels associated with the circuit packs.

In addition to the specific functional circuitry on each circuit pack, each circuit pack contained circuitry and mechanical structures that were common to (i.e., repeated on) each circuit pack. For instance, each circuit pack would commonly contain a power supply circuit, a control or communication circuit, an electrical backplane connector, a mechanical front panel, one or more optical front panel connectors (used to interconnect optical oriented circuit packs to one another), and optical power monitoring circuitry.

Furthermore, since the surface area on any given circuit pack front panel was limited, some circuit packs had to contain high-density parallel optical connectors in order to accommodate the high number of interconnects associated with a given circuit pack. The parallel optical connectors required the use of complex adaptation cables (break-out cables), or external optical patch panels in order to convert the high-density optical connections to individual connections usable by other optical circuit packs.

The combination of the plurality of differing circuit packs, the plurality of optical connections between circuit packs, and the plurality of optical adaptation cables and optical patch panels, resulted in a DWDM network element that was difficult and error prone to install. Furthermore, optical power monitoring circuitry was required throughout the system in order to verify that the optical interconnect cables (interconnecting the various functional circuit packs) were connected to their proper points within the system.

Therefore, it can be seen that in order to lower the cost and simplify the installation of a DWDM network element, what is needed is a method of constructing a DWDM network element that eliminates much of the repeated common circuitry and mechanics on circuit packs, and eliminates many of the external optical interconnect cables, adaptation cables, and optical patch panels.

SUMMARY OF THE INVENTION

From the foregoing, it may be appreciated by those skilled in the art that a need has arisen for a simpler and more cost effective node configuration while providing a flexible design implementation. In accordance with the present invention, a method and apparatus for managing an optical signal are provided that substantially eliminate or greatly reduce disadvantages and problems associated with conventional optical node configurations and designs.

According to an embodiment of the present invention, there is provided an apparatus for managing an optical signal that includes a node having a first system optics card that provides channels to a first optical transport link and receives channels from a second optical transport link. The first system optics card may provide certain channels received from the second optical transport link to an optical converter card associated with a particular client device. The first system optics card may provide certain channels received from the second optical transport link to an optical converter card for feedback onto the first optical transport link. The first system optics card may provide certain channels received from the second optical transport link to one or more other system optics cards within the node. The node may contain one or more other system optics cards that interface with a plurality of client devices through a plurality of optical converter cards so that the node can provide multiple degrees of communication capability.

According to another example embodiment, there is provided an apparatus for managing an optical signal, comprising an optical converter card configured to provide information to and receive information from a client device, and a system optics card. The system optics card comprises a drop filter, at least one express output port configured to provide channels to a plurality of other system optics cards, and at least one express input port configured to receive channels from a plurality of other system optics cards. The system optics card is configured to transport information over a first optical transport link. The system optics card is also configured to receive information over a second optical transport link. The system optics card is further configured to identify at least one network channel on the second optical transport link destined for the client device. In addition, the drop filter is configured to deliver the identified network channel to the optical converter card for delivery to the client device. Also, the system optics card is configured to receive client channels from the optical converter card generated by the client device. And, the system optics card is configured to transport the client channels of the client device over the first optical transport link.

According to another example embodiment, there is provided an apparatus for managing an optical signal. The apparatus includes an optical converter card configured to provide information to and receive information from a client device, and a system optics card. The system optics card comprises an add filter, at least one express output port configured to provide channels to a plurality of other system optics cards, and at least one express input port configured to receive channels from a plurality of other system optics cards. The system optics card is configured to transport information over a first optical transport link. In addition, the system optics card is configured to receive information over a second optical transport link, and the system optics card is configured to identify at least one network channel on the second optical transport link destined for the client device. Further, the system optics card is configured to provide the identified network channel to the optical converter card for delivery to the client device. Also, the add filter is configured to receive client channels from the optical converter card generated by the client device. And, the system optics card is configured to transport the client channels of the client device received by the add filter over the first optical transport link.

According to still another example embodiment, there is provided an apparatus for managing an optical signal. The apparatus comprises an optical converter card configured to provide information to and receive information from a client device, and a system optics card. The card comprises a mechanical front panel and an electrical backplane connector. The mechanical front panel comprises at least one express output port configured to provide channels signals to a plurality of other system optics cards, and at least one express input port configured to receive channels from a plurality of other system optics cards. The electrical backplane connector connectable to a chassis for housing the system optics cards and other system optics cards and/or other optics cards. The system optics card is configured to transport information over a first optical transport link. In addition, the system optics card is configured to receive information over a second optical transport link. Also, the system optics card is configured to identify at least one network channel on the second optical transport link destined for the client device. Further, the system optics card is configured to provide the identified network channel to the optical converter card for delivery to the client device. Moreover, the system optics card is configured to receive client channels from the optical converter card generated by the client device. And, the system optics card is configured to transport the client channels of the client device over the first optical transport link.

The present invention provides various technical advantages over conventional methods and apparatus for managing an optical signal. Some of these technical advantages are shown and described in the description of the present invention. Certain embodiments of the present invention may enjoy some, all, or none of these advantages. Other technical advantages may be readily apparent to those skilled in the art from the following figures, description, and claims.

BRIEF DESCRIPTION OF THE DRAWINGS

To provide a more complete understanding of the present invention and features and advantages thereof, reference is made to the following description of example embodiments of the present invention, taken in conjunction with the accompanying figures, wherein like reference numerals represent like parts, in which:

FIGS. 3A-3G illustrate an example implementation of the functional block diagram of the add/drop node;

FIG. 12 illustrates a process flow providing operation of a system optics card according to an example embodiment of the present invention;

FIG. 14 shows an example flow process outlining further operation of a system optics card according to an example embodiment of the present invention.

DETAILED DESCRIPTION OF THE INVENTION

Figure 1A:
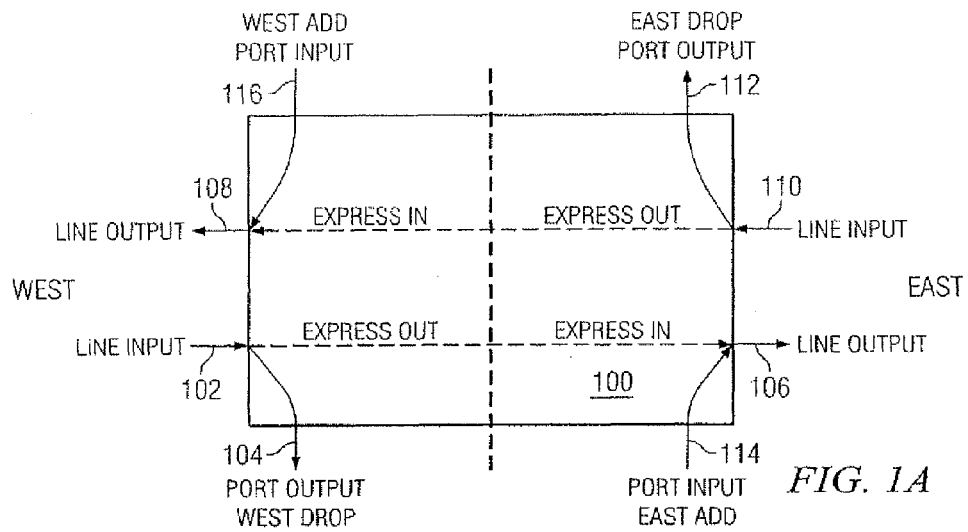
FIGS. 1A-1C illustrate add/drop nodes used in example embodiments of the present invention.
Figure 1B:
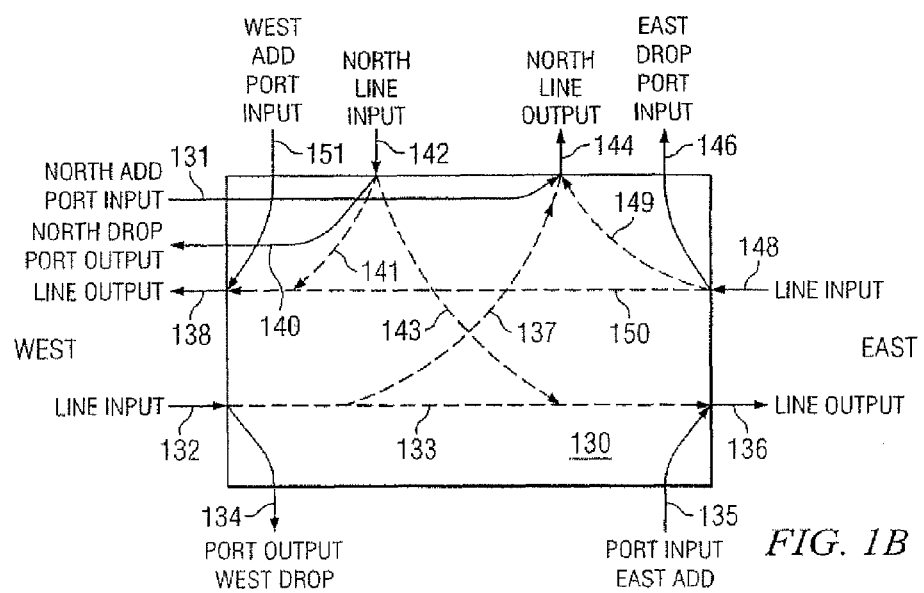
Figure 1C:
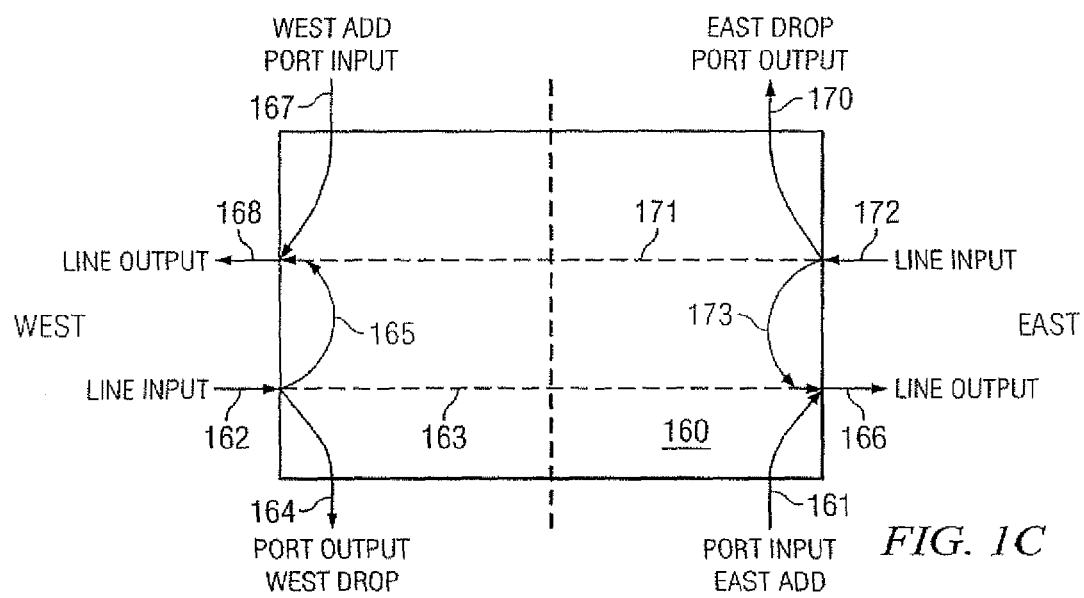

FIGS. 1A-1C illustrate example add/drop nodes 100, 130 and 160, respectively, for various embodiments of the present invention. In FIG. 1A, add/drop node 100 is an example of a 2-degree node, wherein channels making up a particular signal entering add/drop node 100 can exit add/drop node 100 in two directions. A West Line Input signal 102, transmitted from the West side, can enter add/drop node 100 and certain channels of West Line Input signal 102 can be dropped from add/drop node 100 to a client. A West Port Output line 104 indicates the dropped channels. Furthermore, certain channels of West Line Input signal 102 can be passed through add/drop node 100 toward the East side. Other channels can be added by a client to West line input signal 102 through a West Port Input line 114 for pass through to the East side. An East Line Output signal 106 indicates the passed-through channels. Similarly, an East Line Input signal 110, transmitted from the East side, can enter add/drop node 100. Certain channels of East Line Input signal 110 can be dropped at East Port Output line 112. Certain channels of East Line Input signal 110 can be passed through add/drop node 100 toward the West side as indicated by West Line Output signal 108. Other channels can be added by a client to East Line Input signal 110 through an East Port Input line 116. East and West line inputs and outputs may be provided by appropriate optical transport links.

In FIG. 1B, add/drop node 130 is an example 3-degree node, wherein channels making up a particular signal entering add/drop node 130 can exit add/drop node 130 in three directions. A West Line Input signal 132, transmitted from the West side, can enter add/drop node 130. Certain channels of West Line Input signal 132 can be dropped at a West Port Output line 134. Certain channels of West Line Input signal 132 to be passed through are provided to a West pass through line 133 to be combined with any other channels on a North pass through line 143 and a West Port Input line 135 to form an East Line Output signal 136 for a pass through path toward the East side. Furthermore, certain channels of West Line Input signal 132 to be passed through are provided to a West pass through line 137 to be combined with other channels of an East pass through line 149 and a North Port Input line 131 to form a North Line Output signal 144 for a pass through path toward the North side.

Transmitted from the East side, an East Line Input signal 148 can enter add/drop node 130. Certain channels of East Line Input signal 148 can be dropped at an East Port Output line 146. Certain channels of East Line Input signal 148 to be passed through are provided to an East pass through line 150 to be combined with any other channels on a North pass through line 141 and a West Port Input line 151 to form a West Line Output signal 138 for a pass through path toward the West side. Also, certain channels of East line input signal 148 to be passed through are provided to an East pass through line 149 to be combined with any other channels on West pass through line 137 and North Port Input line 131 to form North Line Output signal 144.

Transmitted from the North side, a North Line Input signal 142 can enter add/drop node 130. Certain channels of North Line Input signal 142 can be dropped at a North Port Output Line 140. Certain channels of North Line Input signal 142 to be passed through are provided to a North pass through line 143 to be combined with any other channels of West Pass through line 133 and West Port Input line 135 to form East Line Output signal 136 for a pass through path toward the East side. Furthermore, certain channels of North Line Input signal 142 to be passed through are provided on North pass through line 141 to be combined with any other channels on East pass through line 150 and East Port Input line 151 to form East Line Output signal 138 for a pass through toward the West side.

In FIG. 1C, add/drop node 160 is an example hybrid 3-degree node, wherein channels making up a particular signal entering add/drop node 160 can exit add/drop node 160 in three directions. A West Line Input signal 162, transmitted from the West side, can enter add/drop node 160. Certain channels of West Line Input signal 162 can be dropped at a West Port Output line 164. Certain channels of West Line Input signal 162 to be passed through are provided to a West pass through line 163 to be combined with any other channels on an East Port Input line 161 and an East feedback line 173 to form an East Line Output signal 166 for a pass through toward the East side. Furthermore, certain channels of West Line Input signal 162 may be provided to a West feedback line 165 to be combined with any other channels on an East pass through line 171 and a West Port Input line 167 to form West Line Output signal 168. In this manner, an optional feedback feature can be added to the configuration of any system at any node.

Transmitted from the East side, an East Line Input signal 172 can enter add/drop node 160. Certain channels of East Line Input signal 172 can be dropped at an East Port Output line 170. Certain channels of East Line Input signal 172 to be passed through are provided on East pass through line 171 to be combined with any other channels on West Port Input line 167 and West feedback line 165 to form West Line Output signal 168 for a pass through toward the West side. Furthermore, certain channels of East Line Input signal 172 may be provided to East feedback line 173 to be combined with any other channels on West pass through line 163 and East Port Input 161 to form East Line Output signal 166.

Figure 2A:
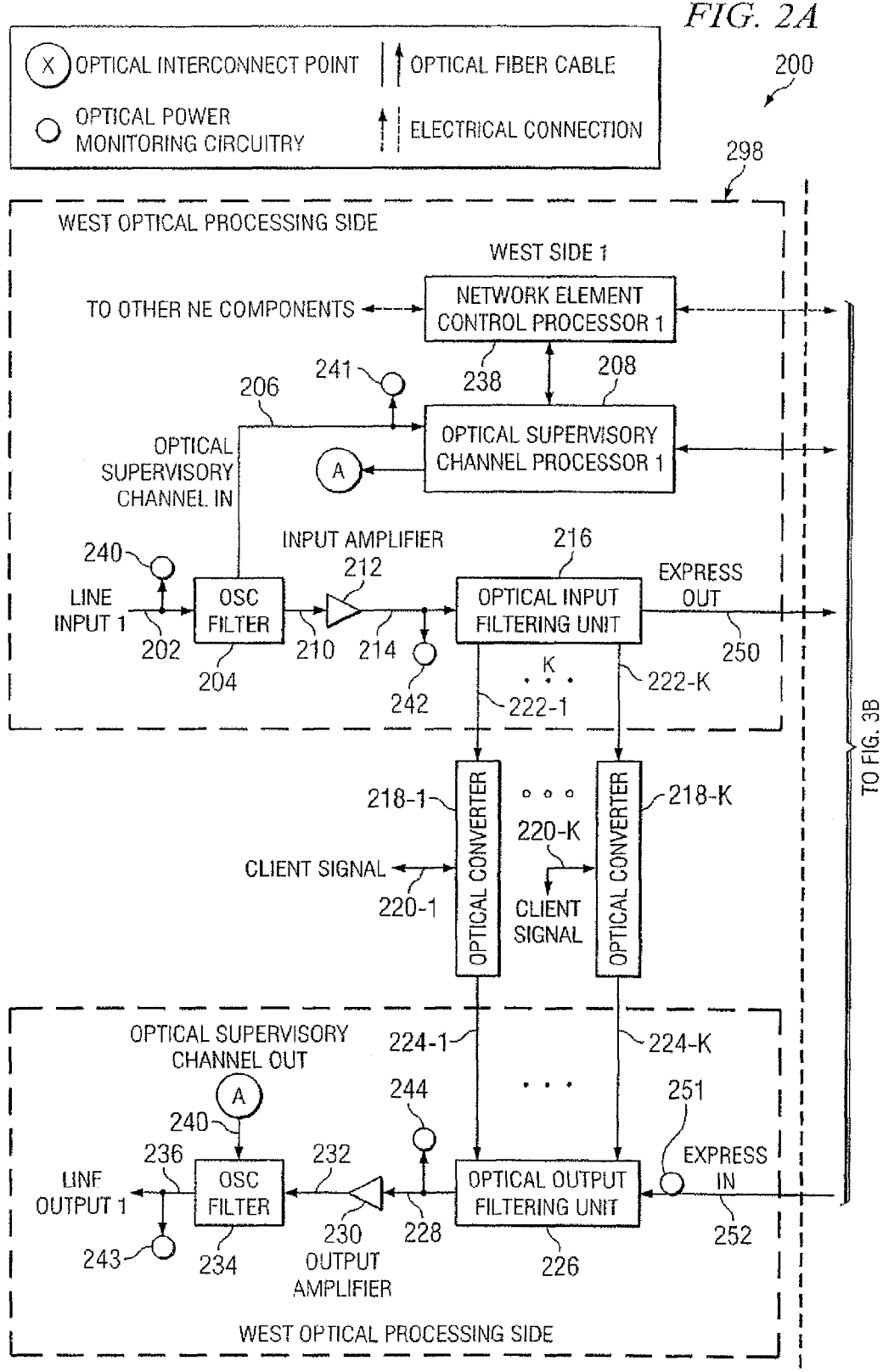
FIGS. 2A-2B illustrate a functional block diagram showing operation of an add/drop node in an example embodiment of the present invention.
Figure 2B:
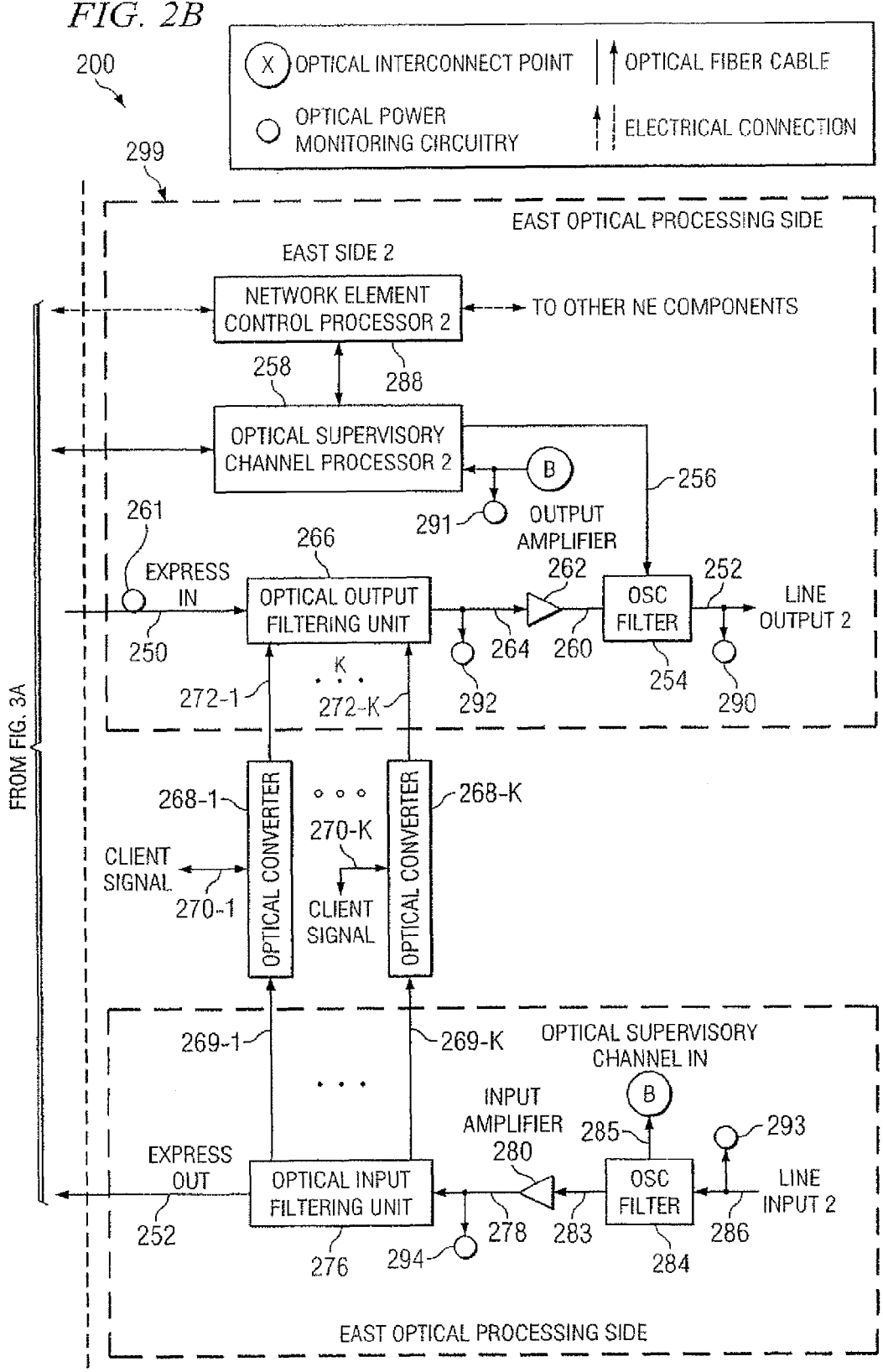

FIGS. 2A-2B show a functional block diagram of an example 2-degree add/drop node 200 which can be used to implement the functionality provided in the add/drop nodes of FIGS. 1A-1C. Add/drop node 200 can be divided into a West Side 298 and an East Side 299. The West side 298 can further be divided into a West optical processing side and a West group of optical converters 218-1 to 218-K. The East side 299 can further be divided into an East optical processing side and an East group of optical converters 268-1 to 268-K. The following describes methods used by add/drop node 200 for managing signals entering from West optical processing Side 298 and from East optical processing Side 299.

A West Line Input signal 202, received at West Side 298, can enter add/drop node 200 at a filter 204. One of the channels forming West Line Input signal 202 can be an optical supervisory channel. If an optical supervisory channel is present, filter 204 can filter the optical supervisory channel, indicated by line 206, from the other channels in West Line Input signal 202. The optical supervisory channel 206 can be forwarded to an optical supervisory channel processor 208 for further processing. The remaining channels, indicated by line 210, can be forwarded to an optical input amplifier 212 to be amplified by a predetermined amount of amplification. Optical input amplifier 212 can simultaneously amplify all channels input thereto. The amplified channels, indicated by line 214, can be transmitted to an optical input filtering unit 216. Optical input filtering unit 216 can be used to isolate individual channels. Individual channels can be (1) dropped from add/drop node 200 for transmission to a client, (2) combined with pass through channels from East Side 299 for optional feedback toward West side 298, (3) passed through to East Side 299 for combining with other channels, and/or (4) added for transport upon receipt from a client.

Certain channels from West Line Input signal 202 designated to be dropped for case (1) can be transmitted from optical input filtering unit 216 to individual optical converters 218-1 through 218-K over lines 222-1 to 222-K, where K is the total number of channels that can be converted corresponding to the number of clients being serviced at add/drop node 200. Also, certain channels from West Line Input signal 202 designated for optional feedback in West Side 298 for case (2) can be transmitted from optical input filtering unit 216 to individual optical converters 218-1 through 218-K over lines 222-1 to 222-K. At an optical converter 218-1, a channel from optical input filtering unit 216 can be converted to either a non-colored optical channel (e.g., a 1310 or 850 nm) or to an electrical channel or, in the opposite direction, a client input channel can be received from a client and converted to a colored optical signal (e.g., any of the wavelengths within the optical C-band) for adding to the stream for case (4). For case (1), a converted electrical channel can then be dropped to a client. For example, client channel 220-1, converted from optical converter 218-1, can be dropped from add/drop node 200. For case (4), client input channels received over lines 220-1 to 220-K to be added are provided by optical converters 218-1 to 218-K to corresponding lines 224-1 to 224-K for processing by an optical output filtering unit 226. Optical converters 218-1 to 218-K also provide the feedback channels to optical output filtering unit 226 for case (2). Optical output filtering unit 226 can multiplex converted channels provided by optical converters 218-1 to 218-K with pass through channels from East Side 299 on line 252 to form combined channel signal 228. Combined channel signal 228 can then be amplified by output amplifier 230 by a predetermined amount of amplification to form amplified channel signal 232. Amplified channel signal 232 can be transmitted to optical supervisory channel filter 234, where an optical supervisory channel signal 240 may be combined with amplified channel signal 232 to form West Line Output signal 236.

Channels from West Line Input signal 202 that are designated for pass through to East Side 299 in case (3) are transmitted to optical output filtering unit 266 over line 250. Optical output filtering unit 266 can multiplex channels on line 250 with other channels from optical line converters 268-1 to 268-K over lines 272-1 to 272-K. A combined channel signal 264 is transmitted from optical output filtering unit 266 to an output optical amplifier 262 for amplification by a predetermined amount of amplification. An amplified channel signal 260 is transmitted to an optical supervisory channel filter 254, where amplified channel signal 260 is combined with an output optical supervisory channel signal 256 to form East Line Output signal 252.

An East Line Input signal 286, received at East Side 299 enter add/drop node 200 at a filter 284. One of the channels forming East Line Input signal 286 can be an optical supervisory channel. If an optical supervisory channel is present, filter 284 can filter the optical supervisory channel, indicated by line 285, from the other channels in East Line Input signal 286. The optical supervisory channel 285 can be forwarded to an optical supervisory channel processor 258 for further processing. The remaining channels, indicated by line 283, can be forwarded to an optical input amplifier 280 to be amplified by a predetermined amount of amplification. Optical input amplifier 280 can simultaneously amplify all channels input thereto. The amplified channels, indicated by line 278, can be transmitted to an optical input filtering unit 276. Optical input filtering unit 276 can be used to isolate individual channels. The individual channels can be (1) dropped from add/drop node 200 for transmission to a client, (2) combined with pass through channels from West Side 298 for optional feedback toward East Side 299, (3) passed through to West Side 298 for combining with other channels, and/or (4) added for transport upon receipt from a client.

Certain channels from East Line Input signal 286 designated to be dropped for case (1) can be transmitted from optical input filtering unit 276 to individual optical converters 268-1 through 268-K over lines 269-1 to 269-K, where K is the total number of channels that can be converted corresponding to the number of clients being serviced at add/drop node 200. Also, certain channels from East Line Input signal 286 designated for optional feedback in East Side 299 for case (2) can be transmitted from optical input filtering unit 276 to individual optical converters 268-1 to 268-K over lines 269-1 to 269-K. At an optical converter 268-1, a channel from optical input filtering unit 276 can be converted to either a non-colored optical channel (e.g., a 1310 or 850 nm) or to an electrical channel or, in the opposite direction, a client input channel can be received from a client and converted to a colored optical signal for adding to the stream. For case (1), a converted electrical channel can then be dropped to a client. For example, client channel 270-1, converted from optical converter 268-1, can be dropped from add/drop node 200. For case (4), client input channels received over lines 270-1 to 270-K to be added are provided by optical converters 268-1 to 268-K to corresponding lines 272-1 to 272-K for processing by an optical output filtering unit 266. Optical converters 268-1 to 268-K also provide the feedback channels to optical output filtering unit 266. Optical output filtering unit 266 can multiplex converted channels provided by optical converters 268-1 to 268-K with pass through channels from West Side 298 on line 250 to form combined channel signal 264. Combined channel signal 264 can then be amplified by output amplifier 262 by a predetermined amount of amplification to form amplified channel signal 260. Amplified channel signal 260 can be transmitted to optical supervisory channel filter 254, where an optical supervisory channel signal 256 may be combined with amplified channel signal 260 to form East Line Output signal 252.

Channels from East Line Input signal 286 that are designated for pass through to West Side 298 in case (3) are transmitted to optical output filtering unit 226 over line 252. Optical output filtering unit 226 can multiplex channels on line 252 with other channels from optical line converters 218-1 to 218-K over lines 224-1 to 224-K. A combined channel signal 228 is transmitted from optical output filtering unit 226 to an output optical amplifier 230 for amplification by a predetermined amount of amplification. An amplified channel signal 232 is transmitted to an optical supervisory channel filter 234, where amplified channel signal 232 is combined with an output optical supervisory channel signal 240 to form West Line Output signal 236.

From FIGS. 2A-2B, it can be seen that there are two paths through add/drop node 200. One path (Path W-E) begins at West Line Input signal 202 and ends at East Line Output 252. The other path (Path E-W) begins at East Line Input signal 286 and ends at West Line Output signal 236. The signals in both paths pass through a similar set of components. Furthermore, in FIGS. 2A-2B there can be optical monitoring points associated with each path. For example, Path W-E has optical monitoring points at 240, 242, 261, 290, and 292. Path E-W has optical monitoring points at 243, 244, 251, 293 and 294. The optical monitoring points can be used to help set the optical gain of the signals passing through the associated amplifier, to power balance the individual optical channels on the line output, and to verify connectivity through the node.

In FIGS. 2A-2B, it can be seen that a great deal of component redundancy is present. For instance, there are two network element control processors (238, 288) controlling each of East Side 299 and West Side 298 components, two optical supervisory channel processors (208, 258) for control signal insertion and extraction, and two identical data-paths (Path W-E, Path E-W). This redundancy helps to transport data in the network in the presence of failures within the network. A network constructed in such a manner is often called a "fault tolerant" network.

Figure 3G:
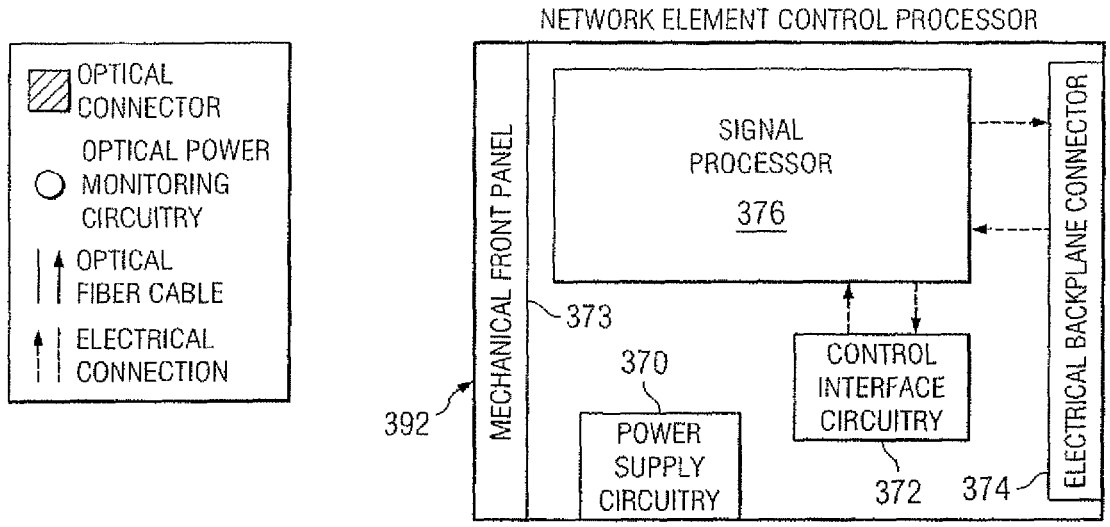

FIGS. 3A-3G show one implementation of the functional operation shown in FIGS. 2A-2B. Each function of FIGS. 2A-2B is placed on a separate individual circuit pack of FIGS. 3A-3G. FIG. 3A shows an input amplifier circuit pack 380 that implements the functionality of optical supervisory channel filter 204 and input amplifier 212 of FIG. 2A or optical supervisory channel filter 284 and input amplifier 280 of FIG. 2B. FIG. 3B shows an input filtering circuit pack 382 that implements the functionality of optical input filtering unit 226 of FIG. 2A and optical input filtering unit 276 of FIG. 2B. FIG. 3C shows an optical supervisory channel processor card 384 that implements the functionality of optical supervisory channel processor 208 of FIG. 2A or optical supervisory channel processor 258 of FIG. 2B. FIG. 3D shows an optical converter card 386 that implements the functionality of any of optical converters 218-1 to 218-L of FIG. 2A or any of optical converters 268-1 to 268-L of FIG. 2B. FIGURE 3E shows an output amplifier circuit pack 388 that implements the functionality of optical supervisory channel filter 234 and output amplifier 230 of FIG. 2A or optical supervisory channel filter 254 and output amplifier 262 of FIG. 2B. FIG. 3F shows an output filtering circuit pack 390 that implements the functionality of optical output filtering unit 226 of FIG. 2A or optical output filtering unit 266 of FIG. 2B. FIG. 3G shows a network element control card 392 that implements the functionality of network element control processor 238 of FIG. 2A or network element control processor 288 of FIG. 2B.

Each of the circuit packs of FIGS. 3A-3G include certain electrical, optical, and mechanical functions repeated in each circuit pack. For instance, repeated functions include a power supply circuit 370, a power monitor circuit 371, and control interface circuits 372. Also, each circuit pack includes a front panel 373, electrical backplane connectors 374, and optical connectors 375. Separate signal processors 376 may also be provided on individual circuit packs.

Figure 4:
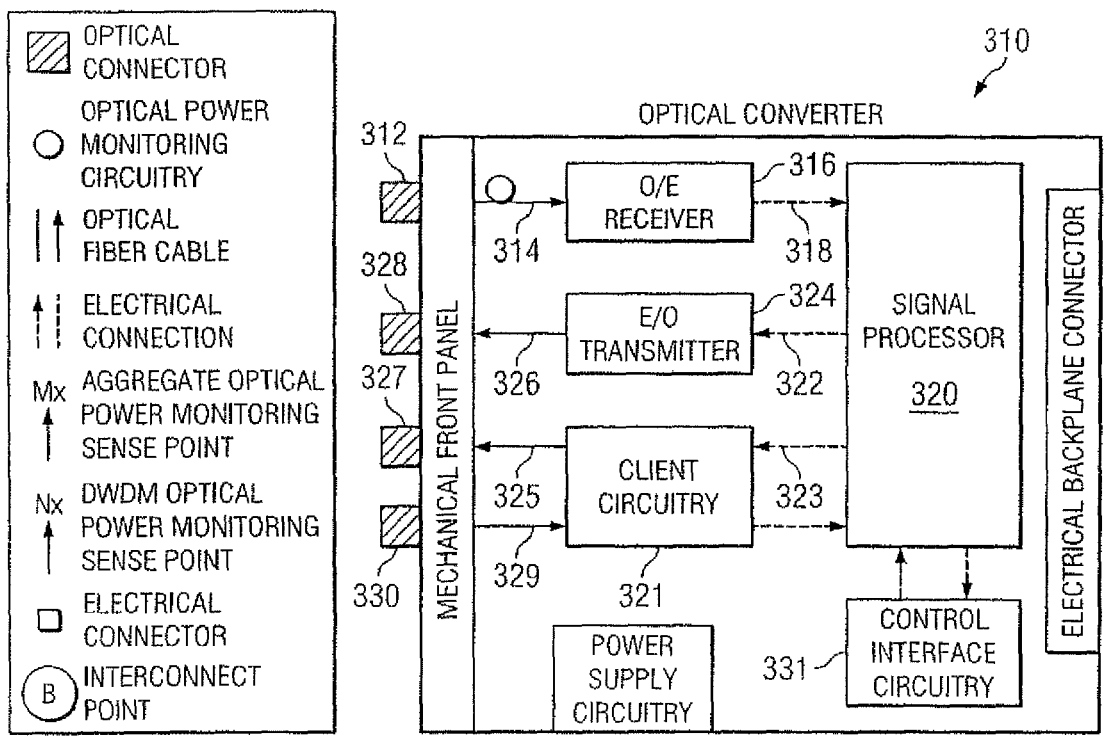
FIG. 4 illustrates an optical converter card for an add/drop node used in an example embodiment of the present invention.

FIG. 4 shows an example of an optical converter card 310 according to an embodiment of the present invention. Optical converter card 310 implements the functionalities of optical converters 218-1 to 218-K and 268-1 to 268-K of FIGS. 2A-2B. The key depicted in FIG. 4 is common to other figures provided and described herein. Optical converter card 310 includes a system input port 312 for receiving signals from an appropriate one of lines 222-1 to 222-K and 269-1 to 269-K of FIGS. 2A-2B. Optical converter card 310 also includes a system output port 328 for providing signals to an appropriate one of lines 224-1 to 224-K and 272-1 to 272-K of FIGS. 2A-2B. An individual channel signal 314 transmitted to input port 312 can be converted by an optical/electrical receiver 316 to form an electrical channel signal 318. Electrical channel signal 318 can then be processed by signal processor 320 and forwarded to client circuitry 321 within optical converter card 310 as a processed drop signal 323. Client circuitry 321 generates a client drop signal 325 for transmission to a client over an appropriate one of lines 220-1 to 220-K and 270-1 to 270-K of FIGS. 2A-2B through a client output port 327.

Client add signals 329 received over the appropriate one of lines 220-1 to 220-K and 270-1 to 270-K of FIGS. 2A-2B at a client input port 330 are provided to client circuitry 321. Client circuitry 321 generates a processed add signal for transmission to signal processor 320. Signal processor 320 provides an electrical channel signal 322 to an electrical/optical transmitter 324 for conversion to an optical signal to form an individual channel signal 326. Individual channel signal 326 exits optical converter card 310 at system output port 328.

Control interface circuitry 331 provides signaling to control signal processor 320 in the processing of add/drop channel signals and feedback channel signals. Feedback channel signals may be provided through system input port 312 from an appropriate one of lines 222-1 to 222-K and 269-1 to 269-K of FIGS. 2A-2B, converted into an electrical signal by optical/electrical receiver 316, and processed by signal processor 320. Signal processor 320 than can provide the feedback signal to electrical/optical transmitter 324 for output to an appropriate one of lines 224-1 to 224-K and 272-1 to 272-K of FIGS. 2A-2B through system output port 328. Processing performed by optical converter card 310 can include for example converting a channel to a non-colored optical channel (e.g., a 1310 or 850 nm). As shown, an optical converter card 310 would occupy each of optical converters 218-1 to 218-K and 268-1 to 268-K of FIGS. 2A-2B. However, optical converter card 310 may be readily designed to provide the functionality for multiple ones of optical converters 218-1 to 218-K and 268-1 to 268-K of FIGS. 2A-2B.

Figure 5:
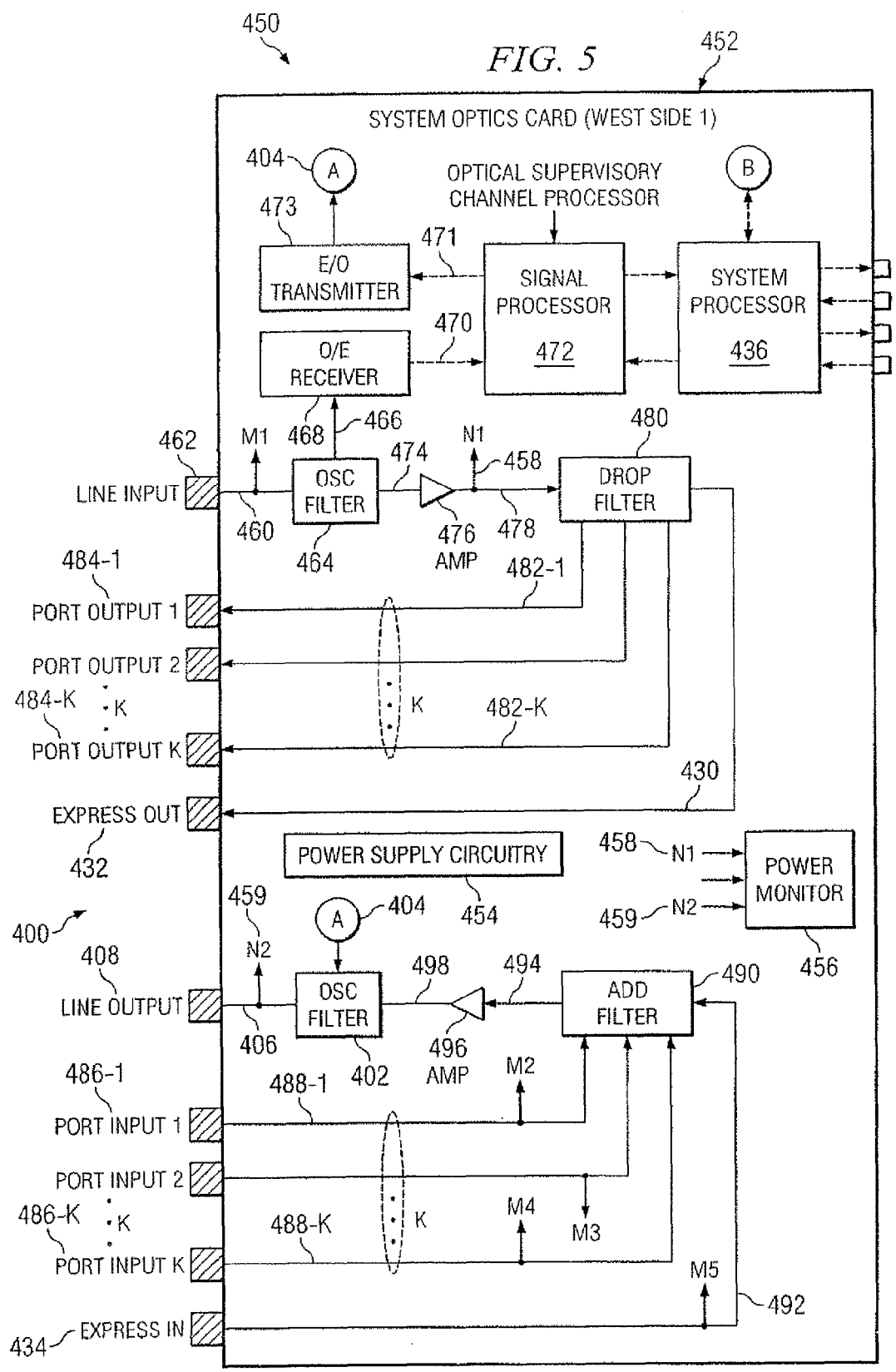
FIG. 5 illustrates a systems optics card employing the functional operation for an add/drop node used in an example embodiment of the present invention.

FIG. 5 depicts a system optics card 450 according to an example embodiment of the present invention. The functionality of one side of add/drop node 200 such as West side 298 of FIGS. 2A-2B can be reduced to a system optics card 450 and one or more optical converter cards 310. System optics card 450 shows that common optics and control circuitry within West Side 298 of FIGS. 2A-2B, other than optical converters 218-1 to 218-K of FIGS. 2A-2B, can be placed on a single substrate, such as a printed circuit board 452. A single power supply 454 can be used to power system optics card 450. A single centralized optical power monitor 456 can be used to measure multiple points, such as points N1 458 and N2 459, throughout system optics card 450. The majority of the optical cabling used to interconnect all circuit packs of conventional designs can be integrated within system optics card 450, thus removing mechanical, electrical, and optical connectors, avoiding problems related to malfunctions of these extra components, and increasing the overall system reliability when compared to conventional add/drop node designs.

A West Line Input signal 460, received into West Side 298 can enter system optics card 450 at a line input port 462. One of the channels forming West Line Input signal 460 can be an optical supervisory channel. If an optical supervisory channel is present, filter 464 can filter the optical supervisory channel, indicated by line 466, from the other channels in West Line Input signal 460. The optical supervisory channel 466 can be forwarded to an optical/electrical receiver 468, where it is converted to an electrical channel 470, and then processed by an optical supervisory channel processor 472. Optical supervisory channel processor 472 may provide control signals over an electrical channel 471 for conversion by an electrical/optical transmitter 473. Electrical/optical transmitter 473 generates an optical supervisory channel 404 for combination with amplified channels 498 at a filter 402 to produce West Line Output signal 406 at line output port 408. Optical supervisory channel processor cooperates with a system processor 436 in the processing and generation of optical supervisory channels.

The remaining channels of West Line Input signal 460 are forwarded to an optical input amplifier 476 over line 474 to be amplified by a predetermined amount of amplification. Optical input amplifier 476 can simultaneously amplify all channels input to the amplifier. The amplified channels, indicated by line 478, can be transmitted to a drop filter 480. Drop filter 480 performs the functions of optical input filtering unit 216 of FIGS. 2A-2B. Drop filter 480 can be used to isolate individual channels. The individual channels can be (1) dropped from system optics card 450 for transmission to a client, (2) combined with pass through channels from an East Side system optics card for optional feedback through systems optics card 450, (3) passed through to an East Side system optics card for combining with other channels, and/or (4) added for transport upon receipt from a client.

Certain channels from West Line Input signal 460 designated for case (1) and/or case (2) can be transmitted from drop filter 480 on lines 482-1 through 482-K to Port Outputs 484-1 through 484-K, respectively. Each of the Port Outputs 484-1 through 484-K can be connected to an individual system input port 312 on an optical converter card 310 of FIG. 4. For example, output port 484-1 can be connected to system input port 312 of optical converter card 310. For case (3), certain channels from West Line Input signal 460 can be transmitted from drop filter 480 to Express Out port 432 for pass through to a system optics card at East Side 299.

For case (2) and case (4), feedback channel signals and client add signals can be transmitted from output port 328 of Optical converter card 310 in FIG. 4 to one of the Port Inputs 486-1 to 486-K of system optics card 450. For example, output port 328 of optical converter card 310 in FIG. 4 may be connected to Port Input 486-1. After entering any of Port Inputs 486-1 to 486-K, the feedback channel signal and/or client add signal is transmitted to add filter 490 over lines 488-1 to 488-K. Add filter 490 performs the functions of optical output filtering unit 226 of FIGS. 2A-2B. Add filter 490 can multiplex channels input to it from lines 488-1 through 488-K to form combined channels 494. Add filter 490 may also receive pass through signals from a system optics card at East Side 299 through an Express In port 434 over line 492 and be combined with signals 488-1 to 488-K to form signal 494. Combined channels 494 can then be amplified by an output amplifier 496 by a predetermined amount of amplification to form amplified channels 498. Amplified channels 498 can be transmitted to optical supervisory channel filter 402, where an optical supervisory channel 404 is combined with amplified channels 498 to form West Line Output signal 406 for output from system optics card 450 at line output port 408.

The system optics card implementation of FIG. 5 eliminates some of the redundancies provided in the individual circuit pack implementation of FIGS. 3A-3G. For example, only a single power supply 454 is needed to power the functions of system optics card 450. A single power monitor 456 is used to check various signals within system optics card 450. Through front card connections, system optics card 450 may not need an electrical backplane connector or mechanical front panel. A number of optical connectors may also be reduced in the implementation of system optics card 450 as opposed to the multiple circuit pack implementation of FIGS. 3A-3G. A single signal processor 472 and system processor 436 may be provided to support the functionalities of system optics card 450.

Figure 6:
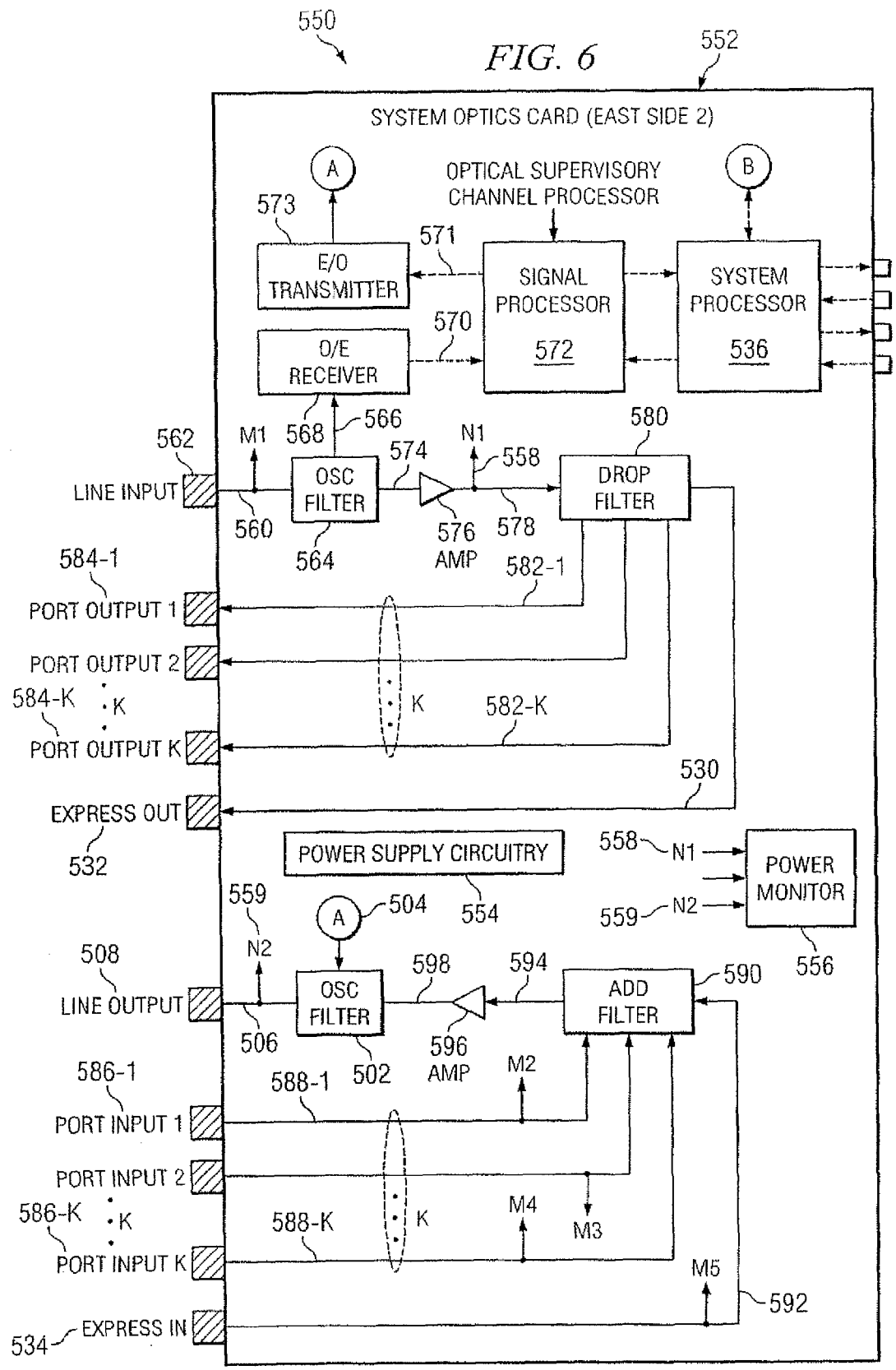
FIG. 6 illustrates a systems optics card employing the functional operation for an add/drop node used in an example embodiment of the present invention.

FIG. 6 depicts a system optics card 550 according to an example embodiment of the present invention. To implement another optical processing side of add/drop node 200 such as the East processing side, system optics card 550 can be used. System optics card 550 may be identical to or provide the same functionalities as system optics card 450 of FIG. 5. Accordingly, the combination of optical converter cards 310, system optics card 450, and system optics card 550 can be used to implement a 2-degree add/drop node. System optics card 550 shows that common optics and control circuitry within East Side 299 of FIGS. 2A-2B, other than optical converters 268-1 to 268-K of FIGS. 2A-2B, can be placed on a single substrate, such as a printed circuit board 552. A single power supply 554 can be used to power system optics card 550. A single centralized optical power monitor 556 can be used to measure multiple points, such as points N1 558 and N2 559, throughout system optics card 550. The majority of the optical cabling used to interconnect all circuit packs of conventional designs can be integrated within system optics card 550, thus removing mechanical, electrical, and optical connectors, avoiding problems related to malfunctions of these extra components, and increasing the overall system reliability when compared to conventional add/drop node designs.

Certain channels from West Line Input signal 460 of FIG. 5 that are designated for case (3) pass through are transmitted out of system optics card 450 at West Express Out port 432. West Express Out port 432 is connected to East Express In port 534 of system optics card 550 of FIG. 6. After entering East Express In port 534, pass through signals are provided to an add filter 590 over line 592. Add filter 590 can multiplex pass through signals from line 592 with feedback channel signals and client add signals from system output ports 328 of optical converter cards 310 on respective lines 588-1 to 588-K. Combined channels, indicated by line 594, can be transmitted to an output optical amplifier 596 for amplification by a predetermined amount of amplification. Amplified channels, indicated by line 598, can be transmitted to optical supervisory channel filter 502, where amplified channels 598 can be combined with an output optical supervisory channel signal 504 to form East Line Output signal 506, which is output from system card 550 at line output port 508.

An East Line Input signal 560, received into East Side 299 can enter system optics card 550 at a line input port 562. One of the channels forming East Line Input signal 560 can be an optical supervisory channel. If an optical supervisory channel is present, filter 564 can filter the optical supervisory channel, indicated by line 566, from the other channels in East Line Input signal 560. The optical supervisory channel 566 can be forwarded to an optical/electrical receiver 568, where it is converted to an electrical channel 570, and then processed by an optical supervisory channel processor 572. Optical supervisory channel processor 572 may provide control signals over an electrical channel 571 for conversion by an electrical/optical transmitter 573. Electrical/optical transmitter 573 generates an optical supervisory channel 504 for combination with amplified channels 598 at a filter 502 to produce East Line Output signal 506 at line output port 508. Optical supervisory channel processor 572 cooperates with a system processor 536 in the processing and generation of optical supervisory channels.

Certain channels from East Line Input signal 560 designated for case (1) and/or case (2) can be transmitted from drop filter 580 on lines 582-1 through 582-K to Port Outputs 584-1 through 584-K, respectively. Each of the Port Outputs 584-1 through 584-K can be connected to an individual system input port 312 on an optical converter card 310 of FIG. 4. For example, output port 584-1 can be connected to system input port 312 of optical converter card 310. For case (3), certain channels from East Line Input signal 560 can be transmitted from drop filter 580 to Express Out port 532 for pass through to system optics card 450 at West Side 298. Express Out port 532 is connected to Express In port 434 of system optics card 450.

In an example embodiment of the present invention, system processors 436 and 536 can be placed on a separate substrate from the other components of system optics cards 450 and 550, such as on an auxiliary printed circuit board, so that a system processor can be replaced without disrupting optic traffic through the system. For this example embodiment, a single system processor 436 placed on a separate substrate could control multiple system optics cards 450 and 550. Furthermore, a redundant system processor 536 can be used in addition to the single system processor 436. In another example embodiment of the present invention, drop units 490 and 590 and add units can be depopulated from system optics cards 450 and 550 to provide a system optics card that provides amplification without filtering.

From the above discussion of the various example embodiments, it is apparent that one of skill in the art can easily modify system optics cards 450 and 550 as desired for made to order designs per application requirements. For example, a system optics card 450 may include a low gain input amplifier in short span optical signal transport environments or high gain amplifiers for long span optical signal transport environments. Moreover, a single input amplifier that is capable of selecting between low and high gains may be implemented in system optics card 450 to provide flexible options to handle short and long span environments. For different add/drop port applications, system optics card 450 may include colorless filtering units or no filtering units as desired. The number of add/drop ports and filtering units may be tailored to the specific application.

Figure 7A:
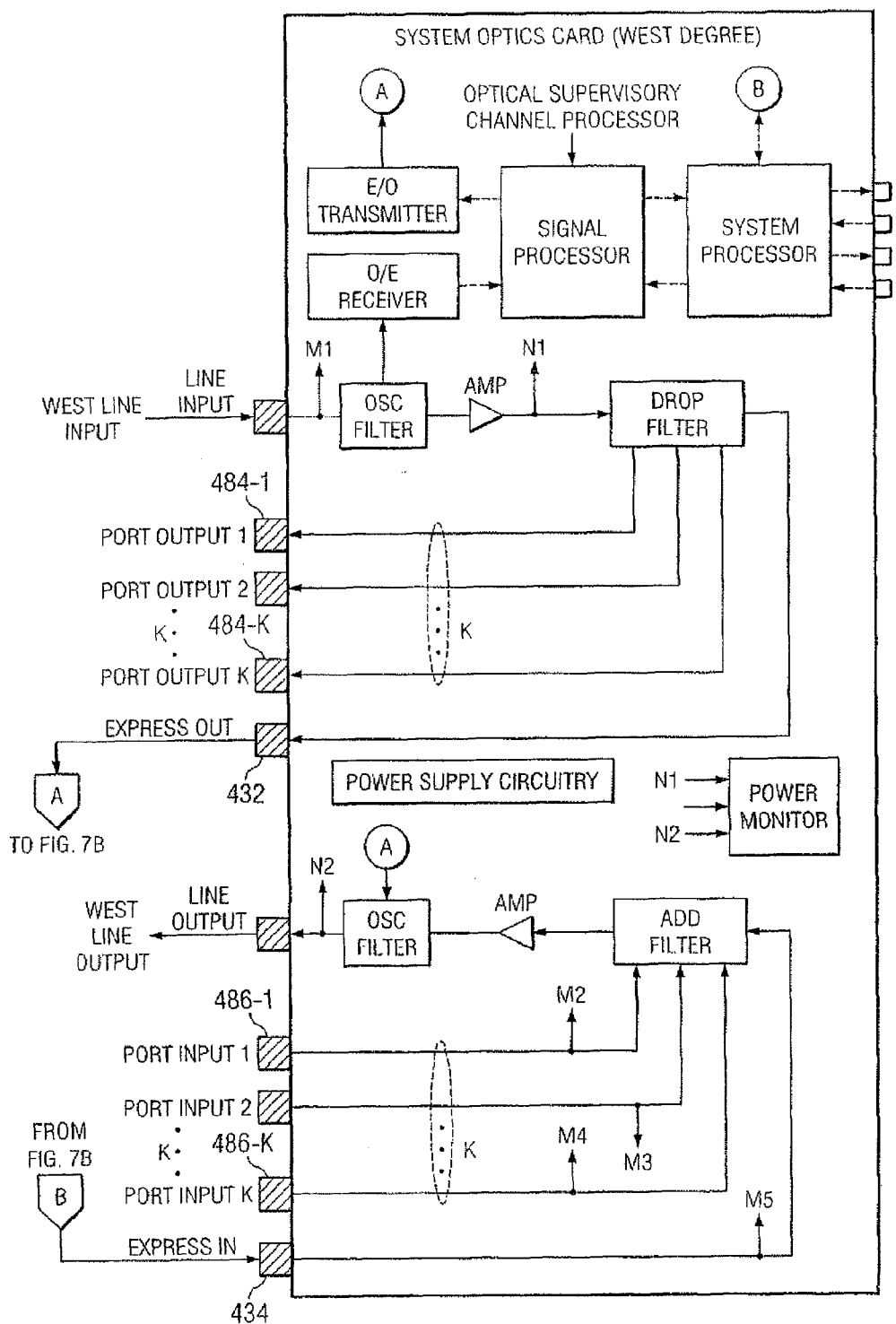
FIGS. 7A-7B illustrate implementation of a two degree add/drop node using two system optics card in an example embodiment of the present invention.
Figure 7B:
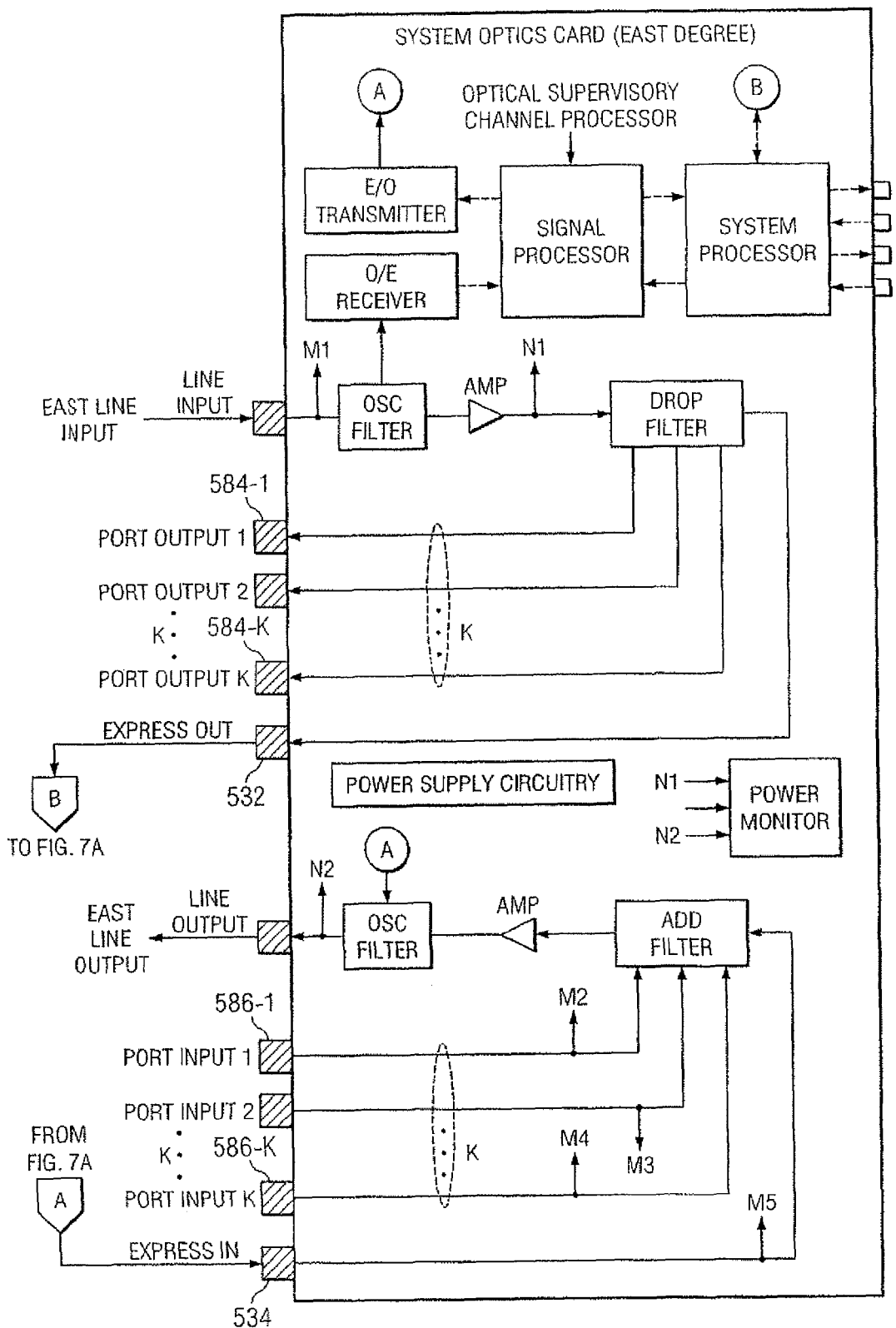

FIGS. 7A-7B show an interconnection of system optics card 450 and system optics card 550 to provide a 2-degree add/drop node. As discussed above, the combination of optical converter cards 310 of FIG. 4, system optics card 450 in FIG. 5, and system optics card 550 in FIG. 6 can be used to implement a 2-degree add/drop node so that a single system optics card 450 can manage signals entering from or exiting to a particular side (e.g. West Side 298), while another system optics card 550 can manage signals entering from or exiting to another side (e.g. East Side 299) of an add/drop node. In this example embodiment, Express Out port 432 of system optics card 450 is connected to Express In port 534 of system optics card 550. Furthermore, Express Out port 532 of system optics card 550 is connected to Express In port 434 of system optics card 450. Optical converter cards 310 of FIG. 4 can be connected to Port Outputs 484-1 to 484-K through system input ports 312 and can also be connected to Port Input 486-1 to 486-K through system output ports 328. In addition, optical converter cards 310 can be connected to Port Outputs 584-1 to 584-K through system input ports 312 and can also be connected to Port Inputs 586-1 to 586-K through system output ports 328.

Figure 8:
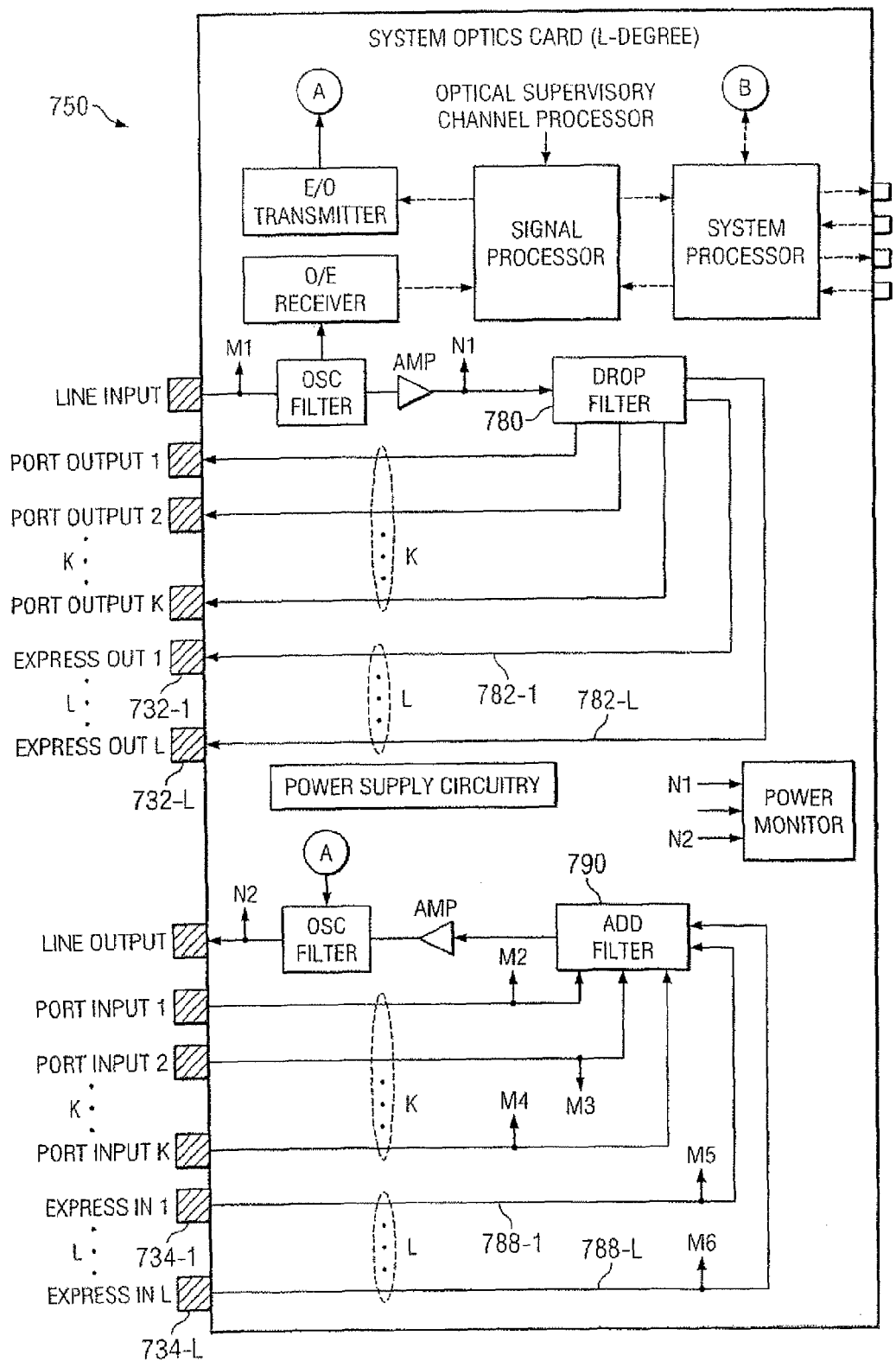
FIG. 8 illustrates a system optics card capable of providing a multiple degree node in an example embodiment of the present invention.

FIG. 8 shows an alternative system optics card 750 according to an alternative embodiment of the present invention. System optics card 750 includes all the features of system optics cards 450 and 550 plus additional Express In ports 734-1 to 734-L and additional Express Out ports 732-1 to 732-L. By having multiple Express In ports 734-1 to 734-L and Express Out ports 732-1 to 732-L, system optics card 750 may provide a 3-degree or greater add/drop node. Drop filter 780 includes additional functionality to provide certain channels to multiple Express Out ports 732-1 to 732-L over lines 782-1 to 782-L. Add filter 790 includes additional functionality for multiplexing channels received through multiple Express In ports 734-1 to 734-L over lines 788-1 to 788-L.

Figure 9:
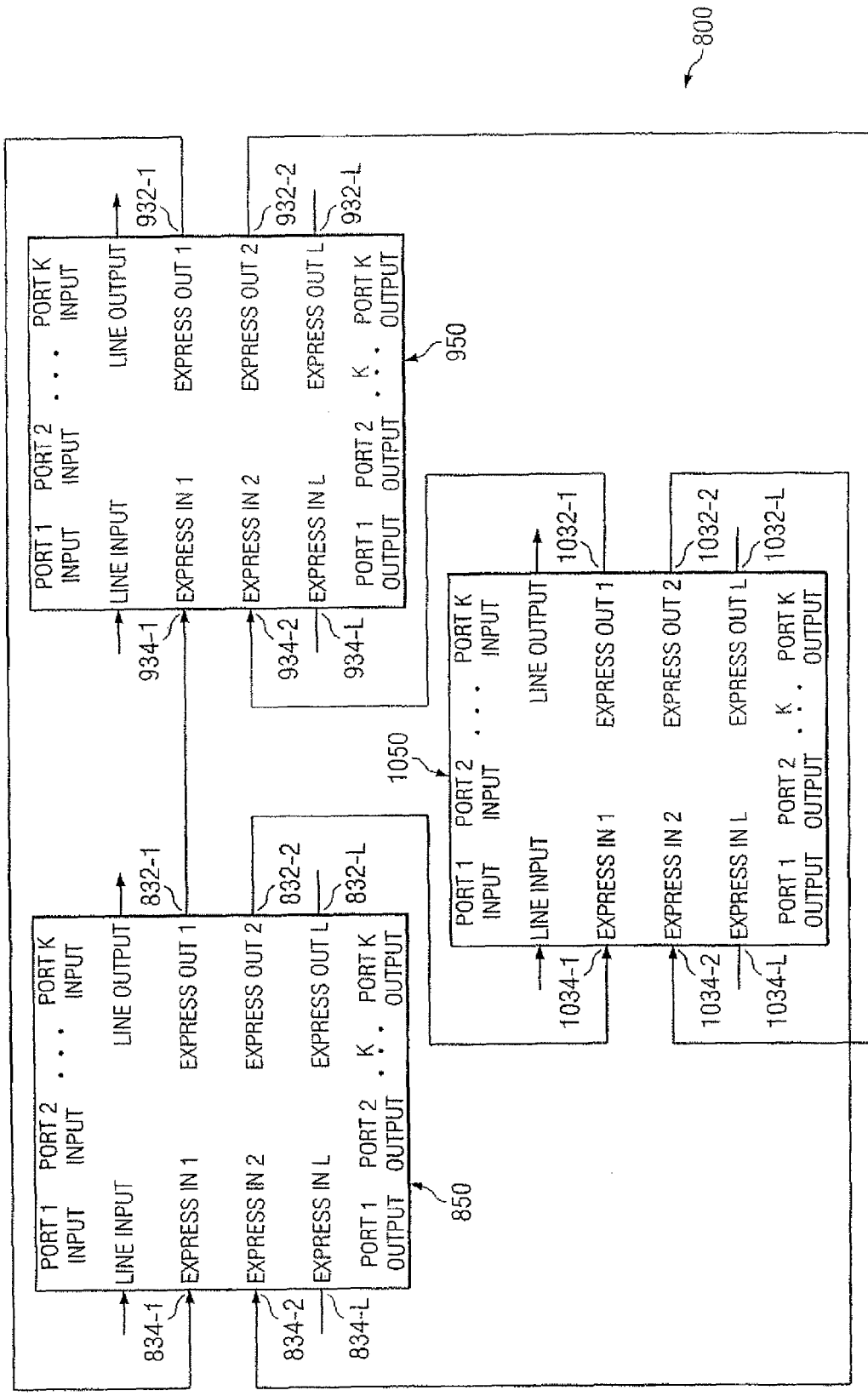
FIG. 9 illustrates interconnections of system optics card to form a three degree add/drop node in an example embodiment of the present invention.

FIG. 9 shows a system 800 that uses multiple system optics cards 750 to generate a 3-degree add/drop node. FIG. 9 shows system optics cards 850, 950, and 1050 that may be similar in nature to system optics card 750 of FIG. 8. System optics card 850 includes Express Out ports 832-1 to 832-L and Express In ports 834-1 to 834-L. System optics card 950 includes Express Out ports 932-1 to 932-L and Express In ports 934-1 to 934-L. System optics card 1050 includes Express Out ports 1032-1 to 1032-L and Express In ports 1034-1 to 1034-L. Express Out port 832-1 is coupled to Express In port 934-1. Express Out Port 832-2 is coupled to Express In port 1034-1. Express Out port 932-1 is coupled to Express In port 834-1. Express Out Port 932-2 is coupled to Express In port 1034-2. Express Out port 1032-1 is coupled to Express In port 934-2. Express Out Port 1032-2 is coupled to Express In port 834-2. Through this configuration, system 800 provides a 3-degree add/drop node as illustrated in FIG. 1B. A 4-degree add/drop node can be obtained by adding an additional system optics card to system 800.

Figure 10:
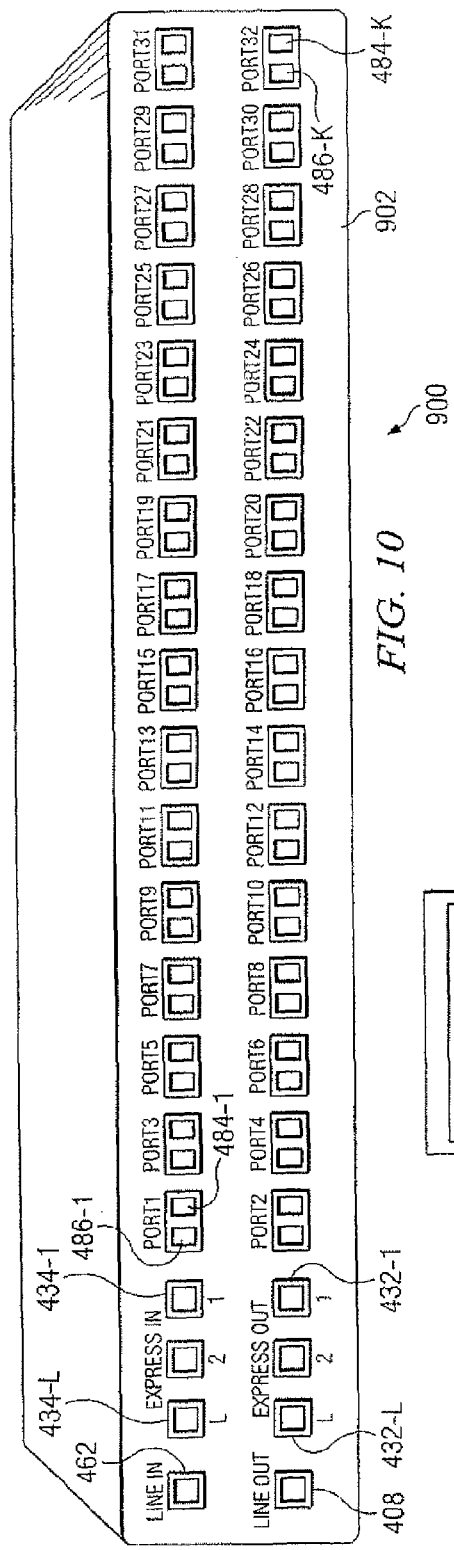
FIG. 10 illustrates an enclosure for an add/drop node in an example embodiment of the present invention.

FIG. 10 illustrates an example enclosure 900 for any of system optics cards 450, 550, 750, 850, 950, or 1050. For example, system optics card 450 can be implemented as a single enclosure 900. Enclosure 900 includes an integrated patch panel 902 so that system input port 312 and system output port 328 of optical converter card 310 can be connected to one of Port Outputs 484-1 to 484-K and one of Port Inputs 486-1 to 486-K respectively of systems optics card 450. Line input port 462 and Line output port 408 are provided on integrated patch panel 902 for West Line Input signal 460 and West Line Output signal 406. Express In port 434 and Express Out port 432 are also provided on integrated patch panel 902. Additional Express In ports 434-1 to 434-L and Express Out ports 432-1 and 432-L may be provided on integrated patch panel 902 to accommodate a configuration similar to system optics card 750. Enclosure 900 provides a small form factor optical shelf with an integrated patch panel. Other than the optical connections to and from the optical converters, the optical connections to and from the line outputs and inputs, and the express optical connections, cabling within an optical add/drop node is completely integrated within enclosure 900.

Figure 11:
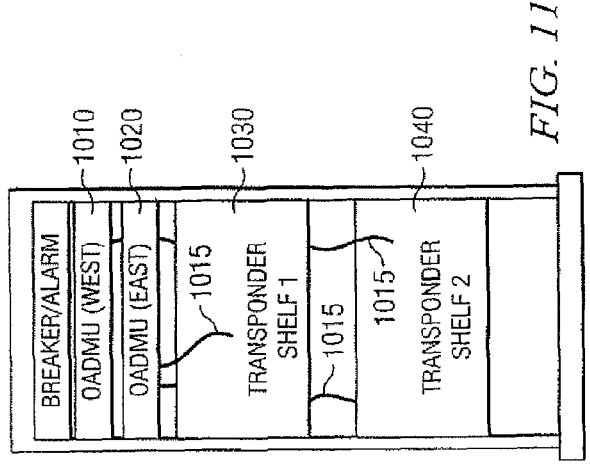
FIG. 11 illustrates add/drop units implemented in a rack system according to an example embodiment of the present invention.

FIG. 11 illustrates that two enclosures 900 can be implemented in a rack system 1000. One enclosure 1010 can be used for managing optical signals entering from or exiting to, for example, West Side 298 and another enclosure 1020 can be used for managing optical signals entering from or exiting to, for example, East Side 299. Multiple optical converter cards 310 can be implemented in port shelves 1030 and 1040. Port shelf 1030 may hold optical converter cards 310 managing signals entering from or exiting to West optical processing Side enclosure 1010. Port shelf 1040 can hold optical converter cards 310 managing signals entering from or exiting to East optical processing Side enclosure 1020. Alternatively, optical converter cards for both East optical processing Side enclosure 1020 and West optical processing Side enclosure 1010 can be placed in a single common port shelf. Optical fiber cables 1015 may be connected from integrated patch panel 902 of both enclosures 1010 and 1020 to appropriate optical converter cards in port shelves 1030 and 1040. Optical fiber cables 1015 may also be connected between the Express In port of enclosure 1010 and the Express Out port of enclosure 1020 and between the Express Out port of enclosure 1010 and the Express In port of enclosure 1020. The only other external cabling associated with rack system 1000 would be the cabling to the client devices and the line input and output cabling to each enclosure 1010 and 1020.

FIG. 12 shows an example flow process 1100 outlining operation of a system optics card. Upon receipt of a line input signal at block 1110, a determination is made at block 1120 as to whether any optical supervisory channels are included in the signal stream. If so, optical supervisory channels are extracted and processed at block 1130. After optical supervisory channel determination, the line input signal is amplified at block 1140. At block 1150, channels of the line input signal stream are identified for dropping, feedback, or pass through. At block 1160, channels to be dropped or for feedback are provided to an appropriate Port Output for processing by an optical converter card. Channels to be passed through are provided to an appropriate Express Out port at block 1170.

Figure 13:
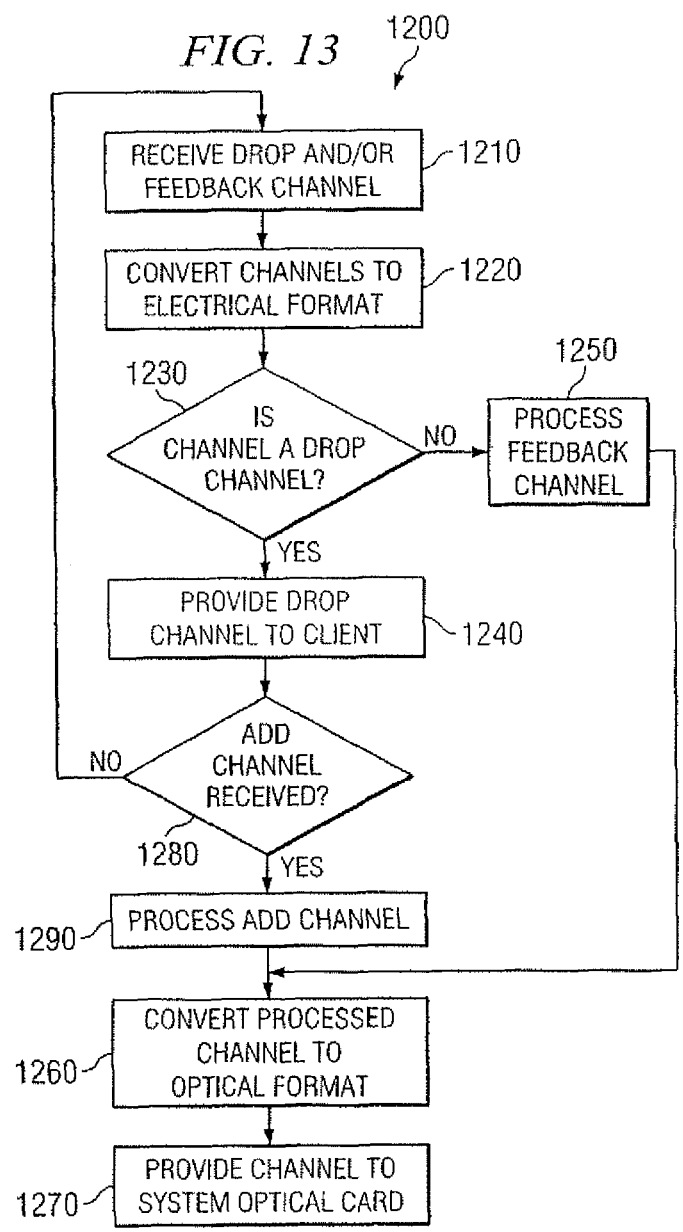
FIG. 13 shows an example flow process outlining operation of an optical converter card according to an example embodiment of the present invention.

FIG. 13 shows an example flow process 1200 outlining operation of an optical converter card. Process begins at block 1210 where drop and/or feedback channels are received. The channels are converted to electrical format at block 1220. A determination is made at block 1230 as to whether the channel received is a drop channel. If so, the drop channel is provided to the client device at block 1240. If not, the feedback channel is processed at block 1250. The process feedback channel is converted to optical format at block 1260. The feedback channel is then returned to the system optics card at block 1270. Process 1200 also determines at block 1280 whether any channels to be added have been received from a client device. If not, process 1200 will continue to look for receipt of any add, drop, and feedback channels. When an add channel has been received, appropriate processing is performed on the add channel at block 1290. The add channel is then converted to optical format at block 1260 and then provided to the system optics card at block 1270.

FIG. 14 shows an example flow process 1300 outlining further operation of a system optics card. At block 1310 channels are received from another system optics card through an Express In port. Client channels to be added are received at block 1320 from optical converter cards at Port Inputs. These channels are then multiplexed together at block 1330. The combined channels are amplified at block 1340. At block 1350, a determination is made as to whether any optical supervisory channels are to be included. If so, optical supervisory channels are inserted into the combined channel signal stream at block 1360. After this determination is processed, the channel signal stream is provided to a line output port for transport at block 1370.

System optics cards 450, 550, 750, 850, 950, and 1050 may be built to order according to desired configurations. For example, amplifiers 476 and 496 within system optics card 450 may be designed for short haul, long haul, and ultra long reach applications in order to provide amplifiers of differing strengths, such as for metropolitan and regional implementations. Moreover, add and drop filters 480 and 490 in system optics card 450 may be of different and variable types to support colored add and drop ports that are associated with a single wavelength and colorless add and drop ports that can be associated with any wavelength. A flexible DWDM system constructed using the components and features described herein provides cost efficiency through the elimination of redundant components found in prior art systems that use multiple circuit boards containing multiple copies of controller interfaces, power supplies, and monitoring circuitry. A costly backplane and its associated connections is also eliminated through the use of a system optics card built on a single printed circuit board. Due to the high level of integration in the enclosure, few external connections are required to install an operating system. System installation becomes simple and straight forward while also providing a flexibility to expand communication capability.

The example embodiments of system optics cards shown in FIGS. 5-9 are usable with the example enclosure 900 shown in FIG. 10, which is mountable in the rack system 1000 shown in FIG. 11. But the example embodiments of the system optics cards of the present invention are not limited to being used with an enclosure in order to connect them to other cards and/or an optical node by mounting them in a rack or chassis, for example. Thus, FIGS. 15-19 show additional example embodiments in which system optics cards are connectable in a rack system or to a chassis, for example, without using the example enclosure 900. Rather, these optics cards are directly mountable, for example, in a chassis for housing plural system optics cards and/or other optics cards, such as client converter cards.

Figure 15:
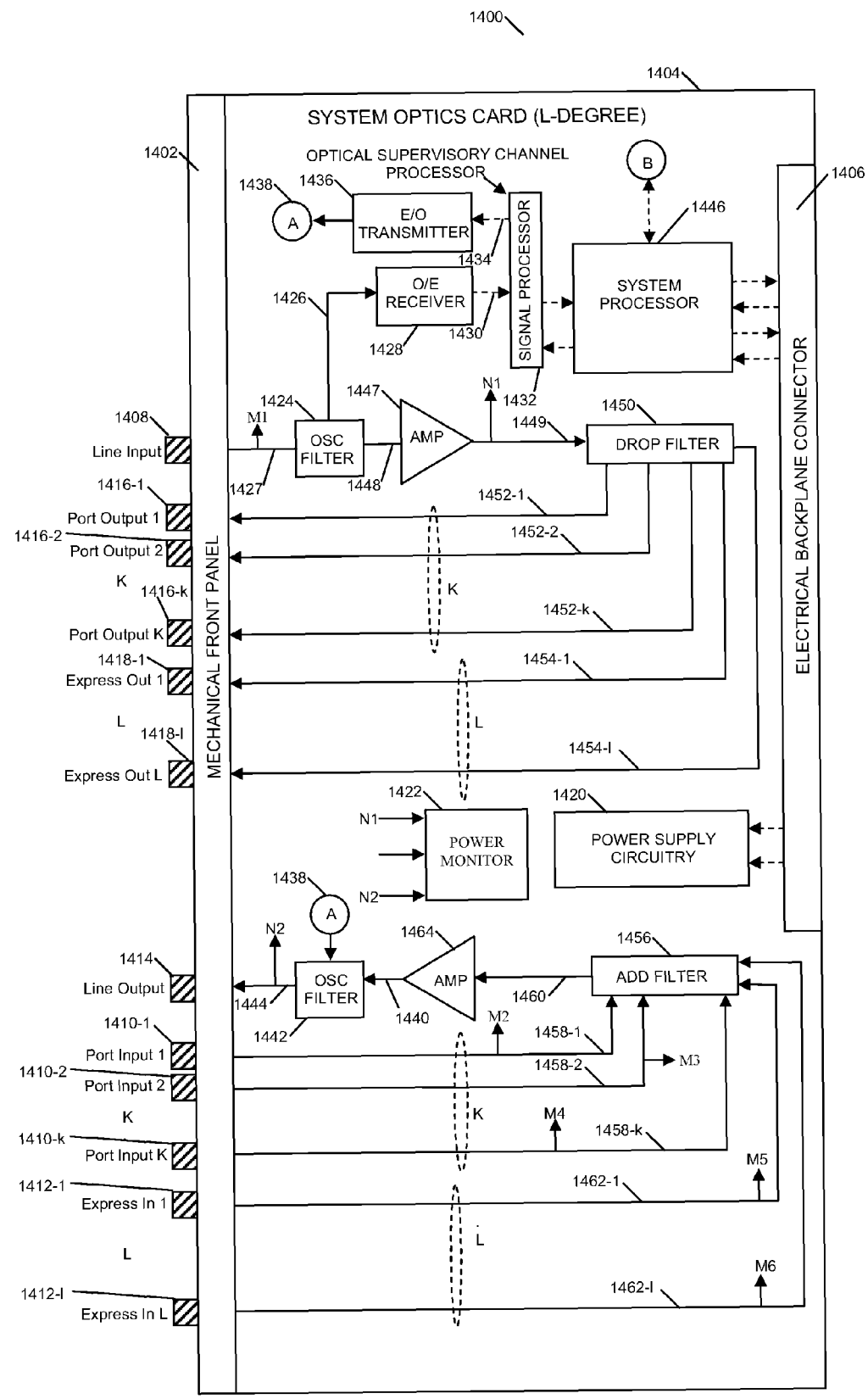
FIG. 15 is a functional block diagram of an example embodiment of a systems optics card having a mechanical front panel and an electrical backplane connector.

FIG. 15 illustrates an example embodiment of one such system optics card, card 1400. The system optics card 1400 can comprise a mechanical front panel 1402, a main circuit body on a single substrate such as, for example, a printed circuit board 1404, and an electrical backplane connector 1406, although it is not limited to these components. The printed circuit board 1404 can be the same as or different from the printed circuit board 452 shown in FIG. 5, the printed circuit board 552 shown in FIG. 6, and the printed circuit boards shown in FIGS. 7A, 7B, 8 and 9. The system optics card 1400 can be connected to a chassis for housing the system optics card, other system optics cards, and/or other optics cards (not shown), for example, via the electrical backplane connector 1406, which provides a mechanical and electrical connection to the chassis. The system optics card 1400 can be configured to slide into such a chassis to provide the electrical and mechanical connection thereto, although it is not limited to such an operation to mount it to a chassis. The mechanical front panel 1402 and the electrical backplane connector 1406 can be the same as or different from the mechanical front panel and the electrical backplane connector shown in FIGS. 3A-3G and 4.

The mechanical front panel 1402 can comprise a line input port 1408, which can be the same as or different from the line input ports 462 and 562 shown in FIGS. 5 and 6, respectively, and can be the same as or different from the line input ports shown in FIGS. 7A, 7B, 8, 9, and 10. The line input port 1408 is configured to receive optical signals from other optical nodes that are different from the optical node to which the system optics card 1400 belongs.

The mechanical front panel 1402 can also comprise k add input ports 1410-1, 1410-2, . . . 1410-k, where k is an integer equal to the number of add input ports. The k add input ports 1410-1, 1410-2, . . . 1410-k can be the same as or different from the k port inputs 486-k and 586-k shown in FIGS. 5 and 6, respectively, and can be the same as or different from the input ports shown in FIGS. 7A, 7B, 8, 9, and 10. The add input ports 1410-k can be configured to receive optical signals from one or more optical converter cards connected to a client device or devices.

The mechanical front panel 1402 can further comprise l express input ports 1412-1, . . . 1412-l, where l is an integer equal to the number of express input ports. The l express input ports 1412-1, . . . 1412-l can be the same as or different from the express input ports 434 shown in FIGS. 5 and 7A, the express input ports 534 shown in FIGS. 6 and 7B, the express input ports 734-L shown in FIG. 8, and the express input ports shown in FIGS. 9 and 10. The express input ports 1412-l can be configured to receive optical signals from one or more other optical system cards in the same optical node as the optical system card 1400.

The mechanical front panel 1402 can also comprise a line output port 1414, which can be the same as or different from the line output ports 408 and 508 shown in FIGS. 5 and 6, respectively, and can be the same as or different from the line output ports shown in FIGS. 7A, 7B, 8, 9, and 10. The line output port 1414 can be configured to deliver optical signals to one or more optical nodes that are different from the optical node to which the system optics card 1400 belongs.

The mechanical front panel 1402 can further comprise k drop output ports 1416-1, 1416-2, . . . 1416-k, where k is an integer equal to the number of drop output ports. The k drop output ports 1416-1, 1416-2, . . . 1416-k can be the same as or different from the k port outputs 484-k shown in FIGS. 5 and 7A, the k port outputs 584-k shown in FIGS. 6 and 7B, and the port outputs shown in FIGS. 8, 9, and 10. The drop output ports 1416-k can be configured to output optical signals to one or more optical converter cards connected to a client device or devices.

The mechanical front panel 1402 can further comprise l express output ports 1418-1, . . . 1418-l, where l is an integer equal to the number of express output ports. The l express output ports 1418-1, . . . 1418-l can be the same as or different from the express output ports 432 shown in FIGS. 5 and 7A, the express output ports 532 shown in FIGS. 6 and 7B, the express output ports 732-L shown in FIG. 8, and the express output ports shown in FIGS. 9 and 10. The express output ports 1418-l can be configured to deliver optical signals to one or more other optical system cards in the same optical node as the optical system card 1400.

The printed circuit board 1404 can comprise a single power supply 1420, a single centralized optical power monitor 1422, an optical supervisory filter 1424 for filtering an optical supervisory channel 1426 input from optical signals 1427 input on the line input 1408, and an optical/electrical receiver 1428 that can convert the optical supervisory channel 1426 into an electrical channel, which can be processed by an optical supervisory channel processor 1432, which can also be on the printed circuit board 1404. The optical supervisory channel processor 1432 may provide control signals over an electrical channel 1434 for conversion by an electrical/optical transmitter 1436, which can also be on the printed circuit board 1404. The electrical/optical transmitter 1436 can generate an optical supervisory channel 1438 for combination with amplified channels 1440 at an optical supervisory channel filter 1442, which can also be on the printed circuit board 1404, to produce a line output signal 1444 at the line output port 1414. The optical supervisory channel processor 1432 can cooperate with a system processor 1446, which can also be on the printed circuit board 1404, in the processing and generation of optical supervisory channels.

The remaining channels of line input signal 1427 can be forwarded to an optical input amplifier 1447, which can also be on the printed circuit board 1404, over a line 1448, on the printed circuit board 1404, to be amplified by a predetermined amount of amplification. The optical input amplifier 1447 can simultaneously amplify all channels input thereinto. The amplified channels, indicated by line 1449, can be transmitted to a drop filter 1450, which can also be on the printed circuit board 1404. The drop filter 1450 can perform the functions of optical input filtering unit 216 of FIGS. 2A-2B, although it is not limited to performing these functions. The drop filter 1450 can be used to isolate individual channels. The individual channels can be (1) dropped from system optics card 1400 for transmission to a client, (2) combined with pass through channels from one or more other system optics cards for optional feedback through systems optics card 1400, (3) passed through to another system optics card for combining with other channels, and/or (4) added for transport upon receipt from a client, although the drop filter 1450 is not limited to these functions.

Certain channels from the line input signal 1427 designated for case (1) and/or case (2) can be transmitted from drop filter 1450 on lines 1452-1, 1452-2, . . . through 1452-k, which can also be provided on the printed circuit board 1404, to drop output ports 1416-1, 1416-2, through 1416-k, respectively. Each of the drop output ports 1416-1, 1416-2, through 1416-k can be connected to an individual system input port 312 on an optical converter card 310 of FIG. 4. For example, output port 1416-1 can be connected to system input port 312 of optical converter card 310. For case (3), certain channels from the line input signal 1427 can be transmitted from the drop filter 1450 on lines 1454-1, . . . 1454-l, which can also be provided on the printed circuit board 1404, to one or more of the express output ports 1418-1, . . . 1418-l for pass through to one or more system optics cards (not shown).

For case (2) and case (4), feedback channel signals and client add signals can be transmitted from the output port 328 of the optical converter card 310 in FIG. 4 to one of the add input ports 1410-1 to 1410-k of the system optics card 1400. For example, the output port 328 of optical converter card 310 in FIG. 4 may be connected to add input port 1410-1. After entering any of add input ports 1410-1 to 1410-k, the feedback channel signal and/or client add signal can be transmitted to an add filter 1456 over lines 1458-1, 1458-2, . . . to 1458-k, respectively, all of which can be provided on the printed circuit board 1404. The add filter 1456 can perform the functions of optical output filtering unit 226 of FIGS. 2A-2B, although it is not limited to performing these functions. The add filter 1456 can multiplex channels input to it from lines 1458-1, 1458-2, . . . to 1458-k to form combined channels 1460. The add filter 1456 may also receive pass through signals from a system optics card at East Side 299 through one or more of the express input ports 1412-1, . . . 1412-l over lines 1462-1, . . . 1462-l, respectively, which can be provided on the printed circuit board 1404, and can combine the pass through signals with signals on lines 1458-1 to 1458-k to form the signal 1460. The combined channels 1460 can then be amplified by an output amplifier 1464, which can also be provided on the printed circuit board 1404, by a predetermined amount of amplification to form amplified channels 1440. The amplified channels 1440 can be transmitted to the optical supervisory channel filter 1442, where the optical supervisory channel 1438 can be combined with amplified channels 1440 to form a line output signal 1444 for output from system optics card 1400 at the line output port 1414.

The system optics card implementation of FIG. 15 can eliminate some of the redundancies provided in the individual circuit pack implementation of FIGS. 3A-3G. For example, only a single power supply 1420 is needed to power the functions of system optics card 1400, and a single power monitor 1422 can be used to check various signals within system optics card 1400. A number of optical connectors may also be reduced in the implementation of system optics card 1400 as opposed to the multiple circuit pack implementation of FIGS. 3A-3G. In addition, a single signal processor 1432 and the system processor 1446 may be provided to support the functionalities of system optics card 1400, although the card 1400 is not limited to the use of one signal processor and one system processor.

The elements discussed above that may be provided on the printed circuit board 1404 may be provided on some other substrate or on multiple substrates. In addition, elements discussed above that can be provided on the printed circuit board 1404 may be the same as or different from the corresponding elements on the system optics card 450 shown in FIGS. 5 and 7A, the system optics card 550 shown in FIGS. 6 and 7B, the system optics card 750 shown in FIG. 8, and/or the system optics cards shown in FIG. 9. It is within the scope of the invention, for the system optics card 1400 to include more than or fewer than the number of components shown in FIG. 15. It is further within the scope of the invention for any of the components of the system optics card shown in FIG. 15 to be replaced by any other suitable component (or components) that performs (or perform) the functions thereof, as discussed above.

Figure 16:
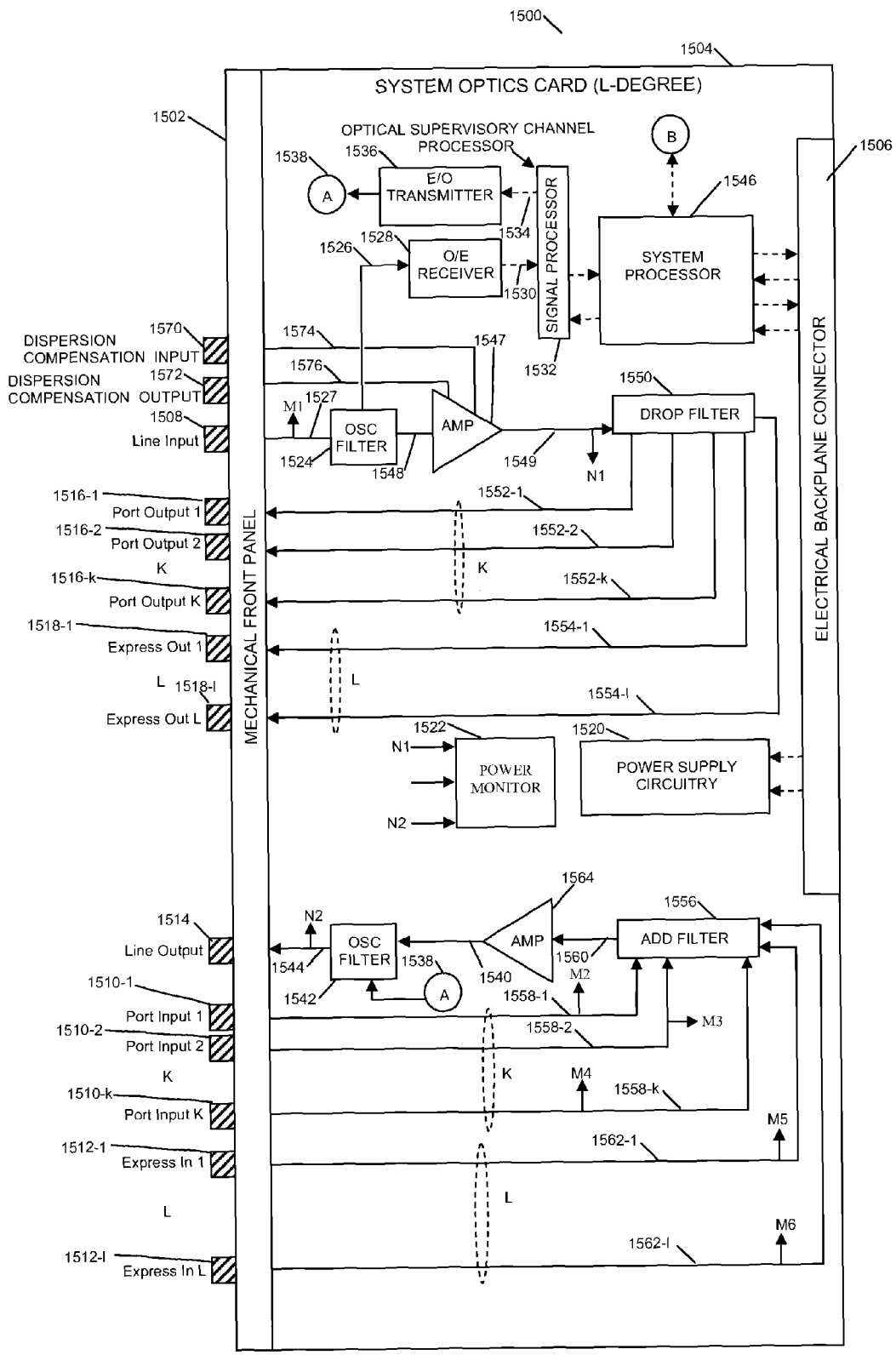
FIG. 16 is a functional block diagram of another example embodiment of a systems optics card having a mechanical front panel and an electrical backplane connector with dispersion compensation optical connectors.

FIG. 16 illustrates another example embodiment of a system optics card, card 1500. This system optics card 1500 can be the same as, for example, the system optics card 1500, except for the addition of a dispersion compensation input port 1570 and a dispersion compensation output port 1572, and lines 1574 and 1576 respectively connecting these ports to the amplifier 1547, as will be discussed in more detail below. The dispersion compensation input port 1570 and the dispersion compensation output port 1572 can be connected to a chromatic dispersion compensator (not shown). The chromatic dispersion compensator can be configured to compensate for the optical impairment known as chromatic dispersion in the optical signals input via the line input port 1508. The chromatic dispersion compensator can be placed before the input amplifier 1547, or between stage 1 and stage 2 of a two stage input amplifier. The chromatic dispersion compensator can be a roll of dispersion compensation fiber, although it is not limited to this structure. It is within the scope of the invention for the other components of the system optics card 1500 to be different from the components of optics card 1400, and in this case, the components of the optics card 1400 would be replaced by any other suitable component (or components) that performs (or perform) the functions thereof to manufacture the system optics card 1500. It should be understood that the card 1600 is not limited to being identical to the optical card 1500 except for the addition of the dispersion compensation elements noted above and can be different therefrom by containing more than or fewer than the number of components of the card 1500.

The system optics card 1500 can comprise a mechanical front panel 1502, a main circuit body on a single substrate such as, for example, a printed circuit board 1504, and an electrical backplane connector 1506, although it is not limited to these components. The printed circuit board 1504 can be the same as or different from the printed circuit board 452 shown in FIG. 5, the printed circuit board 552 shown in FIG. 6, and the printed circuit boards shown in FIGS. 7A, 7B, 8 and 9. The system optics card 1500 can be connected to a chassis for housing the system optics card, other system optics cards, and/or other optics cards (not shown), for example, via the electrical backplane connector 1506, which provides a mechanical and electrical connection to the chassis. The system optics card 1500 can be configured to slide into such a chassis to provide the electrical and mechanical connection thereto, although it is not limited to such an operation to mount it to a chassis. The mechanical front panel 1502 and the electrical backplane connector 1506 can be the same as or different from the mechanical front panel and the electrical backplane connector shown in FIGS. 3A-3G and 4.

The mechanical front panel 1502 can comprise a line input port 1508, which can be the same as or different from the line input ports 462 and 562 shown in FIGS. 5 and 6, respectively, and can be the same as or different from the line input ports shown in FIGS. 7A, 7B, 8, 9, and 10. The line input port 1508 is configured to receive optical signals from other optical nodes that are different from the optical node to which the system optics card 1500 belongs.

The mechanical front panel 1502 can also comprise k add input ports 1510-1, 1510-2, . . . 1510-k, where k is an integer equal to the number of add input ports. The k add input ports 1510-1, 1510-2, . . . 1510-k can be the same as or different from the k port inputs 486-k and 586-k shown in FIGS. 5 and 6, respectively, and can be the same as or different from the input ports shown in FIGS. 7A, 7B, 8, 9, and 10. The add input ports 1510-k can be configured to receive optical signals from one or more optical converter cards connected to a client device or devices.

The mechanical front panel 1502 can further comprise l express input ports 1512-1, . . . 1512-l, where l is an integer equal to the number of express input ports. The l express input ports 1512-1, . . . 1512-l can be the same as or different from the express input ports 434 shown in FIGS. 5 and 7A, the express input ports 534 shown in FIGS. 6 and 7B, the express input ports 734-L shown in FIG. 8, and the express input ports shown in FIGS. 9 and 10. The express input ports 1512-l can be configured to receive optical signals from one or more other optical system cards in the same optical node as the optical system card 1500.

The mechanical front panel 1502 can also comprise a line output port 1514, which can be the same as or different from the line output ports 408 and 508 shown in FIGS. 5 and 6, respectively, and can be the same as or different from the line output ports shown in FIGS. 7A, 7B, 8, 9, and 10. The line output port 1514 can be configured to deliver optical signals to one or more optical nodes that are different from the optical node to which the system optics card 1500 belongs.

The mechanical front panel 1502 can further comprise k drop output ports 1516-1, 1516-2, . . . 1516-k, where k is an integer equal to the number of drop output ports. The k drop output ports 1516-1, 1516-2, . . . 1516-k can be the same as or different from the k port outputs 484-k shown in FIGS. 5 and 7A, the k port outputs 584-k shown in FIGS. 6 and 7B, and the port outputs shown in FIGS. 8, 9, and 10. The drop output ports 1516-k can be configured to output optical signals to one or more optical converter cards connected to a client device or devices.

The mechanical front panel 1502 can further comprise l express output ports 1518-1, . . . 1518-l, where l is an integer equal to the number of express output ports. The l express output ports 1518-1, . . . 1518-l can be the same as or different from the express output ports 432 shown in FIGS. 5 and 7A, the express output ports 532 shown in FIGS. 6 and 7B, the express output ports 732-L shown in FIG. 8, and the express output ports shown in FIGS. 9 and 10. The express output ports 1518-l can be configured to deliver optical signals to one or more other optical system cards in the same optical node as the optical system card 1500.

The printed circuit board 1504 can comprise a single power supply 1520, a single centralized optical power monitor 1522, an optical supervisory filter 1524 for filtering an optical supervisory channel 1526 input from optical signals 1527 input on the line input port 1508, and an optical/electrical receiver 1528 that can convert the optical supervisory channel 1526 into an electrical channel, which can be processed by an optical supervisory channel processor 1532, which can also be on the printed circuit board 1504. The optical supervisory channel processor 1532 may provide control signals over an electrical channel 1534 for conversion by an electrical/optical transmitter 1536, which can also be on the printed circuit board 1504. The electrical/optical transmitter 1536 can generate an optical supervisory channel 1538 for combination with amplified channels 1540 at an optical supervisory channel filter 1542, which can also be on the printed circuit board 1504, to produce a line output signal 1544 at the line output port 1514. The optical supervisory channel processor 1532 can cooperate with a system processor 1546, which can also be on the printed circuit board 1504, in the processing and generation of optical supervisory channels.

The remaining channels of line input signal 1527 can be forwarded to an optical input amplifier 1547, which can also be on the printed circuit board 1504, over a line 1548, on the printed circuit board 1504, to be amplified by a predetermined amount of amplification. The optical input amplifier 1547 can simultaneously amplify all channels input thereinto. The amplified channels, indicated by line 1549, can be transmitted to a drop filter 1550, which can also be on the printed circuit board 1504. The drop filter 1550 can perform the functions of optical input filtering unit 216 of FIGS. 2A-2B, although it is not limited to performing these functions. The drop filter 1550 can be used to isolate individual channels. The individual channels can be (1) dropped from system optics card 1500 for transmission to a client, (2) combined with pass through channels from one or more other system optics cards for optional feedback through systems optics card 1500, (3) passed through to another system optics card for combining with other channels, and/or (4) added for transport upon receipt from a client, although the drop filter 1550 is not limited to these functions.

Certain channels from the line input signal 1527 designated for case (1) and/or case (2) can be transmitted from drop filter 1550 on lines 1552-1, 1552-2, . . . through 1552-k, which can also be provided on the printed circuit board 1504, to drop output ports 1516-1, 1516-2, through 1516-k, respectively. Each of the drop output ports 1516-1, 1516-2, through 1516-k can be connected to an individual system input port 312 on an optical converter card 310 of FIG. 4. For example, output port 1516-1 can be connected to system input port 312 of optical converter card 310. For case (3), certain channels from the line input signal 1527 can be transmitted from the drop filter 1550 on lines 1554-1, . . . 1554-l, which can also be provided on the printed circuit board 1504, to one or more of the express output ports 1518-1, . . . 1518-l for pass through to one or more system optics cards (not shown).

For case (2) and case (4), feedback channel signals and client add signals can be transmitted from the output port 328 of the optical converter card 310 in FIG. 4 to one of the add input ports 1510-1 to 1510-k of the system optics card 1500. For example, the output port 328 of optical converter card 310 in FIG. 4 may be connected to add input port 1510-1. After entering any of add input ports 1510-1 to 1510-k, the feedback channel signal and/or client add signal can be transmitted to an add filter 1556 over lines 1558-1, 1558-2, . . . to 1558-k, respectively, all of which can be provided on the printed circuit board 1504. The add filter 1556 can perform the functions of optical output filtering unit 226 of FIGS. 2A-2B, although it is not limited to performing these functions. The add filter 1556 can multiplex channels input to it from lines 1558-1, 1558-2, . . . to 1558-k to form combined channels 1560. The add filter 1556 may also receive pass through signals from a system optics card at East Side 299 through one or more of the express input ports 1512-1, . . . 1512-l over lines 1562-1, . . . 1562-l, respectively, which can be provided on the printed circuit board 1504, and can combine the pass through signals with signals on lines 1558-1 to 1558-k to form the signal 1560. The combined channels 1560 can then be amplified by an output amplifier 1564, which can also be provided on the printed circuit board 1504, by a predetermined amount of amplification to form amplified channels 1540. The amplified channels 1540 can be transmitted to the optical supervisory channel filter 1542, where the optical supervisory channel 1538 can be combined with amplified channels 1540 to form a line output signal 1544 for output from system optics card 1500 at the line output port 1514.

The system optics card implementation of FIG. 16 can eliminate some of the redundancies provided in the individual circuit pack implementation of FIGS. 3A-3G. For example, only a single power supply 1520 is needed to power the functions of system optics card 1500, and a single power monitor 1522 can be used to check various signals within system optics card 1500. A number of optical connectors may also be reduced in the implementation of system optics card 1500 as opposed to the multiple circuit pack implementation of FIGS. 3A-3G. In addition, a single signal processor 1532 and the system processor 1546 may be provided to support the functionalities of system optics card 1500, although the card 1500 is not limited to the use of one signal processor and one system processor.

The elements discussed above that may be provided on the printed circuit board 1504 may be provided on some other substrate or on multiple substrates. In addition, elements discussed above that can be provided on the printed circuit board 1504 may be the same as or different from the corresponding elements on the system optics card 450 shown in FIGS. 5 and 7A, the system optics card 550 shown in FIGS. 6 and 7B, the system optics card 750 shown in FIG. 8, and/or the system optics cards shown in FIG. 9. It is within the scope of the invention, for the system optics card 1500 to include more than or fewer than the number of components shown in FIG. 16. It is further within the scope of the invention for any of the components of the system optics card shown in FIG. 16 to be replaced by any other suitable component (or components) that performs (or perform) the functions thereof, as discussed above.

Figure 17:
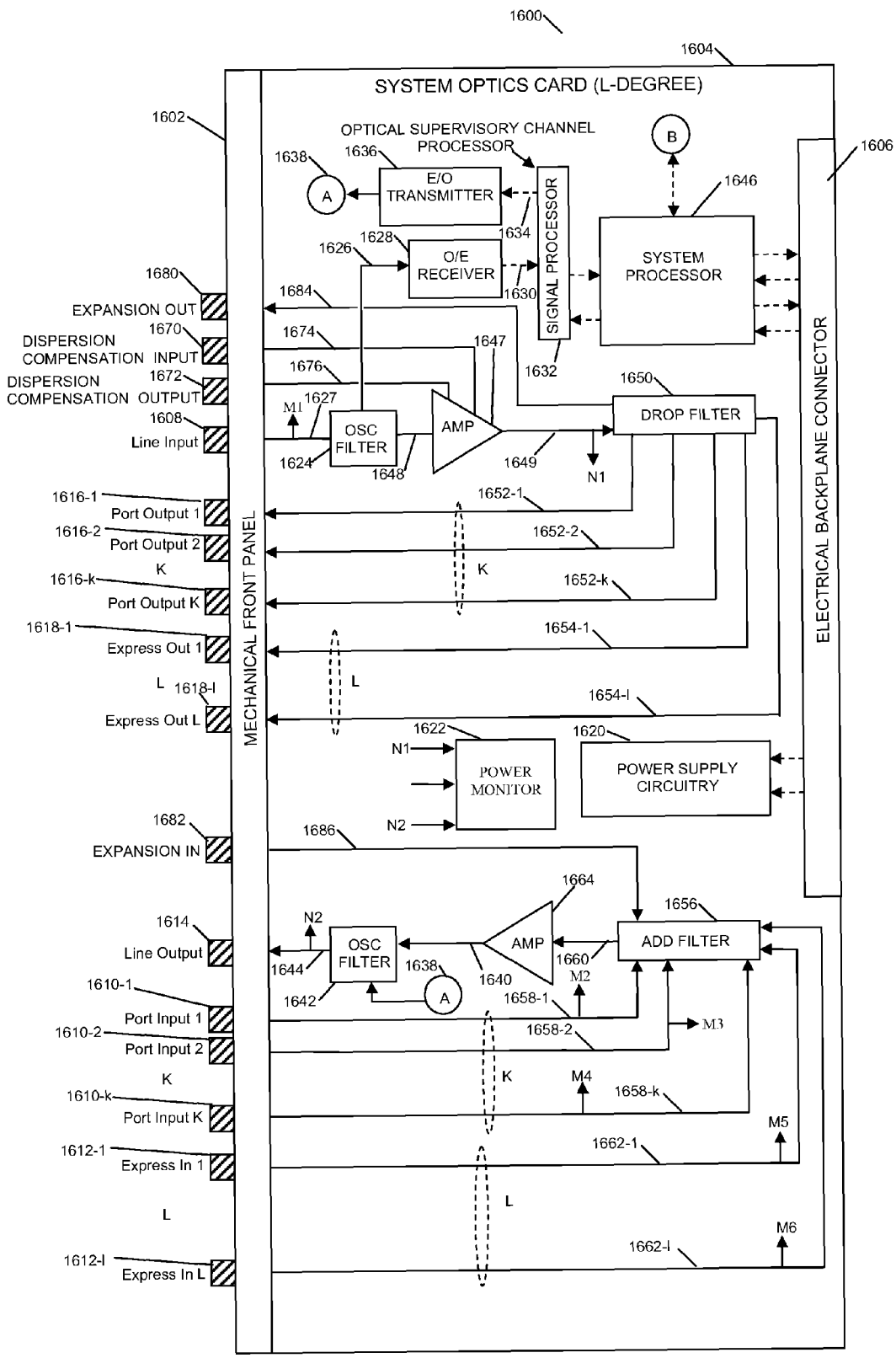
FIG. 17 is a functional block diagram of an example embodiment of a systems optics card having a mechanical front panel and an electrical backplane connector with dispersion compensation optical connectors and expansion in and expansion out optical connectors.

FIG. 17 illustrates another example embodiment of a system optics card, card 1600. This system optics card 1600 can be the same as, for example, the system optics card 1400, except for the addition of:

1) a dispersion compensation system comprising a dispersion compensation input port 1670, a dispersion compensation output port 1672, and lines 1674 and 1676, respectively connecting these ports to the amplifier 1647; and
2) an expansion port system comprising an expansion output port 1680, an expansion input port 1682, and lines 1684 and 1686, respectively connecting these ports to the drop filter 1650 and the add filter 1656.

In addition, the system optics card 1600 can be the same as, for example, the system optics card 1500, except for the addition of the expansion port system comprising the expansion output port 1680, the expansion input port 1682, and lines 1684 and 1686, respectively connecting these ports to the drop filter 1650 and the add filter 1656.

The dispersion compensation input port 1670 and the dispersion compensation output port 1672 can be connected to a chromatic dispersion compensator (not shown). The chromatic dispersion compensator can be configured to compensate for the optical impairment known as chromatic dispersion in the optical signals input via the line input port 1608. The chromatic dispersion compensator can be placed before the input amplifier 1647, or between stage 1 and stage 2 of a two stage input amplifier. The chromatic dispersion compensator can be a roll of dispersion compensation fiber, although it is not limited to this structure. The expansion output port 1680 and the expansion input port 1682 can be configured to be connected to one or more colored or colorless expansion circuit packs (not shown). The expansion circuit pack connected to the expansion output port 1680 contains additional drop output ports and the expansion circuit pack connected to the expansion input port 1682 contains additional add input ports, thereby providing. additional add input ports and drop output ports to the system optics card 1600. It is within the scope of the invention for the other components of the system optics card 1600 to be different from the components of optics card 1400, and in this case, the components of the optics card 1400 would be replaced by any other suitable component (or components) that performs (or perform) the functions thereof to manufacture the system optics card 1600. It should be understood that the card 1600 is not limited to being identical to the optical card 1400 except for the addition of the dispersion compensation system and the expansion port system noted above and can be different therefrom by containing more than or fewer than the number of components of the card 1400.

The system optics card 1600 can comprise a mechanical front panel 1602, a main circuit body on a single substrate such as, for example, a printed circuit board 1604, and an electrical backplane connector 1606, although it is not limited to these components. The printed circuit board 1604 can be the same as or different from the printed circuit board 452 shown in FIG. 5, the printed circuit board 552 shown in FIG. 6, and the printed circuit boards shown in FIGS. 7A, 7B, 8 and 9. The system optics card 1600 can be connected to a chassis for housing the system optics card, other system optics cards, and/or other optics cards (not shown), for example, via the electrical backplane connector 1606, which provides a mechanical and electrical connection to the chassis. The system optics card 1600 can be configured to slide into such a chassis to provide the electrical and mechanical connection thereto, although it is not limited to such an operation to mount it to a chassis. The mechanical front panel 1602 and the electrical backplane connector 1606 can be the same as or different from the mechanical front panel and the electrical backplane connector shown in FIGS. 3A-3G and 4.

The mechanical front panel 1602 can comprise a line input port 1608, which can be the same as or different from the line input ports 462 and 562 shown in FIGS. 5 and 6, respectively, and can be the same as or different from the line input ports shown in FIGS. 7A, 7B, 8, 9, and 10. The line input port 1608 is configured to receive optical signals from other optical nodes that are different from the optical node to which the system optics card 1600 belongs.

The mechanical front panel 1602 can also comprise k add input ports 1610-1, 1610-2, . . . 1610-k, where k is an integer equal to the number of add input ports. The k add input ports 1610-1, 1610-2, . . . 1610-k can be the same as or different from the k port inputs 486-k and 586-k shown in FIGS. 5 and 6, respectively, and can be the same as or different from the input ports shown in FIGS. 7A, 7B, 8, 9, and 10. The add input ports 1610-k can be configured to receive optical signals from one or more optical converter cards connected to a client device or devices.

The mechanical front panel 1602 can further comprise l express input ports 1612-1, . . . 1612-l, where l is an integer equal to the number of express input ports. The l express input ports 1612-1, . . . 1612-l can be the same as or different from the express input ports 434 shown in FIGS. 5 and 7A, the express input ports 534 shown in FIGS. 6 and 7B, the express input ports 734-L shown in FIG. 8, and the express input ports shown in FIGS. 9 and 10. The express input ports 1612-l can be configured to receive optical signals from one or more other optical system cards in the same optical node as the optical system card 1600.

The mechanical front panel 1602 can also comprise a line output port 1614, which can be the same as or different from the line output ports 408 and 508 shown in FIGS. 5 and 6, respectively, and can be the same as or different from the line output ports shown in FIGS. 7A, 7B, 8, 9, and 10. The line output port 1614 can be configured to deliver optical signals to one or more optical nodes that are different from the optical node to which the system optics card 1600 belongs.

The mechanical front panel 1602 can further comprise k drop output ports 1616-1, 1616-2, . . . 1616-k, where k is an integer equal to the number of drop output ports. The k drop output ports 1616-1, 1616-2, . . . 1616-k can be the same as or different from the k port outputs 484-k shown in FIGS. 5 and 7A, the k port outputs 584-k shown in FIGS. 6 and 7B, and the port outputs shown in FIGS. 8, 9, and 10. The drop output ports 1616-k can be configured to output optical signals to one or more optical converter cards connected to a client device or devices.

The mechanical front panel 1602 can further comprise l express output ports 1618-1, . . . 1618-l, where l is an integer equal to the number of express output ports. The l express output ports 1618-1, . . . 1618-l can be the same as or different from the express output ports 432 shown in FIGS. 5 and 7A, the express output ports 532 shown in FIGS. 6 and 7B, the express output ports 732-L shown in FIG. 8, and the express output ports shown in FIGS. 9 and 10. The express output ports 1618-l can be configured to deliver optical signals to one or more other optical system cards in the same optical node as the optical system card 1600.

The printed circuit board 1604 can comprise a single power supply 1620, a single centralized optical power monitor 1622, an optical supervisory filter 1624 for filtering an optical supervisory channel 1626 input from optical signals 1627 input on the line input port 1608, and an optical/electrical receiver 1628 that can convert the optical supervisory channel 1626 into an electrical channel, which can be processed by an optical supervisory channel processor 1632, which can also be on the printed circuit board 1604. The optical supervisory channel processor 1632 may provide control signals over an electrical channel 1634 for conversion by an electrical/optical transmitter 1636, which can also be on the printed circuit board 1604. The electrical/optical transmitter 1636 can generate an optical supervisory channel 1638 for combination with amplified channels 1640 at an optical supervisory channel filter 1642, which can also be on the printed circuit board 1604, to produce a line output signal 1644 at the line output port 1614. The optical supervisory channel processor 1632 can cooperate with a system processor 1646, which can also be on the printed circuit board 1604, in the processing and generation of optical supervisory channels.

The remaining channels of line input signal 1627 can be forwarded to an optical input amplifier 1647, which can also be on the printed circuit board 1604, over a line 1648, on the printed circuit board 1604, to be amplified by a predetermined amount of amplification. The optical input amplifier 1647 can simultaneously amplify all channels input thereinto. The amplified channels, indicated by line 1649, can be transmitted to a drop filter 1650, which can also be on the printed circuit board 1604. The drop filter 1650 can perform the functions of optical input filtering unit 216 of FIGS. 2A-2B, although it is not limited to performing these functions. The drop filter 1650 can be used to isolate individual channels. The individual channels can be (1) dropped from system optics card 1600 for transmission to a client, (2) combined with pass through channels from one or more other system optics cards for optional feedback through systems optics card 1600, (3) passed through to another system optics card for combining with other channels, and/or (4) added for transport upon receipt from a client, although the drop filter 1650 is not limited to these functions.

Certain channels from the line input signal 1627 designated for case (1) and/or case (2) can be transmitted from drop filter 1650 on lines 1652-1, 1652-2, . . . through 1652-k, which can also be provided on the printed circuit board 1604, to drop output ports 1616-1, 1616-2, through 1616-k, respectively. Each of the drop output ports 1616-1, 1616-2, through 1616-k can be connected to an individual system input port 312 on an optical converter card 310 of FIG. 4. For example, output port 1616-1 can be connected to system input port 312 of optical converter card 310. For case (3), certain channels from the line input signal 1627 can be transmitted from the drop filter 1650 on lines 1654-1, . . . 1654-l, which can also be provided on the printed circuit board 1604, to one or more of the express output ports 1618-1, . . . 1618-l for pass through to one or more system optics cards (not shown).

For case (2) and case (4), feedback channel signals and client add signals can be transmitted from the output port 328 of the optical converter card 310 in FIG. 4 to one of the add input ports 1610-1 to 1610-k of the system optics card 1600. For example, the output port 328 of optical converter card 310 in FIG. 4 may be connected to add input port 1610-1. After entering any of add input ports 1610-1 to 1610-k, the feedback channel signal and/or client add signal can be transmitted to an add filter 1656 over lines 1658-1, 1658-2, . . . to 1658-k, respectively, all of which can be provided on the printed circuit board 1604. The add filter 1656 can perform the functions of optical output filtering unit 226 of FIGS. 2A-2B, although it is not limited to performing these functions. The add filter 1656 can multiplex channels input to it from lines 1658-1, 1658-2, . . . to 1658-k to form combined channels 1660. The add filter 1656 may also receive pass through signals from a system optics card at East Side 299 through one or more of the express input ports 1612-1, . . . 1612-l over lines 1662-1, . . . 1662-l, respectively, which can be provided on the printed circuit board 1604, and can combine the pass through signals with signals on lines 1658-1 to 1658-k to form the signal 1660. The combined channels 1660 can then be amplified by an output amplifier 1664, which can also be provided on the printed circuit board 1604, by a predetermined amount of amplification to form amplified channels 1640. The amplified channels 1640 can be transmitted to the optical supervisory channel filter 1642, where the optical supervisory channel 1638 can be combined with amplified channels 1640 to form a line output signal 1644 for output from system optics card 1600 at the line output port 1614.

The system optics card implementation of FIG. 17 can eliminate some of the redundancies provided in the individual circuit pack implementation of FIGS. 3A-3G. For example, only a single power supply 1620 is needed to power the functions of system optics card 1600, and a single power monitor 1622 can be used to check various signals within system optics card 1600. A number of optical connectors may also be reduced in the implementation of system optics card 1600 as opposed to the multiple circuit pack implementation of FIGS. 3A-3G. In addition, a single signal processor 1632 and the system processor 1646 may be provided to support the functionalities of system optics card 1600, although the card 1600 is not limited to the use of one signal processor and one system processor.

The elements discussed above that may be provided on the printed circuit board 1604 may be provided on some other substrate or on multiple substrates. In addition, elements discussed above that can be provided on the printed circuit board 1604 may be the same as or different from the corresponding elements on the system optics card 450 shown in FIGS. 5 and 7A, the system optics card 550 shown in FIGS. 6 and 7B, the system optics card 750 shown in FIG. 8, and/or the system optics cards shown in FIG. 9. It is within the scope of the invention, for the system optics card 1600 to include more than or fewer than the number of components shown in FIG. 17. It is further within the scope of the invention for any of the components of the system optics card shown in FIG. 17 to be replaced by any other suitable component (or components) that performs (or perform) the functions thereof, as discussed above.

Figure 18:
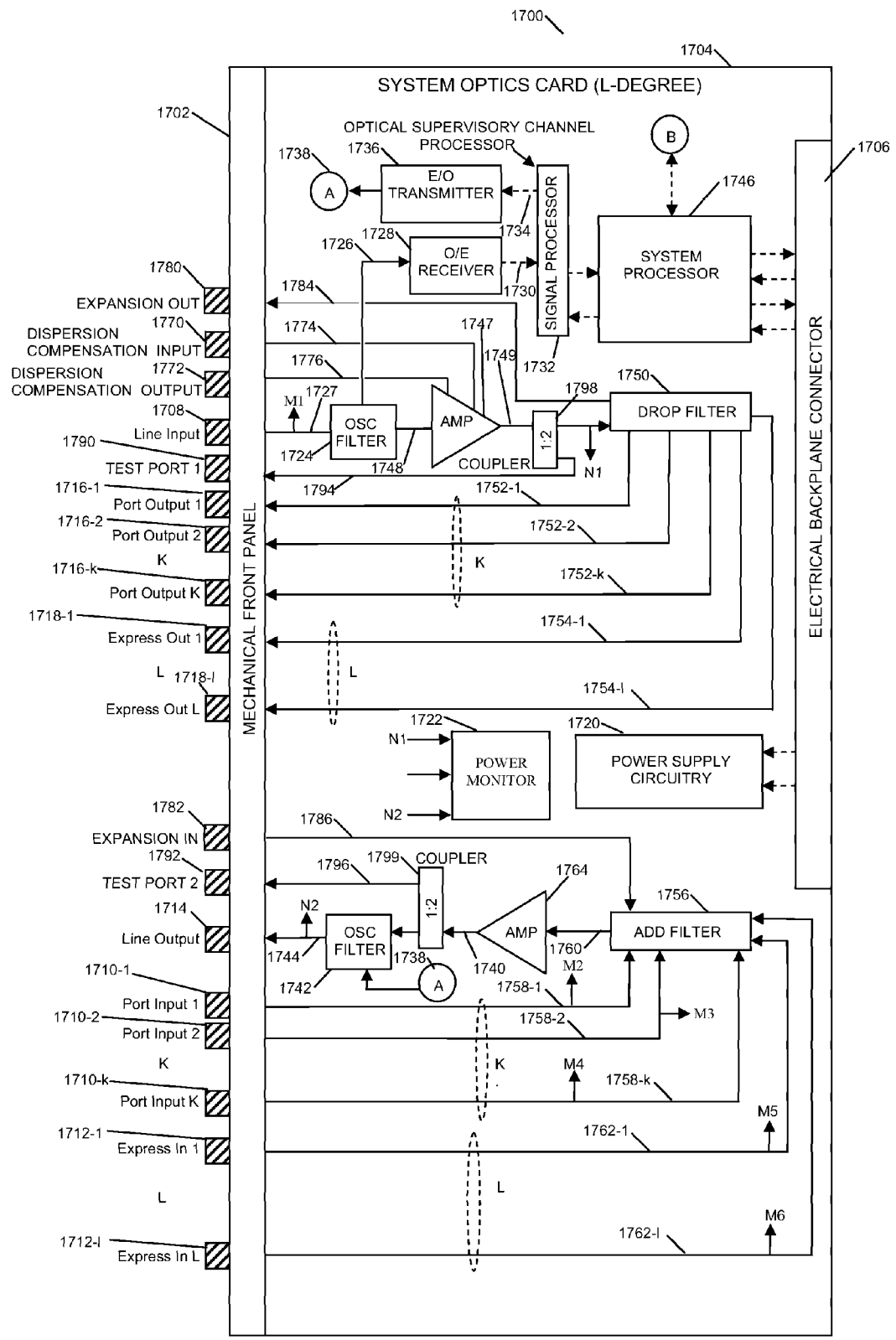
FIG. 18 is a functional block diagram of still another example embodiment of a systems optics card having a mechanical front panel and an electrical backplane connector with dispersion compensation optical connectors, expansion in and expansion out optical connectors, and test port optical connectors.

FIG. 18 illustrates another example embodiment of a system optics card, card 1700. This system optics card 1700 can be the same as, for example, the system optics card 1400, except for the addition of:

1) a dispersion compensation system comprising a dispersion compensation input port 1770, a dispersion compensation output port 1772, and lines 1774 and 1776, respectively connecting these ports to the amplifier 1747;
2) an expansion port system comprising an expansion output port 1780, an expansion input port 1782, and lines 1784 and 1786, respectively connecting these ports to the drop filter 1750 and the add filter 1756; and
3) a test port system comprising a test output port 1790, a test output port 1792, and lines 1794 and 1796, respectively connecting these ports to 1:2 optical couplers 1798 and 1799, which are respectively connected to the output of amplifiers 1747 and 1764.

In addition, the system optics card 1700 can be the same as, for example, the system optics card 1600, except for the addition of a test port system comprising the test output port 1790, the test input port 1792, and lines 1794 and 1796, respectively connecting these ports to 1:2 optical couplers 1798 and 1799, which are respectively connected to the output of amplifiers 1747 and 1764.

The dispersion compensation input port 1770 and the dispersion compensation output port 1772 can be connected to a chromatic dispersion compensator (not shown). The chromatic dispersion compensator can be configured to compensate for the optical impairment known as chromatic dispersion in the optical signals input via the line input port 1708. The chromatic dispersion compensator can be placed before the input amplifier 1747, or between stage 1 and stage 2 of a two stage input amplifier. The chromatic dispersion compensator can be a roll of dispersion compensation fiber, although it is not limited to this structure.

The expansion output port 1780 and the expansion input port 1782 can be configured to be connected to one or more colored or colorless expansion circuit packs (not shown). The expansion circuit pack connected to the expansion output port 1780 contains additional drop output ports and the expansion circuit pack connected to the expansion input port 1782 contains additional add input ports, thereby providing additional add input ports and drop output ports to the system optics card 1700.

The test output ports 1790 and 1792 output signals from amplifiers 1747 and 1764 (via 1:2 optical couplers 1798 and 1799) to a piece of test gear (not shown) in order to manually monitor signals on the system optics card. It should be understood that it is within the scope of the invention to monitor other points on the system optics card 1700 in addition to or instead of the outputs of amplifiers 1747 and 1764.

It is within the scope of the invention for the other components of the system optics card 1700 to be different from the components of optics card 1400, and in this case, the components of the optics card 1400 would be replaced by any other suitable component (or components) that performs (or perform) the functions thereof to manufacture the system optics card 1700. It should be understood that the card 1700 is not limited to being identical to the optical card 1400 except for the addition of the dispersion compensation system, the expansion port system, and the test port system noted above and can be different therefrom by containing more than or fewer than the number of components of the card 1400.

The system optics card 1700 can comprise a mechanical front panel 1702, a main circuit body on a single substrate such as, for example, a printed circuit board 1704, and an electrical backplane connector 1706, although it is not limited to these components. The printed circuit board 1704 can be the same as or different from the printed circuit board 452 shown in FIG. 5, the printed circuit board 552 shown in FIG. 6, and the printed circuit boards shown in FIGS. 7A, 7B, 8 and 9. The system optics card 1700 can be connected to a chassis for housing the system optics card, other system optics cards, and/or other optics cards (not shown), for example, via the electrical backplane connector 1706, which provides a mechanical and electrical connection to the chassis. The system optics card 1700 can be configured to slide into such a chassis to provide the electrical and mechanical connection thereto, although it is not limited to such an operation to mount it to a chassis. The mechanical front panel 1702 and the electrical backplane connector 1706 can be the same as or different from the mechanical front panel and the electrical backplane connector shown in FIGS. 3A-3G and 4.

The mechanical front panel 1702 can comprise a line input port 1708, which can be the same as or different from the line input ports 462 and 562 shown in FIGS. 5 and 6, respectively, and can be the same as or different from the line input ports shown in FIGS. 7A, 7B, 8, 9, and 10. The line input port 1708 is configured to receive optical signals from other optical nodes that are different from the optical node to which the system optics card 1700 belongs.

The mechanical front panel 1702 can also comprise k add input ports 1710-1, 1710-2, . . . 1710-k, where k is an integer equal to the number of add input ports. The k add input ports 1710-1, 1710-2, . . . 1710-k can be the same as or different from the k port inputs 486-k and 586-k shown in FIGS. 5 and 6, respectively, and can be the same as or different from the input ports shown in FIGS. 7A, 7B, 8, 9, and 10. The add input ports 1710-k can be configured to receive optical signals from one or more optical converter cards connected to a client device or devices.

The mechanical front panel 1702 can further comprise l express input ports 1712-1, . . . 1712-l, where l is an integer equal to the number of express input ports. The l express input ports 1712-1, . . . 1712-l can be the same as or different from the express input ports 434 shown in FIGS. 5 and 7A, the express input ports 534 shown in FIGS. 6 and 7B, the express input ports 734-L shown in FIG. 8, and the express input ports shown in FIGS. 9 and 10. The express input ports 1712-l can be configured to receive optical signals from one or more other optical system cards in the same optical node as the optical system card 1700.

The mechanical front panel 1702 can also comprise a line output port 1714, which can be the same as or different from the line output ports 408 and 508 shown in FIGS. 5 and 6, respectively, and can be the same as or different from the line output ports shown in FIGS. 7A, 7B, 8, 9, and 10. The line output port 1714 can be configured to deliver optical signals to one or more optical nodes that are different from the optical node to which the system optics card 1700 belongs.

The mechanical front panel 1702 can further comprise k drop output ports 1716-1, 1716-2, . . . 1716-k, where k is an integer equal to the number of drop output ports. The k drop output ports 1716-1, 1716-2, . . . 1716-k can be the same as or different from the k port outputs 484-k shown in FIGS. 5 and 7A, the k port outputs 584-k shown in FIGS. 6 and 7B, and the port outputs shown in FIGS. 8, 9, and 10. The drop output ports 1716-k can be configured to output optical signals to one or more optical converter cards connected to a client device or devices.

The mechanical front panel 1702 can further comprise l express output ports 1718-1, . . . 1718-l, where l is an integer equal to the number of express output ports. The l express output ports 1718-1, . . . 1718-l can be the same as or different from the express output ports 432 shown in FIGS. 5 and 7A, the express output ports 532 shown in FIGS. 6 and 7B, the express output ports 732-L shown in FIG. 8, and the express output ports shown in FIGS. 9 and 10. The express output ports 1718-l can be configured to deliver optical signals to one or more other optical system cards in the same optical node as the optical system card 1700.

The printed circuit board 1704 can comprise a single power supply 1720, a single centralized optical power monitor 1722, an optical supervisory filter 1724 for filtering an optical supervisory channel 1726 input from optical signals 1727 input on the line input port 1708, and an optical/electrical receiver 1728 that can convert the optical supervisory channel 1726 into an electrical channel, which can be processed by an optical supervisory channel processor 1732, which can also be on the printed circuit board 1704. The optical supervisory channel processor 1732 may provide control signals over an electrical channel 1734 for conversion by an electrical/optical transmitter 1736, which can also be on the printed circuit board 1704. The electrical/optical transmitter 1736 can generate an optical supervisory channel 1738 for combination with amplified channels 1740 at an optical supervisory channel filter 1742, which can also be on the printed circuit board 1704, to produce a line output signal 1744 at the line output port 1714. The optical supervisory channel processor 1732 can cooperate with a system processor 1746, which can also be on the printed circuit board 1704, in the processing and generation of optical supervisory channels.

The remaining channels of line input signal 1727 can be forwarded to an optical input amplifier 1747, which can also be on the printed circuit board 1704, over a line 1748, on the printed circuit board 1704, to be amplified by a predetermined amount of amplification. The optical input amplifier 1747 can simultaneously amplify all channels input thereinto. The amplified channels, indicated by line 1749, can be transmitted to a drop filter 1750, which can also be on the printed circuit board 1704. The drop filter 1750 can perform the functions of optical input filtering unit 216 of FIGS. 2A-2B, although it is not limited to performing these functions. The drop filter 1750 can be used to isolate individual channels. The individual channels can be (1) dropped from system optics card 1700 for transmission to a client, (2) combined with pass through channels from one or more other system optics cards for optional feedback through systems optics card 1700, (3) passed through to another system optics card for combining with other channels, and/or (4) added for transport upon receipt from a client, although the drop filter 1750 is not limited to these functions.

Certain channels from the line input signal 1727 designated for case (1) and/or case (2) can be transmitted from drop filter 1750 on lines 1752-1, 1752-2, . . . through 1752-k, which can also be provided on the printed circuit board 1704, to drop output ports 1716-1, 1716-2, through 1716-k, respectively. Each of the drop output ports 1716-1, 1716-2, through 1716-k can be connected to an individual system input port 312 on an optical converter card 310 of FIG. 4. For example, output port 1716-1 can be connected to system input port 312 of optical converter card 310. For case (3), certain channels from the line input signal 1727 can be transmitted from the drop filter 1750 on lines 1754-1, . . . 1754-l, which can also be provided on the printed circuit board 1704, to one or more of the express output ports 1718-1, . . . 1718-l for pass through to one or more system optics cards (not shown).

For case (2) and case (4), feedback channel signals and client add signals can be transmitted from the output port 328 of the optical converter card 310 in FIG. 4 to one of the add input ports 1710-1 to 1710-k of the system optics card 1700. For example, the output port 328 of optical converter card 310 in FIG. 4 may be connected to add input port 1710-1. After entering any of add input ports 1710-1 to 1710-k, the feedback channel signal and/or client add signal can be transmitted to an add filter 1756 over lines 1758-1, 1758-2, . . . to 1758-k, respectively, all of which can be provided on the printed circuit board 1704. The add filter 1756 can perform the functions of optical output filtering unit 226 of FIGS. 2A-2B, although it is not limited to performing these functions. The add filter 1756 can multiplex channels input to it from lines 1758-1, 1758-2, . . . to 1758-k to form combined channels 1760. The add filter 1756 may also receive pass through signals from a system optics card at East Side 299 through one or more of the express input ports 1712-1, . . . 1712-l over lines 1762-1, . . . 1762-l, respectively, which can be provided on the printed circuit board 1704, and can combine the pass through signals with signals on lines 1758-1 to 1758-k to form the signal 1760. The combined channels 1760 can then be amplified by an output amplifier 1764, which can also be provided on the printed circuit board 1704, by a predetermined amount of amplification to form amplified channels 1740. The amplified channels 1740 can be transmitted to the optical supervisory channel filter 1742, where the optical supervisory channel 1738 can be combined with amplified channels 1740 to form a line output signal 1744 for output from system optics card 1700 at the line output port 1714.

The system optics card implementation of FIG. 18 can eliminate some of the redundancies provided in the individual circuit pack implementation of FIGS. 3A-3G. For example, only a single power supply 1720 is needed to power the functions of system optics card 1700, and a single power monitor 1722 can be used to check various signals within system optics card 1700. A number of optical connectors may also be reduced in the implementation of system optics card 1700 as opposed to the multiple circuit pack implementation of FIGS. 3A-3G. In addition, a single signal processor 1732 and the system processor 1746 may be provided to support the functionalities of system optics card 1700, although the card 1700 is not limited to the use of one signal processor and one system processor.

The elements discussed above that may be provided on the printed circuit board 1704 may be provided on some other substrate or on multiple substrates. In addition, elements discussed above that can be provided on the printed circuit board 1704 may be the same as or different from the corresponding elements on the system optics card 450 shown in FIGS. 5 and 7A, the system optics card 550 shown in FIGS. 6 and 7B, the system optics card 750 shown in FIG. 8, and/or the system optics cards shown in FIG. 9. It is within the scope of the invention, for the system optics card 1700 to include more than or fewer than the number of components shown in FIG. 18. It is further within the scope of the invention for any of the components of the system optics card 1700 shown in FIG. 18 to be replaced by any other suitable component (or components) that performs (or perform) the functions thereof, as discussed above.

Figure 19:
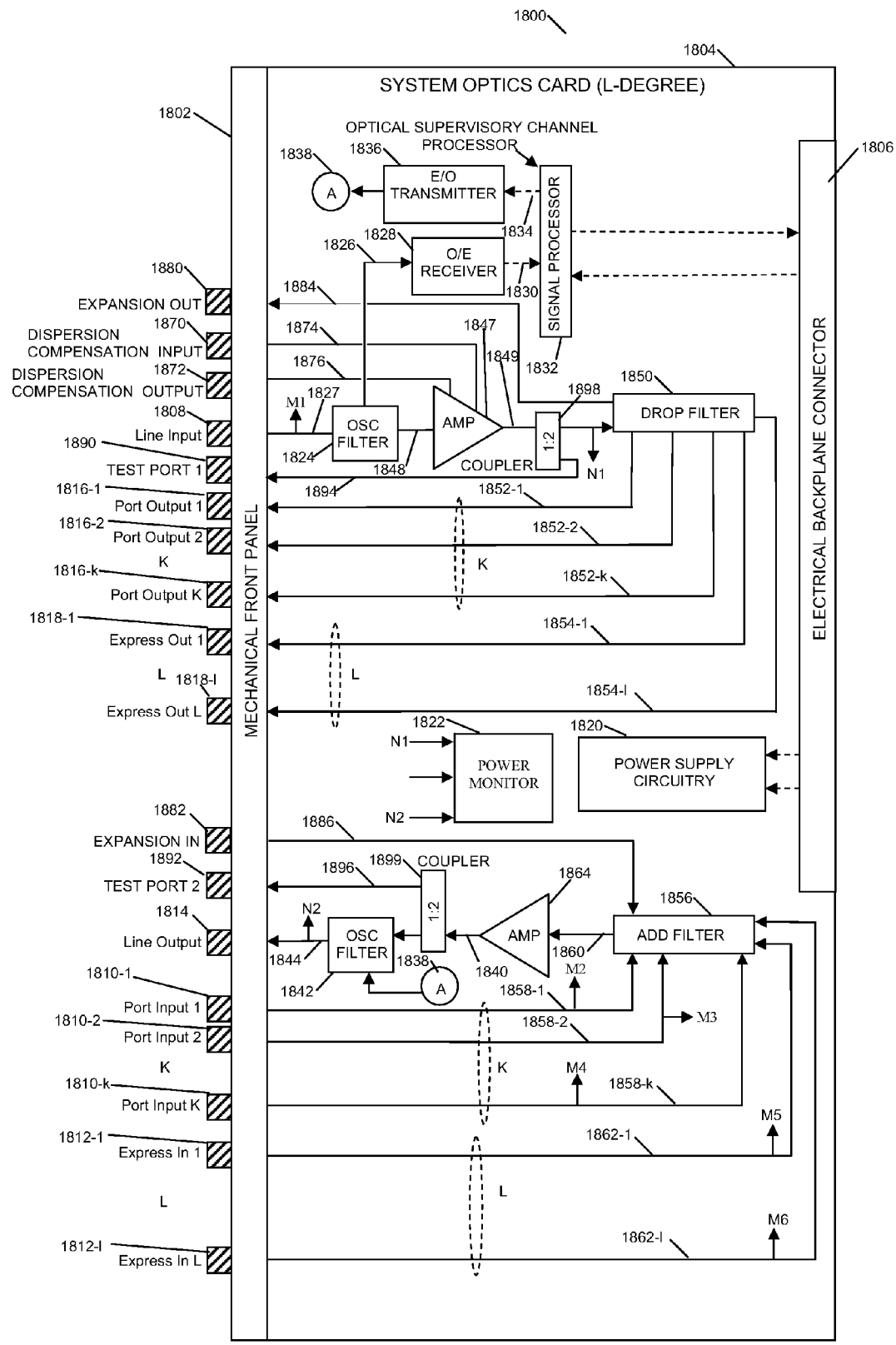
FIG. 19 is a functional block diagram of yet another example embodiment of a systems optics card having a mechanical front panel and an electrical backplane connector with dispersion compensation optical connectors, expansion in and expansion out optical connectors, and test port optical connectors and without a system processor.

FIG. 19 illustrates another example embodiment of a system optics card, card 1800. This system optics card 1800 can be the same as, for example, the system optics card 1700 shown in FIG. 18, except that it does not include a system processor, such as the system processor 1746 shown in FIG. 18. But it should be understood that the card 1800 is not limited to being identical to the optical card 1700 except for the absence of the system processor and can be different therefrom by containing more than or fewer than the number of components of the card 1700. It is also within the scope of the invention for any of the system optics cards 1400, 1500, 1600, and 1700 not to include the system processor shown in FIGS. 15-18.

It is also within the scope of the invention for the other components of the system optics card 1800 to be different from the components of optics card 1700, and in this case, the components of the optics card 1700 would be replaced by any other suitable component (or components) that performs (or perform) the functions thereof to manufacture the system optics card 1800.

The system optics card 1800 can comprise a mechanical front panel 1802, a main circuit body on a single substrate such as, for example, a printed circuit board 1804, and an electrical backplane connector 1806, although it is not limited to these components. The printed circuit board 1804 can be the same as or different from the printed circuit board 452 shown in FIG. 5, the printed circuit board 552 shown in FIG. 6, and the printed circuit boards shown in FIGS. 7A, 7B, 8 and 9. The system optics card 1800 can be connected to a chassis for housing the system optics card, other system optics cards, and/or other optics cards (not shown), for example, via the electrical backplane connector 1806, which provides a mechanical and electrical connection to the chassis. The system optics card 1800 can be configured to slide into such a chassis to provide the electrical and mechanical connection thereto, although it is not limited to such an operation to mount it to a chassis. The mechanical front panel 1802 and the electrical backplane connector 1806 can be the same as or different from the mechanical front panel and the electrical backplane connector shown in FIGS. 3A-3G and 4.

The mechanical front panel 1802 can comprise a line input port 1808, which can be the same as or different from the line input ports 462 and 562 shown in FIGS. 5 and 6, respectively, and can be the same as or different from the line input ports shown in FIGS. 7A, 7B, 8, 9, and 10. The line input port 1808 is configured to receive optical signals from other optical nodes that are different from the optical node to which the system optics card 1800 belongs.

The mechanical front panel 1802 can also comprise k add input ports 1810-1, 1810-2, ... 1810-k, where k is an integer equal to the number of add input ports. The k add input ports 1810-1, 1810-2, ... 1810-k can be the same as or different from the k port inputs 486-k and 586-k shown in FIGS. 5 and 6, respectively, and can be the same as or different from the input ports shown in FIGS. 7A, 7B, 8, 9, and 10. The add input ports 1810-k can be configured to receive optical signals from one or more optical converter cards connected to a client device or devices.

The mechanical front panel 1802 can further comprise l express input ports 1812-1, ... 1812-l, where l is an integer equal to the number of express input ports. The l express input ports 1812-1, ... 1812-l can be the same as or different from the express input ports 434 shown in FIGS. 5 and 7A, the express input ports 534 shown in FIGS. 6 and 7B, the express input ports 734-L shown in FIG. 8, and the express input ports shown in FIGS. 9 and 10. The express input ports 1812-l can be configured to receive optical signals from one or more other optical system cards in the same optical node as the optical system card 1800.

The mechanical front panel 1802 can also comprise a line output port 1814, which can be the same as or different from the line output ports 408 and 508 shown in FIGS. 5 and 6, respectively, and can be the same as or different from the line output ports shown in FIGS. 7A, 7B, 8, 9, and 10. The line output port 1814 can be configured to deliver optical signals to one or more optical nodes that are different from the optical node to which the system optics card 1800 belongs.

The mechanical front panel 1802 can further comprise k drop output ports 1816-1, 1816-2, ... 1816-k, where k is an integer equal to the number of drop output ports. The k drop output ports 1816-1, 1816-2, ... 1816-k can be the same as or different from the k port outputs 484-k shown in FIGS. 5 and 7A, the k port outputs 584-k shown in FIGS. 6 and 7B, and the port outputs shown in FIGS. 8, 9, and 10. The drop output ports 1816-k can be configured to output optical signals to one or more optical converter cards connected to a client device or devices.

The mechanical front panel 1802 can further comprise l express output ports 1818-1, ... 1818-l, where l is an integer equal to the number of express output ports. The l express output ports 1818-1, ... 1818-l can be the same as or different from the express output ports 432 shown in FIGS. 5 and 7A, the express output ports 532 shown in FIGS. 6 and 7B, the express output ports 732-L shown in FIG. 8, and the express output ports shown in FIGS. 9 and 10. The express output ports 1818-l can be configured to deliver optical signals to one or more other optical system cards in the same optical node as the optical system card 1800.

The printed circuit board 1804 can comprise a single power supply 1820, a single centralized optical power monitor 1822, an optical supervisory filter 1824 for filtering an optical supervisory channel 1826 input from optical signals 1827 input on the line input port 1808, and an optical/electrical receiver 1828 that can convert the optical supervisory channel 1826 into an electrical channel, which can be processed by an optical supervisory channel processor 1832, which can also be on the printed circuit board 1804. The optical supervisory channel processor 1832 may provide control signals over an electrical channel 1834 for conversion by an electrical/optical transmitter 1836, which can also be on the printed circuit board 1804. The electrical/optical transmitter 1836 can generate an optical supervisory channel 1838 for combination with amplified channels 1840 at an optical supervisory channel filter 1842, which can also be on the printed circuit board 1804, to produce a line output signal 1844 at the line output port 1814. The optical supervisory channel processor 1832 can cooperate with a system processor 1846, which can also be on the printed circuit board 1804, in the processing and generation of optical supervisory channels.

The remaining channels of line input signal 1827 can be forwarded to an optical input amplifier 1847, which can also be on the printed circuit board 1804, over a line 1848, on the printed circuit board 1804, to be amplified by a predetermined amount of amplification. The optical input amplifier 1847 can simultaneously amplify all channels input thereinto. The amplified channels, indicated by line 1849, can be transmitted to a drop filter 1850, which can also be on the printed circuit board 1804. The drop filter 1850 can perform the functions of optical input filtering unit 216 of FIGS. 2A-2B, although it is not limited to performing these functions. The drop filter 1850 can be used to isolate individual channels. The individual channels can be (1) dropped from system optics card 1800 for transmission to a client, (2) combined with pass through channels from one or more other system optics cards for optional feedback through systems optics card 1800, (3) passed through to another system optics card for combining with other channels, and/or (4) added for transport upon receipt from a client, although the drop filter 1850 is not limited to these functions.

Certain channels from the line input signal 1827 designated for case (1) and/or case (2) can be transmitted from drop filter 1850 on lines 1852-1, 1852-2, ... through 1852-k, which can also be provided on the printed circuit board 1804, to drop output ports 1816-1, 1816-2, through 1816-k, respectively. Each of the drop output ports 1816-1, 1816-2, through 1816-k can be connected to an individual system input port 312 on an optical converter card 310 of FIG. 4. For example, output port 1816-1 can be connected to system input port 312 of optical converter card 310. For case (3), certain channels from the line input signal 1827 can be transmitted from the drop filter 1850 on lines 1854-1, ... 1854-l, which can also be provided on the printed circuit board 1804, to one or more of the express output ports 1818-1, ... 1818-l for pass through to one or more system optics cards (not shown).

For case (2) and case (4), feedback channel signals and client add signals can be transmitted from the output port 328 of the optical converter card 310 in FIG. 4 to one of the add input ports 1810-1 to 1810-k of the system optics card 1800. For example, the output port 328 of optical converter card 310 in FIG. 4 may be connected to add input port 1810-1. After entering any of add input ports 1810-1 to 1810-k, the feedback channel signal and/or client add signal can be transmitted to an add filter 1856 over lines 1858-1, 1858-2, ... to 1858-k, respectively, all of which can be provided on the printed circuit board 1804. The add filter 1856 can perform the functions of optical output filtering unit 226 of FIGS. 2A-2B, although it is not limited to performing these functions. The add filter 1856 can multiplex channels input to it from lines 1858-1, 1858-2, ... to 1858-k to form combined channels 1860. The add filter 1856 may also receive pass through signals from a system optics card at East Side 299 through one or more of the express input ports 1812-1, ... 1812-l over lines 1862-1, ... 1862-l, respectively, which can be provided on the printed circuit board 1804, and can combine the pass through signals with signals on lines 1858-1 to 1858-k to form the signal 1860. The combined channels 1860 can then be amplified by an output amplifier 1864, which can also be provided on the printed circuit board 1804, by a predetermined amount of amplification to form amplified channels 1840. The amplified channels 1840 can be transmitted to the optical supervisory channel filter 1842, where the optical supervisory channel 1838 can be combined with amplified channels 1840 to form a line output signal 1844 for output from system optics card 1800 at the line output port 1814.

The system optics card 1800 also includes:
1) a dispersion compensation system comprising a dispersion compensation input port 1870, a dispersion compensation output port 1872, and lines 1874 and 1876, respectively connecting these ports to the amplifier 1847;
2) an expansion port system comprising an expansion output port 1880, an expansion input port 1882, and lines 1884 and 1886, respectively connecting these ports to the drop filter 1850 and the add filter 1856; and
3) a test port system comprising a test output port 1890, a test output port 1892, and lines 1894 and 1896, respectively connecting these ports to 1:2 optical couplers 1898 and 1899, which are respectively connected to the output of amplifiers 1847 and 1864.

The dispersion compensation input port 1870 and the dispersion compensation output port 1872 can be connected to a chromatic dispersion compensator (not shown). The chromatic dispersion compensator can be configured to compensate for the optical impairment known as chromatic dispersion in the optical signals input via the line input port 1808. The chromatic dispersion compensator can be placed before the input amplifier 1847, or between stage 1 and stage 2 of a two stage input amplifier. The chromatic dispersion compensator can be a roll of dispersion compensation fiber, although it is not limited to this structure.

The expansion output port 1880 and the expansion input port 1882 can be configured to be connected to one or more colored or colorless expansion circuit packs (not shown). The expansion circuit pack connected to the expansion output port 1880 contains additional drop output ports and the expansion circuit pack connected to the expansion input port 1882 contains additional add input ports, thereby providing additional add input ports and drop output ports to the system optics card 1800.

The test output ports 1890 and 1892 output signals from amplifiers 1847 and 1864 (via 1:2 optical couplers 1898 and 1899) to a piece of test gear (not shown) in order to manually monitor signals on the system optics card. It should be understood that it is within the scope of the invention to monitor other points on the system optics card 1800 in addition to or instead of the outputs of amplifiers 1847 and 1864.

The system optics card implementation of FIG. 18 can eliminate some of the redundancies provided in the individual circuit pack implementation of FIGS. 3A-3G. For example, only a single power supply 1820 is needed to power the functions of system optics card 1800, and a single power monitor 1822 can be used to check various signals within system optics card 1800. A number of optical connectors may also be reduced in the implementation of system optics card 1800 as opposed to the multiple circuit pack implementation of FIGS. 3A-3G. In addition, a single signal processor 1832 and the system processor 1846 may be provided to support the functionalities of system optics card 1800, although the card 1800 is not limited to the use of one signal processor and one system processor.

The elements discussed above that may be provided on the printed circuit board 1804 may be provided on some other substrate or on multiple substrates. In addition, elements discussed above that can be provided on the printed circuit board 1804 may be the same as or different from the corresponding elements on the system optics card 450 shown in FIGS. 5 and 7A, the system optics card 550 shown in FIGS. 6 and 7B, the system optics card 750 shown in FIG. 8, and/or the system optics cards shown in FIG. 9. It is within the scope of the invention, for the system optics card 1800 to include more than or fewer than the number of components shown in FIG. 19. It is further within the scope of the invention for any of the components of the system optics card 1800 shown in FIG. 19 to be replaced by any other suitable component (or components) that performs (or perform) the functions thereof, as discussed above.

Figure 20:
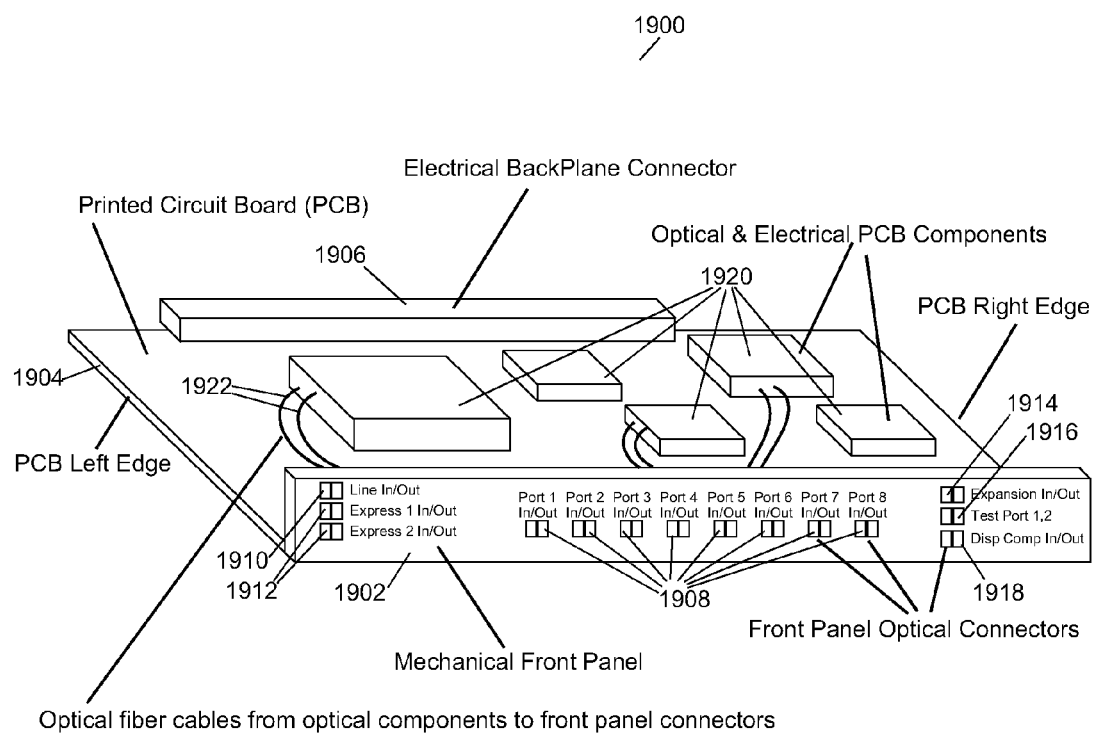
FIG. 20 is a perspective view of a system optics card having a mechanical front panel and an electrical backplane connector, such as the system optics cards shown in FIGS. 15-19.

FIG. 20 shows a perspective view of one example embodiment of a systems optics card, which can be the same as the system optics cards shown in FIGS. 15-19, or different therefrom. The system optics card 1900 can comprise a mechanical front panel 1902, a printed circuit board 1904, and an electrical backplane connector 1906, although it is not limited to these components. The mechanical front panel 1902 can comprise eight input and output ports 1908, line input and output ports 1910, two express input and output ports 1912, expansion input and output ports 1914, two test output ports 1916, and dispersion compensation input and output ports 1918, although the mechanical front panel is not limited to the number of each of these ports that are shown. Each of the input and output ports 1908 are connectable to an optical converter card that is connected to a client device to add optical signals to or receive optical signals from the card 1900. The printed circuit board 1904 supports a plurality of optical and electrical components 1920 connected to the ports of the mechanical front panel 1902 by optical fiber cables 1922. The mechanical front panel 1902 can be the same as or different from the mechanical front panels 1402, 1502, 1602, 1702, and 1802 shown in FIGS. 15-19, respectively. The printed circuit board 1904 can be the same as or different from the printed circuit boards 1404, 1504, 1604, 1704, and 1804 shown in FIGS. 15-19, respectively. The electrical backplane connector 1906 can be the same as or different from the electrical backplane connectors 1406, 1506, 1606, 1706, and 1806 shown in FIGS. 15-19, respectively. The eight input and output ports 1908 can be the same as or different from the add input ports and drop output ports shown in FIGS. 15-19. The line input and output ports 1910 can be the same as or different from the line input and output ports shown FIGS. 15-19. The express input and output ports 1912 can be the same as or different from the express input and output ports shown in FIGS. 15-19. The expansion input and output ports 1914 can be the same as or different from the expansion input and output ports shown in FIGS. 17-19. The two test output ports 1916 can be the same as or different from the test output ports shown FIGS. 18 and 19, and the dispersion compensation input and output ports 1918 can be the same as or different from the dispersion compensation input and output ports shown FIGS. 16-19. It is also within the scope of the invention for any of the components of the system optics card 1900 shown in FIG. 20 to be replaced by any other suitable component (or components) that performs (or perform) the functions thereof, as discussed above.

Figure 21:
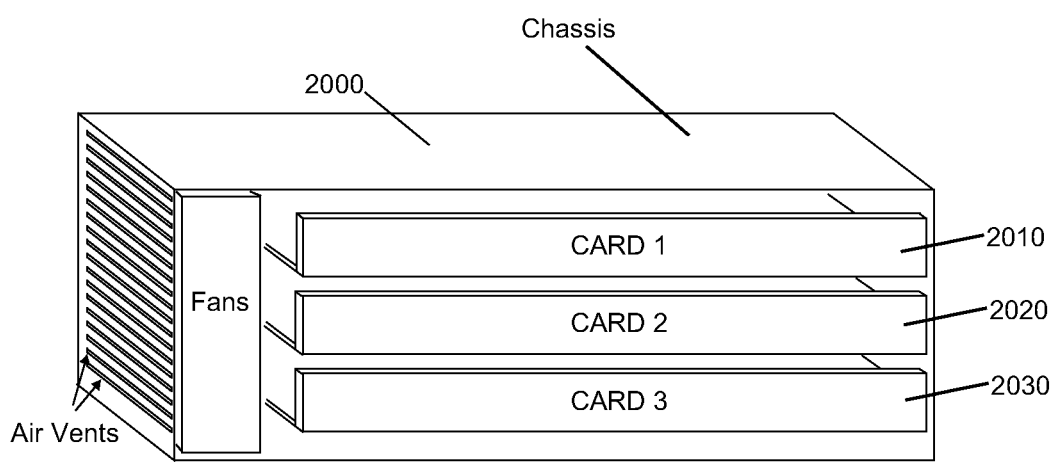
FIG. 21 is a perspective view of a chassis into which a plurality of system optics cards, such as the system optics cards shown in FIGS. 15-19, can be inserted.

FIG. 21 shows a perspective view of one example embodiment of a chassis 2000 that houses, supports, and electrically and mechanically connects to a plurality of detachably mountable system optics cards 2010, 2020, and 2030 so as to form a part of or an entire optical node in which the cards 2010, 2020, and 2030 are interconnected in the chassis 2000 and are connectable to other cards in other chasses and are connectable to other cards in other optical nodes. It is within the scope of the invention for the chassis 2000 to house, support, and electrically and mechanically connect more or less than the number of cards shown in FIG. 21, and to house, support, and electrically and mechanically connect cards other than system optics cards, such as optical converter cards. The chassis 2000 and the cards 2010, 2020, and 2030 can be configured so that the cards slide into the chassis 2000 to make mechanical and electrical connections therewith. But is within the scope of the invention for these components to make a mechanical and electrical connection with the chassis 2000 in other ways besides sliding therein.

The drop filters 480, 580, 1450, 1550, 1650, 1750, and 1850, shown respectively in FIGS. 5, 6, and 15-19, and the drop filters shown in FIGS. 7A, 7B, and 8 can comprise one or more of, and in any combination, the light distributors and/or light combiners shown in FIGS. 22A, 22B, 23A, 23B, 24A, 24B, 25A, 25B, 26A, 26B, 27, 28A and 28B, as will be discussed below. In addition, the add filters 490, 590, 1456, 1556, 1656, 1756, and 1856 shown respectively in FIGS. 5, 6, and 15-19 and the add filters shown in FIGS. 7A, 7B, and 8 can comprise one or more of, and in any combination, the light distributors and/or light combiners shown in FIGS. 22A, 22B, 23A, 23B, 24A, 24B, 25A, 25B, 26A, 26B, 27, 28A and 28B, as will be discussed below.

Figure 22A:
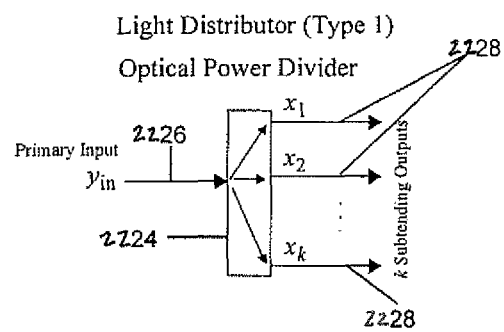
FIG. 22A is a schematic block diagram of an example of a type-1 light distributor and FIG. 22B is a schematic block diagram of an example of a type-1 light combiner.

FIG. 22A shows an example of a type-1 light distributor 2224 in accordance with an embodiment of the invention. The type-1 light distributor 2224 can route a portion of the total amount of light entering at a primary input $y_{in}$ 2226 to each of subtending outputs 2228, which are individually denoted as $x_1, x_2 \ldots x_k$, where k is the total number of subtending outputs. Expressed in another way, $x_i$ represents the ith subtending output, where "i" ranges from 1 to k. For the case of an "even" distributor, an equal amount of light is diverted from the primary input $y_{in}$ 2226 to each of the subtending outputs $(x_1, x_2 \ldots x_k)$ 2228. For instance, for the case of an "even" 1-to-2 light distributor having two subtending outputs $x_1$ and $x_2$, half of the light at the primary input $y_{in}$ 2226 is diverted to subtending output $x_1$, and half of the light is diverted to subtending output $x_2$. In general, the amount of optical power $P_{x_i}$ at any given output $x_i$ of k total outputs can be determined by the formula $P_{x_i} = b_i P_{y_{in}}$ (where $P_{y_{in}}$ is the amount of optical power applied to primary input $y_{in}$, $b_i$ represents the scaling coefficient of the light distributor for output $x_i$, and $$\sum_{i=1}^{k} b_i = 1$$

Therefore, for the case of an 50/50 light distributor, 50 percent of the light is sent to output $x_1$ ($b_1$=0.5) and 50 percent of the light is sent to output $x_2$ ($b_2$=0.5). In reality, an actual light distributor is not ideal and the light from the primary input $y_{in}$ 2226 may not always be perfectly coupled into the subtending outputs 2228, so that a small error term ($e_i$) may be associated with each output $x_i$ of the type-1 light distributor. Therefore, for the non-ideal light distributor, $P_{x_i} = b_i P_{y_{in}} - e_i$. It is within the scope of the invention, in an example embodiment, for the type-1 light distributor 2224 to be constructed such that an uneven proportion of light from the primary input $y_{in}$ 2226 is directed to each of the subtending outputs 2228 so that the amount of light output on each subtending output 2228 is not identical. Therefore, for the case of an ideal 80/20 light distributor, 80 percent of the light is sent to output $x_1$ ($b_1$=0.8) and 20 percent of the light is sent to output $x_2$ ($b_2$=0.2). It is also within the scope of the invention, in an example embodiment, for the type-1 light distributor 2224 to operate without being programmed with the knowledge of the frequencies (wavelengths) associated with the light upon which it operates. The type-1 light distributor 2224 is also called an optical power divider or an optical splitter.

Figure 22B:
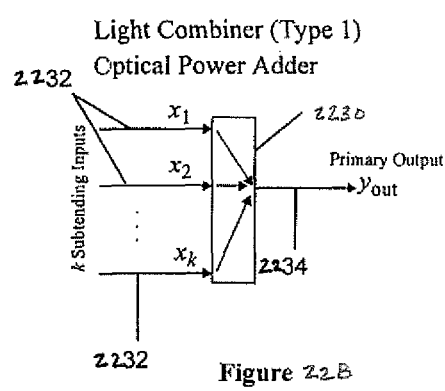

FIG. 22B shows a type-1 light combiner 2230 in accordance with an example of an embodiment of the invention. The type-1 light combiner 2230 shown in FIG. 22B can be configured to combine the light from subtending inputs 2232 and direct the optical power associated with those subtending inputs 2232 to a primary output, $y_{out}$ 2234. The subtending inputs 2232 are individually identified as $x_1, x_2 \ldots x_k$, k in this case being the total number of subtending inputs 2232. Expressed in another way, $x_i$ in this example represents the ith subtending input, where "i" ranges from 1 to k. In an example of an add filter or a drop filter of a system optics card including a type-1 light combiner 2230, the total number of subtending inputs can be the same as the total number of subtending outputs. But it is within the scope of the invention, in an example embodiment, for the total number of subtending inputs to be different than the total number of subtending outputs. In addition, in one example embodiment, the light combiner 2230 can be an "even" combiner, in which the percentage of light sent to the primary output $y_{out}$ 2234 from each of the subtending inputs 2232 is equal. For the case of an "even" 1-to-2 light combiner 2230, half of the light output from the primary output $y_{out}$ 2234 comes from the subtending input $x_1$, and half of the light output from the primary output $y_{out}$ 2234 comes from the subtending input $x_2$. In general, for the case of a k input light combiner, the amount of optical power $P_{y_{out}}$ at output $y_{out}$ can be determined by the formula $$P_{y_{out}} = \sum_{i=1}^{k} b_i P_{x_i}$$

(where $b_i$ represents the scaling coefficient of the light combiner for input $$x_i, \sum_{i=1}^{k} b_i = 1,$$

and $P_{x_i}$ is the power applied to input $x_i$). In reality, though, for a non-ideal light combiner, the light from the subtending inputs 2232 may not always be perfectly coupled into the primary output 2234, so that a small error term (e) may be associated with the type-1 light combiner 2230. Therefore, for the non-ideal light combiner $$P_{y_{out}} = \sum_{i=1}^{k} b_i P_{x_i} - e.$$

It is within the scope of the invention, in an example embodiment, for the type-1 light combiner 2230 to be also constructed such that an uneven proportion of light is directed from each of the subtending inputs 2232 to the light combiner output 2234. As a result, the primary output may receive a different percentage of light from each subtending input. Therefore, for the case of an ideal 70/30 light combiner, 70 percent of the light from input $x_1$ is coupled to $y_{out}$ ($b_1$=0.7) and 30 percent of the light from input $x_2$ is coupled to $y_{out}$ ($b_2$=0.3). It is also within the scope of the invention, in an example embodiment, for the type-1 light combiner 2230 to operate without being programmed with the knowledge of the frequencies (wavelengths) associated with the light upon which it operates. The type-1 light combiner 2230 is also called an optical power adder or an optical coupler.

Figure 23A:
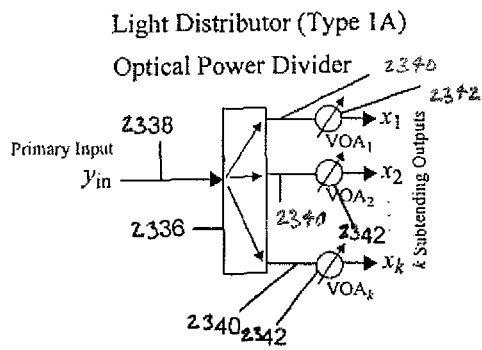
FIG. 23A is a schematic block diagram of an example of a type-1A light distributor and FIG. 23B is a schematic block diagram of an example of a type-1A light combiner.

FIG. 23A shows an example of a type-1A light distributor 2336. The type-1A light distributor 2336 can route a portion of the total amount of light entering at a primary input $y_{in}$ 2338 to each of subtending outputs 2340, which are individually denoted as $x_1, x_2 \ldots x_k$, k being the total number of subtending outputs. Expressed in another way, $x_i$ in this case represents the ith subtending output, where "i" ranges from 1 to k. Each subtending output 2340 includes a variable optical attenuator (VOA) 2342. Each VOA 2342 can enable the light exiting a given subtending output to be further attenuated by some adjustable amount denoted by $a_i$, where "a" represents a coefficient of attenuation and "i" represents a particular subtending output 2340 and ranges from 1 to k, where k is the total number of subtending outputs. Thus, for example, $a_1$ is the coefficient of attenuation applied to the 1$^{st}$ subtending output 2340, which is denoted by $x_1$. Each VOA 2342 can also allow the light exiting a given subtending output to be completely extinguished. In this case, the coefficient of attenuation takes the value of 0. Each VOA 2342 can be adjusted independently from all other VOAs 2342, although it is within the scope of the invention, in an example embodiment, to provide interdependent control of the VOAs 2342. A control signal associated with each subtending output 2340 of the type-1A light distributor 2336 can be used to set the attenuation value of each VOA 2342, as is known to those skilled in the art. It is within the scope of the invention, in an example embodiment, for each subtending output 2340 to include a VOA 2342, and it is within the scope of the invention, in an example embodiment, for less than all of the subtending output 2340 to include a VOA 2342 and for any number of subtending outputs 2340 to include a VOA 2342. For the case of an "even" light distributor, an equal amount of light is diverted from the primary input $y_{in}$ 2338 to each of the subtending outputs $x_1, x_2 \ldots x_k$. For instance, for the case of an "even" 1-to-2 light distributor having two subtending outputs $x_1$ and $x_2$, half of the light at the primary input $y_{in}$ 2338 is diverted to subtending output $x_1$, and half of the light is diverted to subtending output $x_2$. In general the amount of optical power $P_{x_i}$ at any given output $x_i$ of k total outputs can be determined by the formula $P_{x_i} = a_i b_i P_{y_{in}}$ (where $P_{y_{in}}$ is the amount of optical power applied to primary input $y_{in}$, $b_i$ represents the scaling coefficient of the light distributor for output $x_i$, $a_i$ represents the coefficient of attenuation for output $x_i$, $0 < a_i < 1$, and $$\sum_{i=1}^{k} b_i = 1 \Big).$$

Therefore, for the case of an 50/50 light distributor (k=2) with the VOA of output $x_1$ set to attenuate its input signal by 60% and with the VOA of output $x_2$ set to attenuate its input signal by 70%, 20 percent of the light from P is sent to output $x_1$ ($b_1$=0.5, $a_1$=0.4) and 15 percent of the light from P is sent to output $x_2$ ($b_2$=0.5, $a_2$=0.3). In reality, an actual light distributor is not ideal and the light from the primary input $y_{in}$ 2338 may not always be perfectly coupled into the subtending outputs 2340, so that a small error term ($e_i$) may be associated with each output of the type-1A light distributor 2336. Therefore, for the non-ideal light distributor, $P_{x_i} = a_i b_i P_{y_{in}} - e_i$. It is within the scope of the invention, in an example embodiment, for the type-1A light distributor 2336 to be constructed such that an uneven proportion of light from the primary input $y_{in}$ 2338 is directed to each of the subtending outputs 2340 so that the amount of light output on each subtending output 2340 is not identical (assuming the attenuation coefficients $a_i$ are the same). It is also within the scope of the invention, in an example embodiment, for the type-1A light distributor 2336 to operate without being programmed with the knowledge of the frequencies (wavelengths) associated with the light upon which it operates. It is further within the scope of the invention, in an example embodiment, for the type-1A distributor 2336 to be identical to its type-1 equivalent, except that the VOA 42 is inserted in each subtending output. And it also within the scope of the invention, in an example embodiment, for the type-1A distributor 2336 to be different from its type-1 equivalent in ways in addition to the use of the VOA. The type-1A light distributor 2336 is also called an optical power divider with VOAs or an optical splitter with VOAs.

Figure 23B:
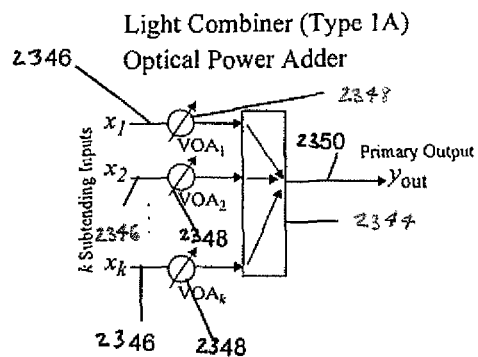

FIG. 23B shows an example of a type-1A light combiner 2344 in accordance with another embodiment of the invention. The type-1A light combiner shown in FIG. 23B can be configured to attenuate light from subtending inputs 2346 using variable optical attenuators (VOAs) 2348, combine the attenuated light from the subtending inputs 2346, and direct the optical power associated with those subtending inputs 2346 to a primary output, $y_{out}$ 2350. Each VOA 2348 can enable the light entering the light combiner 2344 on a given subtending input to be attenuated by some adjustable amount denoted by $a_i$, where "a" represents a coefficient of attenuation and "i" represents a particular subtending input 2346 and ranges from 1 to k, where k is the total number of subtending inputs; thus, for example, $a_1$ is the coefficient of attenuation applied to the 1$^{st}$ subtending input 2346, which is denoted by $x_1$, and $a_2$ is the coefficient of attenuation applied to the 2$^{nd}$ subtending input 2346, which is denoted by $x_2$. Expressed in another way, $x_i$ in this case represents the ith subtending input, where "i" ranges from 1 to k. Each VOA 2348 can also enable the light entering the light combiner 2344 on a given subtending input to be completely extinguished. In this case, the coefficient of attenuation takes the value of 0. Each VOA 2348 can be adjusted independently from all other VOAs 2348, although it is within the scope of the invention, in an example embodiment, to provide interdependent control of the VOAs 2348. A control signal associated with each subtending input 2346 of the type-1A light combiner 2344 can be used to set the attenuation value of each VOA 2348. It is within the scope of the invention, in an example embodiment, for each subtending input 2346 to include a VOA 2348, and it is within the scope of the invention, in an example embodiment, for less than all of the subtending inputs 2346 to include a VOA 2348 and for any number of subtending inputs 2346 to include a VOA 2348. In addition, in an add filter or a drop filter of a system optics card including a type-1A light combiner 2344, the total number of subtending inputs can be the same as the total number of subtending outputs. But it is within the scope of the invention, in an example embodiment, for the total number of subtending inputs in a ROADM core device to be different than the total number of subtending outputs. In addition, the light combiner 2344 can be an "even" combiner, in which the percentage of light sent to the primary output $y_{out}$ 2350 from each of the subtending inputs 2346 is equal. For the case of an "even" 2-to-1 light combiner 2344, half of the light output from the primary output $y_{out}$ 2350 comes from the subtending input $x_1$, and half of the light output from the primary output $y_{out}$ 2350 comes from the subtending input $x_2$. In general, for the case of a k input type 1A light combiner, the amount of optical power $P_{y_{out}}$ at output $y_{out}$ can be determined by the formula $$P_{y_{out}} = \sum_{i=1}^{k} b_i a_i P_{x_i}$$

(where $b_i$ represents the scaling coefficient of the light combiner for input $x_i$, $a_i$ represents the coefficient of attenuation for input $$x_i, 0 \le a_i \le 1, \sum_{i=1}^{k} b_i = 1,$$

and $P_{x_i}$ is the power applied to input $x_i$). In reality though, for a non-ideal light combiner, the light from the subtending inputs 2346 may not always be perfectly coupled into the primary output 2350, so that a small error term (e) may be associated with the type-1A light combiner 2344. Therefore, for the non-ideal type 1A light combiner $$P_{y_{out}} = \sum_{i=1}^{k} b_i a_i P_{x_i} - e.$$

It is within the scope of the invention, in an example embodiment, for the type-1A light combiner 2344 to be also constructed such that an uneven proportion of light is directed from each of the subtending inputs 2346 to the light combiner output 2350. As a result, in this example embodiment, the primary output may receive a different percentage of light from each subtending input. It is also within the scope of the invention, in an example embodiment, for the type-1A light combiner 2344 to operate without being programmed with the knowledge of the frequencies (wavelengths) associated with the light upon which it operates. It is further within the scope of the invention, in an example embodiment, for the type-1A light combiner 2344 to be identical to its type-1 equivalent shown in FIG. 22B, except that the VOA 2348 is inserted in each subtending input 2346 in the type-1A light combiner 2344. In addition, it is within the scope of the invention, in an example embodiment, for the type-1A light combiner 2344 to be different from its type-1 equivalent shown in FIG. 22B in ways in addition to the use of the VOA. The type-1A light combiner 2344 is also called an optical power adder with VOAs or an optical coupler with VOAs.

Figure 24A:
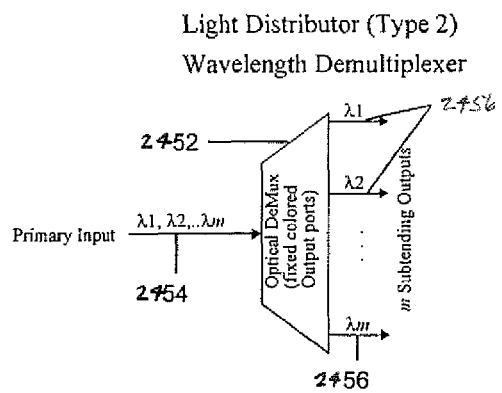
FIG. 24A is a schematic block diagram of an example of a type-2 light distributor and FIG. 24B is a schematic block diagram of an example of a type-2 light combiner.

FIG. 24A shows an example of a type-2 light distributor 2452. The type-2 light distributor 2452 can be configured to demultiplex individual wavelengths from a composite wavelength division multiplexed light stream including m multiple wavelengths denoted as $\lambda_1, \lambda_2, \ldots \lambda_m$, where m represents the total number of wavelengths in the stream. A wavelength division multiplexed (WDM) light stream or a dense wavelength division multiplexed (DWDM) light stream can be applied to the primary input 2454 of the type-2 light distributor 2452. The type-2 light distributor 2452 is then able to divert particular wavelengths to particular subtending outputs 2456, depending upon its design. In the FIG. 24A example, a DWDM signal including wavelengths $\lambda_1$ to $\lambda_m$ is applied to the type-2 light distributor 2452, and the light distributor 2452 directs wavelength $\lambda_1$ to subtending output 1, wavelength $\lambda_2$ to subtending output 2, and more generally, directs wavelength $\lambda_m$ to subtending output m. For the type-2 light distributor 2452, a given wavelength is directed to a pre-defined and predetermined subtending output 2456. There may be an inherent insertion power loss associated with the path each wavelength takes from the primary input 2454 to its corresponding subtending output 2456. While one example embodiment employs the same number of wavelengths as the number of subtending outputs 2456, it is within the scope of the invention, in an example embodiment, for the number of wavelengths to differ from the number of subtending outputs 2456.

Figure 24B:
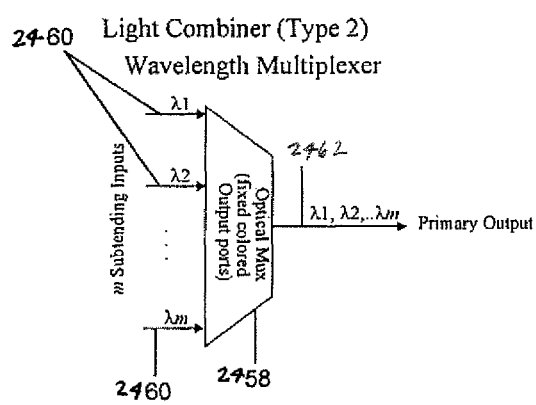

FIG. 24B shows an example of a type-2 light combiner 2458, which can be used to multiplex individual wavelengths, such as $\lambda_1, \lambda_2, \ldots, \lambda_m$, arriving on individual subtending inputs 2460 in order to form a composite wavelength division multiplexed light stream on primary output 2462 including light of the multiple wavelengths $\lambda_1, \lambda_2, \ldots, \lambda_m$ (m in this case being an integer representing the total number of wavelengths input into the light combiner 2458). A single predefined wavelength is applied to each subtending input 2460 of the type-2 light combiner 2458. In the FIG. 24B example, wavelength $\lambda_1$ is applied to subtending input 1, wavelength 2 is applied to subtending input 2, and wavelength $\lambda_m$ is applied to subtending input m. The resulting light stream exiting from the primary output 2462 then includes a DWDM signal including wavelengths $\lambda_1$ through $\lambda_m$. There may be an inherent insertion power loss associated with the path each wavelength takes from its subtending input 2460 to the primary output 2462. An example of a physical component that performs wavelength multiplexing or wavelength demultiplexing is an Arrayed Waveguide Grating (AWG). While one example embodiment employs the same number of wavelengths as the number of subtending inputs 2460, it is within the scope of the invention, in an example embodiment, for the number of wavelengths to differ from the number of subtending inputs 2460. In another example embodiment, in an add or drop filter of a system optics card including a type-2 light combiner 2458, the total number of subtending inputs can be the same as the total number of subtending outputs. But it is within the scope of the invention, in an example embodiment, for the total number of subtending inputs of such an add or drop filter of a system optics card to be different than the total number of subtending outputs.

Figure 25A:
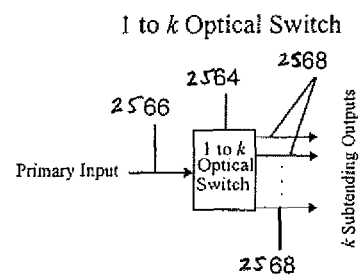
FIG. 25A is a schematic block diagram of an example of a type-3 light distributor and FIG. 25B is a schematic block diagram of an example of a type-3 light combiner.

FIG. 25A shows an example of a type-3 light distributor 2564. The type-3 light distributor 2564 can be configured to direct the light arriving on the primary input 2566 to only one of the k subtending outputs 2568 (in this instance, k is an integer denoting the total number of subtending outputs 2568). The type-3 light distributor 2564 can be programmed in a manner known to those skilled in the art to direct the light arriving at the primary input 2566 to any of the k subtending outputs 2568. For instance, all the light arriving at the primary input 2566 could first be directed to subtending output 1, and then at some time later, the distributor 2564 could be programmed or reconfigured such that all the light arriving at the primary input 2566 could then be directed to subtending output 2. To accomplish this task, a control signal can be associated with the type-3 light distributor 2564 to program the type-3 light distributor 2564 to direct the light arriving on the primary input 2566 to a selected one of the subtending outputs 2568. This type-3 light distributor 2564 is also called a 1-to-k optical switch.

Figure 25B:
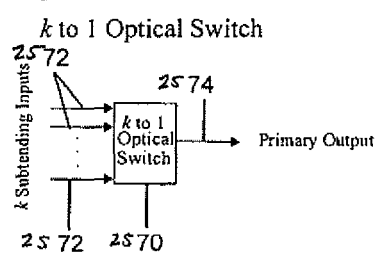

FIG. 25B shows an example of a type-3 light combiner 2570 that can be configured to direct the light from only one of its subtending inputs 2572 to its primary output 2574. The type-3 light combiner 2570 can be programmed in ways known to those skilled in the art to direct the light arriving on any of its k subtending inputs 2572 to its primary output 2574 (in this example embodiment, k is an integer denoting the total number of subtending inputs 2572). For instance, all the light arriving on subtending input 1 could first be directed to the primary output 2574, and then at some time later, the light arriving on subtending input 1 can be prevented from being directed to the primary output 2574, and instead, all the light arriving on subtending input 2 can be directed to the primary output 2574. To accomplish this task, a control signal can be associated with a type-3 light combiner, as is known to those skilled in the art. The control signal is used to program or reconfigure the combiner 2570 to direct the light arriving on one of the subtending inputs 2572 to the primary output 2574. This type-3 light combiner is also called a k-to-1 optical switch. Both the type-3 light distributor 2564 and the type-3 light combiner 2570 may have an inherent optical insertion loss (IL) associated with the paths through them. In one example embodiment, in an add or drop filter of a system optics card including a type-3 light combiner 2570, the total number of subtending inputs is the same as the total number of subtending outputs. But it is within the scope of the invention, in an example embodiment, for the total number of subtending inputs to be different than the total number of subtending outputs.

Figure 26A:
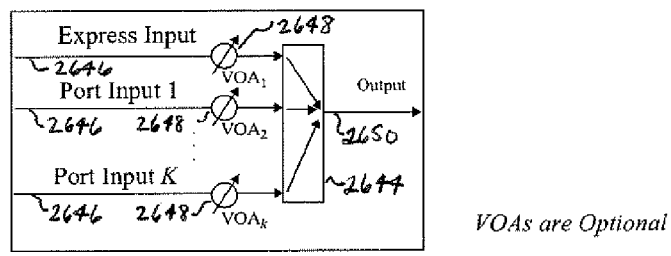
FIG. 26A is a schematic block diagram of an example of an add filter.

FIG. 26A shows an example embodiment of an add filter that can be used as the add filter 490, 590, 1456, 1556, 1656, 1756, and/or 1856 in FIGS. 5, 6, and 15-19, respectively, or as the add filter in any other system optical card disclosed herein, such as the add filters in the cards shown in FIGS. 7A, 7B, and 8. The add filter 2644 shown in FIG. 26A is denoted as a type-I add filter and can comprise a type-1A light combiner that can be the same as or different from the type-1A light combiner shown in FIG. 23B.

The add filter 2644 shown in FIG. 26A can be configured to attenuate light from subtending inputs 2646 (one of the subtending inputs being an input from an express port and the other subtending inputs being an input from an add input port) using variable optical attenuators (VOAs) 2648, combine the attenuated light from the subtending inputs 2646, and direct the optical power associated with those subtending inputs 2646 to a primary output, 2650. Each VOA 2648 can enable the light entering the add filter 2644 on a given subtending input to be attenuated by some adjustable amount denoted by $a_i$, where "a" represents a coefficient of attenuation and "i" represents a particular subtending input 2646 and ranges from 1 to k, where k is the total number of subtending inputs; thus, for example, $a_1$ is the coefficient of attenuation applied to the $1^{st}$ subtending input 2646, which is denoted by $x_1$, and $a_2$ is the coefficient of attenuation applied to the $2^{nd}$ subtending input 2646, which is denoted by $x_2$. Expressed in another way, $x_i$ in this case represents the ith subtending input, where "i" ranges from 1 to k. Each VOA 2648 can also enable the light entering the add filter 2644 on a given subtending input to be completely extinguished. In this case, the coefficient of attenuation takes the value of 0. Each VOA 2648 can be adjusted independently from all other VOAs 2648, although it is within the scope of the invention, in an example embodiment, to provide interdependent control of the VOAs 2648. A control signal associated with each subtending input 2646 of the add filter 2644 can be used to set the attenuation value of each VOA 2648. It is within the scope of the invention, in an example embodiment, for each subtending input 2646 to include a VOA 2648, and it is within the scope of the invention, in an example embodiment, for less than all of the subtending inputs 2646 to include a VOA 2648 and for any number of subtending inputs 2646 to include a VOA 2648. In addition, the total number of subtending inputs can be the same as the total number of subtending outputs on the drop filter of the system optics card to which the add filter 2644 is attached. But it is within the scope of the invention, in an example embodiment, for the total number of subtending inputs to be different than the total number of subtending outputs. In addition, the add filter 2644 can be an "even" add filter, in which the percentage of light sent to the primary output $y_{out}$ 2650 from each of the subtending inputs 2646 is equal. For the case of an "even" 2-to-1 add filter 2644, half of the light output from the primary output $y_{out}$ 2650 comes from the subtending input $x_1$, and half of the light output from the primary output $y_{out}$ 2650 comes from the subtending input $x_2$. In general, for the case of a k input add filter, the amount of optical power $P_{y_{out}}$ at output $y_{out}$ can be determined by the formula $$P_{y_{out}} = \sum_{i=1}^{k} b_i a_i P_{x_i}$$

(where $b_i$ represents the scaling coefficient of the add filter for input $x_i$, $a_i$ represents the coefficient of attenuation for input $$x_i, 0 \leq a_i \leq 1, \sum_{i=1}^{k} b_i = 1,$$

and $P_{x_i}$ is the power applied to input $x_i$). In reality though, for a non-ideal add filter, the light from the subtending inputs 2646 may not always be perfectly coupled into the primary output 2650, so that a small error term (e) may be associated with the type-1A add filter 2644. Therefore, for the non-ideal add filter $$P_{y_{out}} = \sum_{i=1}^{k} b_i a_i P_{x_i} - e.$$

It is within the scope of the invention, in an example embodiment, for the add filter 2644 to be also constructed such that an uneven proportion of light is directed from each of the subtending inputs 2646 to the add filter output 2650. As a result, in this example embodiment, the primary output may receive a different percentage of light from each subtending input. It is also within the scope of the invention, in an example embodiment, for the add filter 2644 to operate without being programmed with the knowledge of the frequencies (wavelengths) associated with the light upon which it operates. The add filter 2644 is also called an optical power adder with VOAs or an optical coupler with VOAs.

Figure 26B:
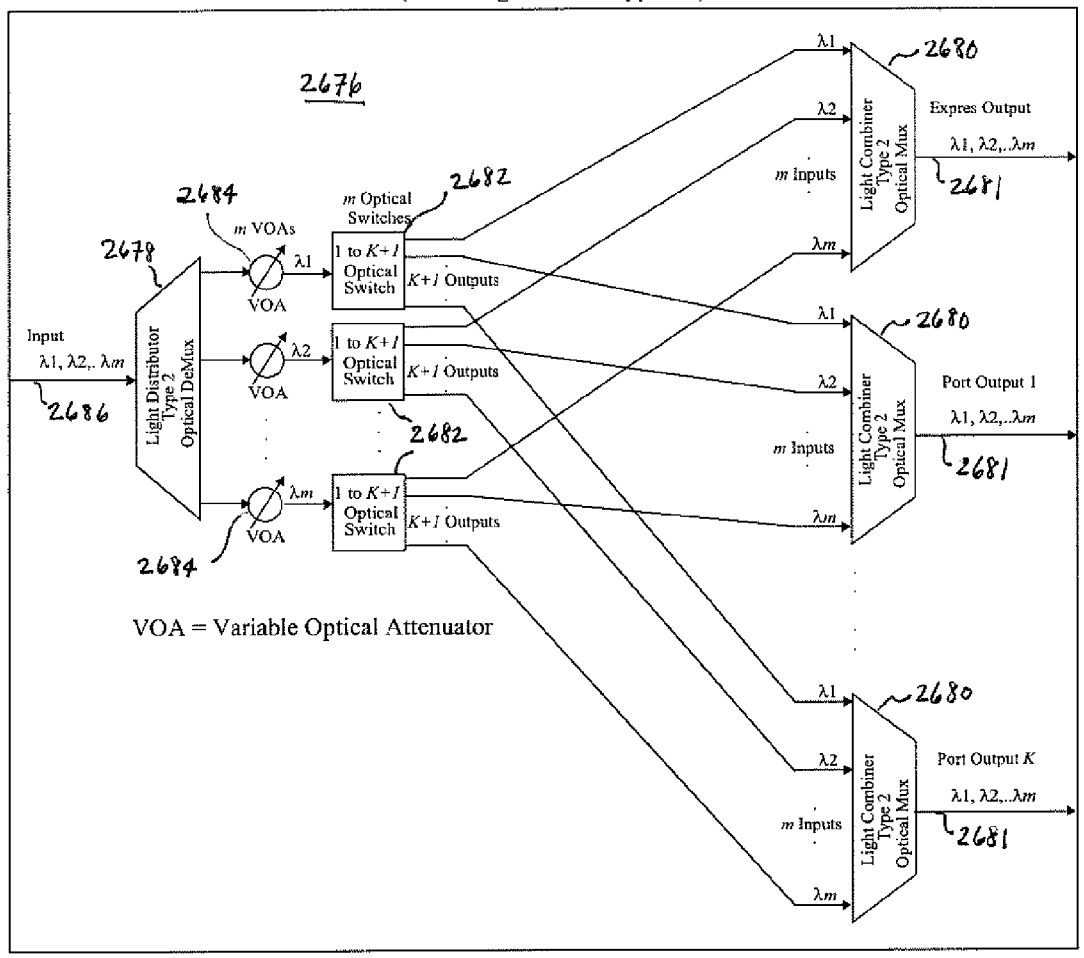
FIG. 26B is a schematic block diagram of an example of a drop filter.

FIG. 26B shows an example embodiment of a drop filter that can be used as the drop filter 480, 580, 1450, 1550, 1650, 1750, and/or 1850 in FIGS. 5, 6, 15-19, respectively, or as the drop filter in any other system optical card disclosed herein, such as the drop filters in the cards shown in FIGS. 7A, 7B, and 8. The drop filter 2676 shown in FIG. 26B is denoted as a type-I drop filter and is also denoted as a type-4 light distributor. The drop filter 2676 can include a type-2 light distributor 2678, type-2 light combiners 2680, type-3 light distributors 2682, and VOAs 2684 positioned between the type-2 light distributor 2678 and the type-3 light distributors 2682. The type-2 light distributor 2678, the type-2 light combiners 2680, and the type-3 light distributors 2682 can be the same as, for example, the type-2 light distributor 2452, the type-2 light combiner 2458, the type-3 light distributor 2564, respectively, shown in FIGS. 24A, 24B, and 25A, although they are not limited thereto. In addition, a control signal associated with each VOA 2684 can be used to set the attenuation value of each VOA 2684. The drop filter 2676 can be configured and programmed to direct each wavelength arriving in the light stream entering the primary input 2686 to only one of the type-2 light combiners 2680 and its associated subtending output 2681, which are individually denoted by 1 through k (k being an integer representing the total number of subtending outputs in this case). This is accomplished by 1) receiving a multiple-wavelength signal, composed of multiple wavelengths up to m wavelengths ($\lambda_1, \lambda_2, \ldots \lambda_m$), with the type-2 light distributor 2678 on the primary input 2686 (m representing the total number of wavelengths within the light stream entering the primary input 2686), 2) separating the multiple-wavelength signal into a plurality of single-wavelength optical signals with the type-2 light distributor 2678, 3) individually attenuating each single-wavelength optical signal output from the type-2 light distributor 2678 with a corresponding VOA 2684, 4) directing each attenuated single-wavelength optical signal to a different and corresponding type-3 light distributor 2682, 5) assigning each attenuated single-wavelength optical signal to only one of the type-2 light combiners 2680 using its corresponding type-3 light distributor 2682, so that different sets of attenuated single-wavelength optical signals can be directed to different type-3 light combiners 2680, 6) combining optical signals in each set of assigned, attenuated, single-wavelength optical signals output from the type-3 light distributors 2682 into a single output signal with one of the type-2 light combiners 2680, and 7) outputting each single output signal from the type-2 light combiner 2680 on its associated subtending output 2681. The 1-to-k optical switches 2682 can be programmable to direct an optical signal input thereinto to any one of the type-2 light combiners 2680 and their associated subtending outputs 2681.

As illustrated in FIG. 26B, up to m wavelengths can be included within the light stream entering the primary input 2686, and up to m wavelengths can exit any given subtending output 2681. The subtending outputs 2681 are individually denoted by the phrase "subtending output 1", "subtending output 2", ... "subtending output k", where k denotes the total number of subtending outputs. In addition, at least one subtending output can be connected to an express output port and the other subtending outputs can be connected to drop output ports. As noted above, the 1-to-k optical switches 2682 can direct a given wavelength applied thereto to only one type-2 light combiner 2680 and only one subtending output 2681. Therefore, for example, if wavelength 2 is directed to subtending output 1, then it cannot simultaneously be directed to subtending output 2, for instance, or any other subtending output. In addition, the light distributor 2676 can be programmed to attenuate the optical power of each wavelength using the VOA 2684 associated with that wavelength before it is directed to a given subtending output 2681 by one of the 1-to-k optical switches 2682. It is also within the scope of the invention, in an example embodiment, for the VOA 2684 associated with a given wavelength to be programmed such that the wavelength is blocked from exiting any of the subtending outputs. Further, it is within the scope of the invention, in an example embodiment, for the drop filter 2676 not to include the VOAs 2684. And it is within the scope of the invention, in an example embodiment, for the light distributor 2676 to include more or less than the number of type-2 light distributors 2678, VOAs 2684, type-3 light distributors 2682, and type-2 light combiners 2680 shown in FIG. 26B. It is also within the scope of the invention, in an example embodiment, for the drop filter to include additional elements not shown in FIG. 26B. It is further within the scope of the invention, in an example embodiment, for any of the type-2 light distributor 2678, the VOAs 2684, the type-3 light distributors 2682, and the type-2 light combiners 2680 of the drop filter 2676 shown in FIG. 26B to be replaced by any other suitable component that performs the functions of these elements discussed above. As an example, a single VOA function and a single 1 to k optical switch function may be implemented with a single mirror device (MEMs) which can both switch light and attenuate light simultaneously. Alternatively, both the VOA function and the 1 to k optical switch function may be implemented using liquid crystal technology in another example embodiment.

In summary, the path through the drop filter 2676 is as follows. A WDM or DWDM light stream is applied to the primary input 2686 of the distributor 2678. The type-2 light distributor 2678 then demultiplexes the WDM/DWDM light stream into its individual wavelengths. Each of the individual wavelengths is attenuated by some programmable amount via a corresponding VOA 2684. Each wavelength is then directed to its corresponding type-2 light combiner 2680 and its corresponding k subtending output 2681 via its corresponding type-3 light distributor 2682 (1-to-k optical switch). At each type-2 light combiner 2680, the combiner 2680 multiplexes up to m wavelengths into a WDM/DWDM signal on a corresponding subtending output 2681.

The drop filter 2676 is a 1-to-k drop filter configured to operate upon m wavelengths and using m VOA control signals, and m 1-to-k optical switch control signals. The drop filter 2676 is also called a wavelength router or a wavelength selective switch (WSS).

Figure 27:
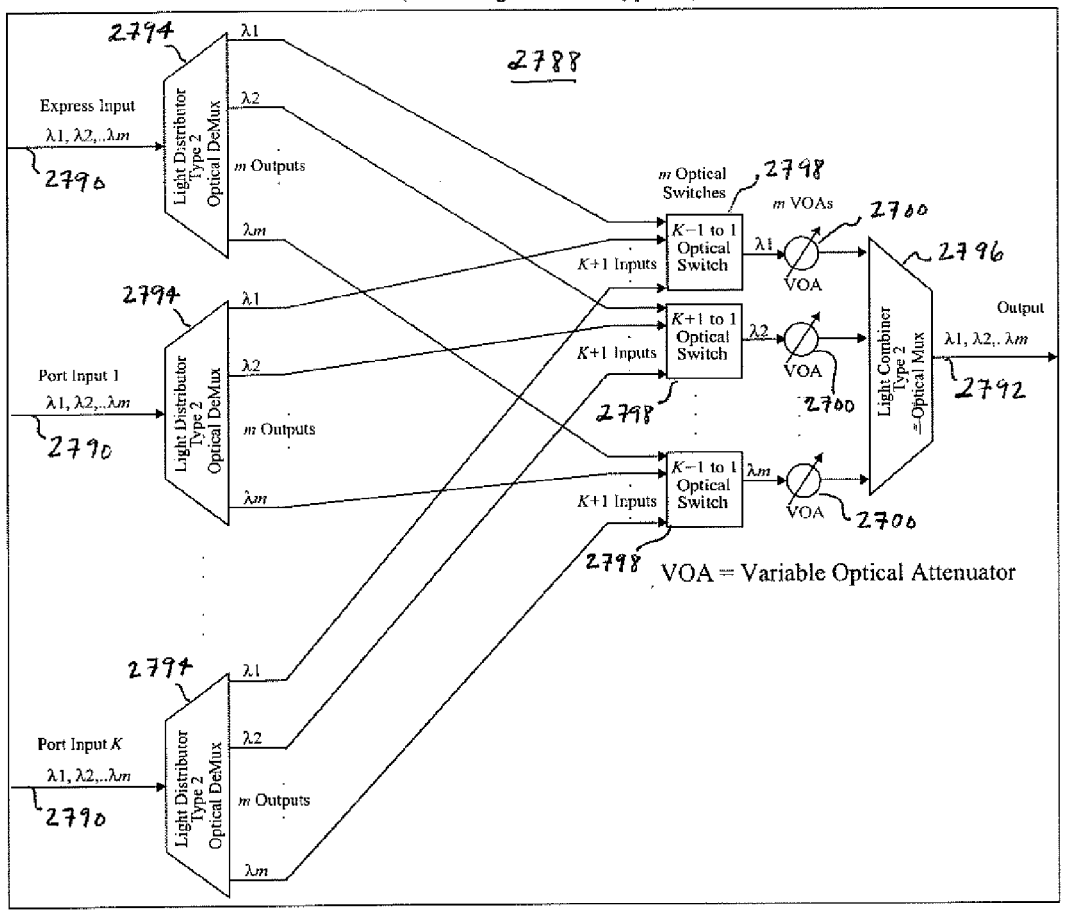
FIG. 27 is a schematic block diagram of another example of an add filter.

FIG. 27 shows another example embodiment of an add filter that can be used as the add filter 490, 590, 1456, 1556, 1656, 1756, and/or 1856 in FIGS. 5, 6, and 15-19, respectively, or as the add filter in any other system optical card disclosed herein, such as the add filters in the cards shown in FIGS. 7A, 7B, and 8. The add filter 2788 shown in FIG. 27 is denoted as a type-2 add filter and is also denoted as a type-4 light combiner. The add filter 2788 processes optical signals similarly to the drop filter 2676, except that the flow of light is from the subtending inputs 2790 to the primary output 2792.

As can be seen in FIG. 27, the add filter 2788 uses type-2 light distributors 2794 and a type-2 light combiner 2796, type-3 light combiners 2798, and VOAs 2700 positioned between the type-3 light combiners 2798 and the type-2 light combiner 2796. The type-2 light distributors 2794, the type-2 light combiner 2796, and the type-3 light combiners 2798 can be the same as, for example, the type-2 light distributor 2452, the type-2 light combiner 2458, the type-3 light combiner 2570, respectively, as shown in FIGS. 24A, 24B, and 25B although they are not limited thereto. In addition, a control signal associated with each VOA 2700 can be used to set the attenuation value of each VOA 2700. The subtending inputs 2790 are individually denoted by the phrase "subtending input 1", "subtending input 2", . . . "subtending input k", where k denotes the total number of subtending inputs. The add filter 2788 can be configured and programmed to direct each wavelength arriving in the light stream entering the subtending inputs 1 through k through a particular path to the primary output 2792. This is accomplished by 1) receiving different multiple-wavelength signals, each composed of multiple wavelengths up to m wavelengths ($\lambda_1, \lambda_2, \ldots \lambda_m$), with the type-2 light distributors 2794 on the subtending inputs 2790 (m representing the total number of wavelengths within the light stream entering the primary inputs 2790) (at least one of the subtending inputs 2790 can be connected to an express input port and the other subtending inputs 2790 can be connected to add input ports), 2) separating each multiple-wavelength signal into a plurality of single-wavelength optical signals with a different one of the type-2 light distributors 2794, 3) directing single-wavelength optical signals of the same wavelength from the type-2 light distributors 2794 to the same type-3 light combiner 2798, 4) using the type-3 light combiners 2798 to select only one of the received single-wavelength optical signals of the same wavelength for outputting towards the primary output 2792, 5) individually attenuating each selected single-wavelength optical signal output from the type-3 light combiners 2798 with a corresponding VOA 2700, and 6) combining the attenuated, selected single-wavelength optical signals with the type-2 light combiner 2796 into a combined multiple-wavelength optical signal and outputting the combined multiple-wavelength optical signal on the primary output 2792. As illustrated in FIG. 27, up to m number of wavelengths can be included within the light stream entering each subtending input 2790, and up to m wavelengths can exit the primary output 2792. As noted above, the k-to-1 optical switches 2798 can be configured so that only one wavelength from each subtending input 2790 can be directed to the primary output 2792. Therefore, for example, if wavelength $\lambda_2$ from subtending input 1 is directed to the primary output 2792, then wavelength $\lambda_2$ from subtending input 2 (or any other input) cannot simultaneously be directed to the primary output 2792. The k-to-1 optical switches 2798 are programmable to select any of the single-wavelength optical signals of the same wavelength received by each type-3 light combiner 2798 for outputting towards the primary output 2792. It can also be noted that once a given wavelength is directed to the primary output 2792, the optical power of that wavelength can be attenuated by some programmable amount via the VOA 2700 associated with that output wavelength, although it is not required to do so. It can also be noted that the VOA 2700 associated with a given wavelength can be programmed such that the wavelength is blocked from exiting the primary output 2792 completely. Further, it is within the scope of the invention, in an example embodiment, for the add filter 2788 to not include the VOAs 2700. It is also within the scope of the invention, in an example embodiment, for the light combiner 2788 to include more or less than the number of type-2 light distributors 2794, VOAs 2700, type-3 light combiners 2798, and type-2 light combiners 2796 shown in FIG. 27. It is also within the scope of the invention, in an example embodiment, for the add filter 2788 to include additional elements. It is further within the scope of the invention, in an example embodiment, for any of the type-2 light distributors 2794, VOAs 2700, type-3 light combiners 2798, and type-2 light combiner 2796 of the add filter 2788 shown in FIG. 27 to be replaced by any other suitable component that performs the functions thereof discussed above. As an example, a single VOA function and a single k to 1 optical switch function may be implemented with a single mirror device (MEMs) which can both switch light and attenuate light simultaneously. Alternatively, both the VOA function and the k to 1 optical switch function may be implemented using liquid crystal technology, in another example embodiment.

In summary, the path through the add filter shown in FIG. 27 is as follows. A WDM or DWDM light stream is applied to each of the subtending inputs 2790 of the combiner 2788. The light stream of each input can include up to m wavelengths simultaneously. The type-2 light distributor 2794 at each subtending input 2790 then demultiplexes the WDM/DWDM light streams into their individual wavelengths. The k-to-1 optical switch 2798 associated with each wavelength is then used to select a wavelength from one of the k subtending inputs thereof. Each of the selected individual wavelengths is attenuated by some programmable amount via its corresponding VOA 2700. The type-2 light combiner 2796 then multiplexes up to m wavelengths into a WDM/DWDM signal and outputs the result on the primary output 2792.

As can be seen from FIG. 27, the add filter 2788 is a k-to-1 add filter operating upon m wavelengths that requires m VOA control signals, and m k-to-1 optical switch control signals. This add filter is also called a wavelength router or a wavelength selective switch (WSS).

Figure 28A:
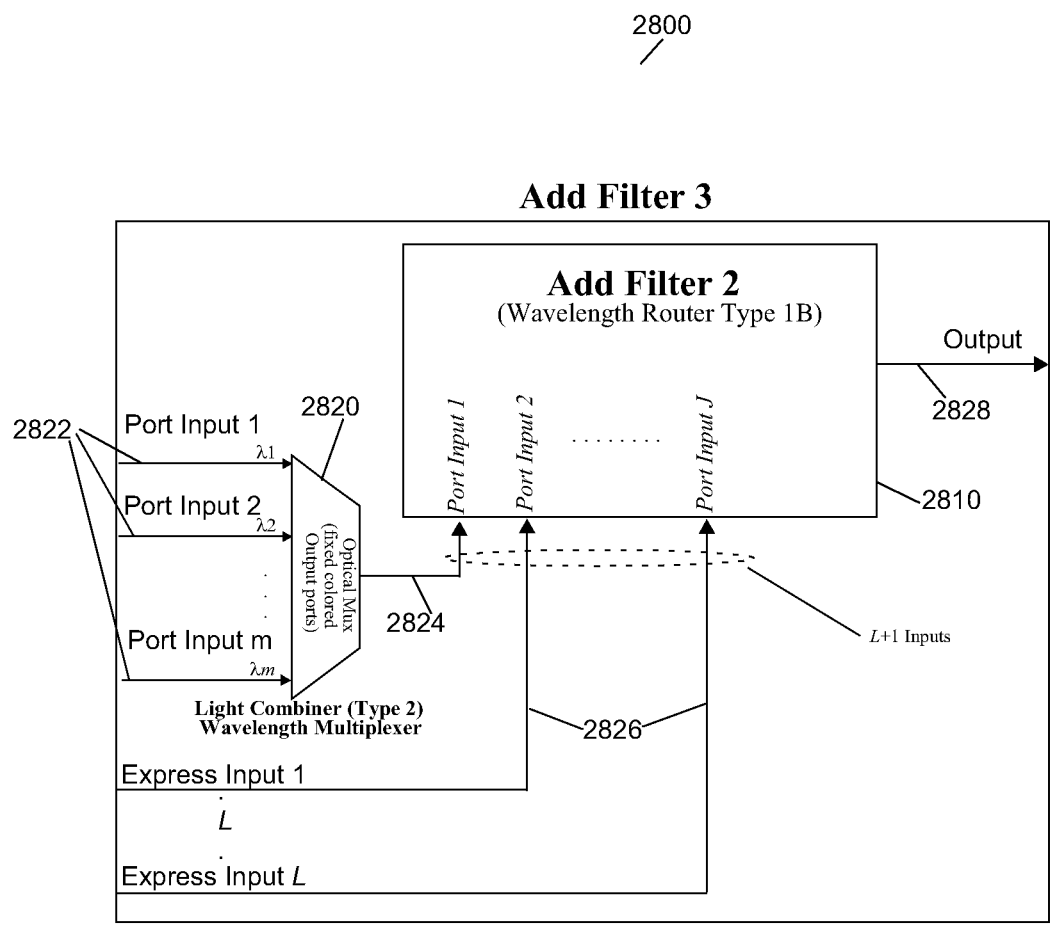
FIG. 28A is a schematic block diagram of another example of an add filter.

FIG. 28A shows another example embodiment of an add filter that can be used as the add filter 490, 590, 1456, 1556, 1656, 1756, and/or 1856 in FIGS. 5, 6, and 15-19, respectively, or as the add filter in any other system optical card disclosed herein, such as the add filters in the cards shown in FIGS. 7A, 7B, and 8. The add filter 2800 is denoted as a type-3 add filter and can comprise a combination of the type-2 add filter 2810 (i.e., a type-4 light combiner) and a type-2 light combiner 2820. The type-2 add filter 2810 (i.e., a type-4 light combiner) can be the same as or different from the type-4 light combiner 2788 shown in FIG. 27 and the type-2 light combiner 2820 can be the same as or different from the type-2 light combiner 2458 shown in FIG. 24B. The type-2 light combiner 2820 can be configured to receive inputs from m colored add input ports of the system optics card to which the add filter 2800 is attached along subtending inputs 2822. Each subtending input 2822 inputs a different wavelength from a different add input port. The type-2 light combiner 2820 combines these wavelengths into a multiple-wavelength output signal that is output on output line 2824 to input port 1 of the type-4 light combiner 2810. Optical signals from 1 express input ports of the system optics card to which the filter 2800 is attached are input over l lines 2826 to l input ports of the type-4 light combiner 2810. Signals from each express input port are transmitted over separate input lines to the input ports of type-4 light combiner 2810. The type-4 light combiner 2810 can combine these optical signals input on its input ports into an output signal output therefrom on an output 2828.

More specifically, the components of the filter 2800 can be configured to 1) receive at input port 1 of the type-4 light combiner 2810 a first multiple-wavelength optical signal generated by the type-2 light combiner 2820 combining optical signals of different wavelengths added to the filter 2800 via colored add input ports of the system optics card to which the filter 2800 is attached, and receive with the type-4 light combiner 2810 a second multiple-wavelength optical signal from one of the express input ports over one of the lines 2826 (the first and second multiple-wavelength optical signals may contain one or more wavelengths in common); 2) separate the first and second multiple-wavelength optical signals into a first plurality of single-wavelength optical signals originating from the first multiple-wavelength signal and a second plurality of single-wavelength optical signals originating from the second multiple-wavelength optical signal with the type-4 light combiner 2810; 3) for single-wavelength optical signals in the first and second plurality of single-wavelength optical signals having the same wavelength, select only one single-wavelength optical signal from one of the first and second plurality of single-wavelength optical signals for outputting with the type-4 light combiner 2810; 4) attenuate each selected single-wavelength optical signal with the type-4 light combiner 2810; and 5) combine the attenuated, selected single-wavelength optical signals into a single primary output optical signal to be output on the output 2828. It is also within the scope of the invention, in an example embodiment, for the type-3 filter 2800 to include components in addition to the components shown in FIG. 28A. It is further within the scope of the invention, in an example embodiment, for the type-2 light combiner 2820, and the type-4 light combiner 2810 to be replaced by any other suitable component (or components) that performs (or perform) the functions thereof.

Figure 28B:
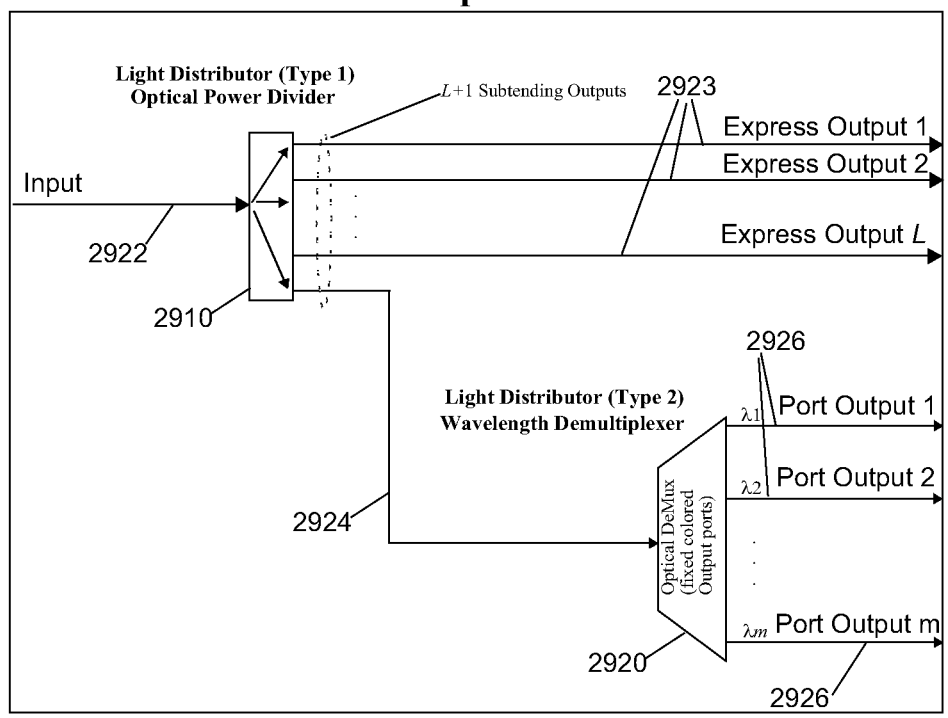
FIG. 28B is a schematic block diagram of another example of a drop filter.

FIG. 28B shows another example embodiment of a drop filter that can be used as the drop filter 480, 580, 1450, 1550, 1650, 1750, and/or 1850 in FIGS. 5, 6, and 15-19, respectively, or as the drop filter in any other system optical card disclosed herein, such as the drop filters in the cards shown in FIGS. 7A, 7B, and 8. The drop filter 2900 shown in FIG. 28B is denoted as a type-3 drop filter and can comprise a combination of a type-1 light distributor 2910 and a type-2 light distributor 2920. The type-1 light distributor 2910 can be the same as or different from the type-1 light combiner 2224 shown in FIG. 22A and the type-2 light distributor 2920 can be the same as or different from the type-2 light distributor 2452 shown in FIG. 24A. The type-1 light combiner 2910 can be configured to receive an optical signal from the line input port of the system optics card to which the add filter 2900 is attached along subtending input 2922. The type-1 light combiner 2910 can be configured to distribute the input optical signal along a plurality of subtending outputs 2923 that are each connected to an express output port of the system optics card to which the drop filter 2900 is attached. In addition, the type-1 light distributor 2910 can be configured to also distribute the input optical signal along a subtending output 2924 that is input into the type-2 light distributor 2920. Assuming that the optical signal output along subtending output 2924 is a multiple-wavelength signal, the type-2 light distributor 2920 can be configured to demultiplex that multiple-wavelength signal into a plurality of single-wavelength optical signals output along subtending outputs 2926. Each single-wavelength optical signals can then be delivered to a different colored output port of the system optics card to which the filter 2900 is attached.

As a result, the components of the filter 2900 can be configured to 1) divide the optical power of a multiple-wavelength input optical signal received from an input port of the system optics card to which the filter 2900 is attached between a plurality of optical-power-divided, output optical signals of multiple wavelengths, output from a plurality of subtending outputs 2923 and 2924 with the type-1 light distributor 2910; 2) separate one of the plurality of optical-power-divided output optical signals into a plurality of dropped optical signals each of a single-wavelength output from a plurality of colored drop ports of the system optics card to which the filter 2900 is attached with the type-2 light distributor 2920; and 3) output the optical-power-divided, output optical signals of multiple wavelengths that are output from the type-I light distributor 2910 from a plurality of express output ports of the system optics card to which the filter 2900 is attached. It is also within the scope of the invention, in an example embodiment, for the filter 2900 to include components in addition to the components shown in FIG. 28B. It is further within the scope of the invention, in an example embodiment, for the type-1 light distributor 2910, and the type-2 light distributor 2920 to be replaced by any other suitable component (or components) that performs (or perform) the functions thereof.

In the foregoing description, the invention is described with reference to specific example embodiments thereof. It will, however, be evident that various modifications and changes may be made thereto without departing from the broader spirit and scope of the present invention. For example, embodiments of the present invention may be provided as a computer program product, or software, that may include a machine-readable medium having stored thereon instructions. Further, a machine-readable medium may be used to program a computer system or other electronic device and the readable medium may include, but is not limited to, floppy diskettes, optical disks, CD-ROMs, magneto-optical disks, ROMs, RAMs, EPROMs, EEPROMs, magnetic or optical cards, flash memory, or other type of media/machine-readable medium suitable for storing electronic instructions. The specification and drawings are accordingly to be regarded in an illustrative rather than in a restrictive sense.

What is claimed is:

1. A system optics card comprising:
    a substrate;
    an electrical backplane connector supported by the substrate and connectable to a card-holding chassis;
    a drop filter supported by the substrate and configured to demultiplex a plurality of network channels from a network, and thereafter to identify at least one of the network channels destined for a client device communicating with an optical converter card and to direct the identified channel to a drop output port connected to the optical converter card and to direct the network channels destined for another system optics card to an express output port;
    an add filter supported by the substrate and having a first light combiner configured to combine channels from add input ports, at least one of which is connected to the optical converter card, and transmit the combined channels to a second light combiner configured to combine the combined client channels with channels from an express input port and transmit all the combined channels to the network;
    a mechanical front panel supported by the substrate and having at least one of the express input and output ports; and
    a power supply supported by the substrate.

2. A system optics card according to claim 1, the drop filter comprising a first light distributor configured to separate the network channel received from the network and destined for the client device from a multiplexed signal including the network channel received from the network and to transmit the separated network channel to the optical converter card for delivery to the client device via the drop output port.

3. A system optics card according to claim 2, the first light distributor also being configured to separate the multiplexed signal into a plurality of network channels, to change the intensity of at least one of the separated network channels, and to assign the separated network channel received from the network and destined for the client device to the drop output port.

4. A system optics card according to claim 2, the drop filter further comprising a second light distributor configured to divide the optical power of a signal received from the network containing the network channel destined for the client device between a plurality of optical-power-divided signals each containing the network channel destined for the client device, and to deliver one of the optical-power-divided signals containing the network channel destined for the client device to the first light distributor, which transmits the one of the optical-power-divided signals containing the network channel destined for the client device to the optical converter card for delivery to the client device via the drop output port.

5. A system optics card according to claim 3, the system optics card further comprising a plurality of output ports, one of which is the drop output port and another of which is the express output port, the first light distributor being configured to assign each of the separated network channels of the multiplexed signal to one of the output ports, and each of the network channels being assignable by the light distributor to any of the output ports.

6. A system optics card comprising:
a substrate;
an electrical backplane connector supported by the substrate and connectable to a card-holding chassis;
a drop filter supported by the substrate and having
a light distributor configured to (a) receive a multiplexed signal, including a network channel identified as destined for a client device and received from a network via an optical transport link and (b) demultiplex the multiplexed signal into a plurality of different network channels,
a plurality of variable optical attenuators, each configured to attenuate a different network channel demultiplexed by the light distributor,
a plurality of light combiners at least one of which is connected to an optical converter card configured to communicate with the client device and receives the identified network channel, and
a plurality of optical switches, each configured to receive at least one corresponding attenuated, different network channel and to assign that channel to at least one corresponding light combiner;
an add filter supported by the substrate and having a first light combiner configured to combine channels from add input ports, at least one of which is connected to the optical converter card, and to transmit the combined channels to a second light combiner configured to combine the combined client channels with channels from an express input port and to transmit all the combined channels to the network;
a mechanical front panel supported by the substrate and having the express input port; and
a power supply supported by the substrate.

7. A system optics card configured to transport information over a first optical transport link to a network, the system optics card comprising:
a substrate;
an electrical backplane connector supported by the substrate and connectable to a card-holding chassis;
at least one express input port supported by the substrate and configured to receive channels from a plurality of other system optics cards;
add input ports supported by the substrate, at least one of the add input ports being connected to an optical converter card configured to communicate with a client device;
an add filter supported by the substrate and configured to receive client channels from the client device via the optical converter card and including a first light combiner configured to combine client channels from the add input ports and transmit the combined client channels to a second light combiner configured to combine the combined client channels with channels received from the express input port and transmit all the combined channels to the network over the first optical transport link;
a mechanical front panel supported by the substrate and having at least the express input port; and
a power supply supported by the substrate.

8. A system optics card according to claim 7, the second light combiner also being configured to combine the optical power of a) the combined client channels received from the first light combiner and b) the channels received from the express input port.

9. A system optics card according to claim 7, the second light combiner also being configured to prevent the transmission of client channels of the same wavelength from different add input ports.

10. A system optics card according to claim 7, further comprising at least one express output port configured to provide channels to a plurality of other system optics cards,
the system optics card being configured to receive information over a second optical transport link from the network, to identify at least one network channel on the second optical transport link destined for the client device and to deliver the identified network channel to the optical converter card for delivery to the client device.

11. A system optics card comprising:
a substrate;
an electrical backplane connector supported by the substrate and connectable to a card-holding chassis;
a drop filter supported by the substrate and configured to demultiplex network channels from a network, identify at least one of the network channels destined for a client device communicating with an optical converter card and to direct the identified channel to a drop output port connected to the optical converter card, and direct network channels destined for another system optics card to an express output port;
an add filter supported by the substrate and having a first light combiner, configured to deliver client channels of any wavelength from each add input port of the system optics card, one of which is connected to the optical converter card, to the network via a first optical transport link and to prevent the transmission of client channels of the same wavelength from different add input ports, and a second light combiner configured to receive the client channels from the add input ports, to combine the received client channels into a combined client-channel signal, and to transmit the combined client-channel signal to the first light combiner;
a mechanical front panel supported by the substrate and having the express output port; and
a power supply supported by the substrate.

12. A system optics card according to claim 11, the first light combiner also being configured to receive channels from another system optics card via an express input port, and when optical signals of the same wavelength are inputted from multiple input ports, the first light combiner is configured to select only one optical signal of the same wavelength from the multiple input ports for delivery to the first optical transport link and to prevent the transmission of optical signals of the same wavelength from the multiple input ports to the first optical transport link.

13. A system optics card connectable to a network and an optical converter card configured to communicate with a client device, the system optics card comprising:
- a substrate;
- an electrical backplane connector supported by the substrate and connectable to a chassis for housing the system optics card, other system optics cards, and/or other optics cards;
- a drop filter supported by the substrate and configured to demultiplex network channels from the network, identify at least one of the network channels and to direct the identified channel to a drop output port connected to the optical converter card, and direct other network channels to an express output port;
- an add filter supported by the substrate and configured to combine channels from add input ports, at least one of which is connected to the optical converter card, combine the combined client channels with channels received from an express input port, and transmit all of the combined channels to the network;
- a mechanical front panel supported by the substrate and having at least one of the express input and output ports; and
- a power supply supported by the substrate.

14. A system optics card according to claim 13, the chassis for housing the system optics card, and other system optics cards, and/or other optics cards also housing the optical converter card.

15. A system optics card according to claim 13, the system optics card being configured to slide into the chassis to provide an electrical and mechanical connection to the chassis.

16. A system optics card according to claim 13, substrate comprising a circuit board supporting the power supply.

17. A system optics card according to claim 13, further comprising a main circuit body, and a substrate supporting the main circuit body and the power supply.

18. A system optics card according to claim 17, further comprising a single power supply.

19. A system optics card comprising:
- a substrate;
- an electrical backplane connector supported by the substrate and connectable to a chassis for housing the system optics card, other system optics cards, and/or other optics cards;
- a mechanical front panel supported by the substrate and having at least one express output port configured to provide channels to a plurality of other system optics cards, at least one express input port configured to receive channels from a plurality of other system optics cards, a drop output port connected to an optical converter card configured to communicate with a client device, add input ports, at least one of which is connected to the optical converter card, and at least one port through which one or more channels are added from an expansion optical card, dropped to the expansion optical drop card, output to a network, input from the network, input from a dispersion module, output to the dispersion module, or output to a test port;
- a drop filter supported by the substrate and configured to demultiplex network channels from the network, identify at least one of the network channels and to direct the identified channel to the drop output port, and direct other network channels to the express output port;
- an add filter supported by the substrate and configured to combine channels from the add input ports, combine the combined client channels with channels from the express input port, and transmit all of the combined channels to the network; and
- a power supply supported by the substrate.

20. A system optics card according to claim 19, the at least one port of the mechanical front panel also comprising at least one of a line input port configured to receive an optical signal from an optical node different from the optical node to which the apparatus belongs, a line output port configured to output an optical signal to an optical node different from the optical node to which the apparatus belongs, a dispersion-compensation-module input port configured to receive an optical signal from a chromatic dispersion compensator, a dispersion-compensation-module output port configured to output an optical signal to the chromatic dispersion compensator, an expansion input port configured to receive an optical signal from an expansion optical card providing at least an additional add input port to the apparatus, an expansion output port configured to output an optical signal to the expansion optical card providing an additional drop output port to the apparatus, a first test output port configured to output an optical signal containing wavelengths arriving at the line input port of the system optics card to a test device, and a second test output port configured to output from an output amplifier of the system optics card or from a coupler connected to a line output port of the system optics card an optical signal that is delivered to the test device.

21. A system optics card according to claim 20, the system optics card being configured to transport information over a first optical transport link connected to the network, the system optics card being configured to receive information over a second optical transport link connected to the network, the system optics card being configured to identify at least one network channel on the second optical transport link destined for the client device, the system optics card being configured to provide the identified network channel to the optical converter card for delivery to the client device, the system optics card being configured to receive client channels from the optical converter card generated by the client device, and the system optics card being configured to transport the client channels of the client device over the first optical transport link.

22. A system optics card comprising:
- a drop filter configured to demultiplex a plurality of network channels from a network, to direct at least one of the network channels destined for a client device configured to communicate with an optical converter card to a drop output port connected to the optical converter card, and to direct network channels destined for another system optics card to an express output port, the drop filter including
  - a demultiplexer configured to receive the plurality of network channels and to demultiplex the received network channels into a plurality of single network channels,
  - at least two multiplexers, one connected to the drop output port and one connected to the express output port, and
  - at least two optical switches, each configured to receive one of the single network channels output by the demultiplexer and to assign and direct each received single network channel to one of the multiplexers.

23. A system optics card comprising:
- a substrate;
- an electrical backplane connector supported by the substrate and connectable to a card-holding chassis;
- a drop filter supported by the substrate and configured to demultiplex network channels from a network, identify at least one of the network channels and to direct the identified channel to a drop output port connected to an optical converter card configured to communicate with a client device, and direct other network channels to an express output port connectable to another system optics card;

an add filter supported by the substrate and configured to combine channels from add input ports, at least one of which is connected to the optical converter card, combine the combined client channels with channels from an express input port, and transmit all of the combined channels to the network;

a power supply supported by the substrate;

at least one expansion output port supported by the substrate and connectable to at least one expansion circuit pack comprising a plurality of drop ports; and a mechanical front panel supported by the substrate and having at least one of the express input and output ports, the drop filter also being configured to drop one or more network channels received from the network to the drop ports of the expansion circuit pack via the expansion output port.

24. A system optics card comprising:

a substrate;

an electrical backplane connector supported by the substrate and connectable to a card-holding chassis;

a drop filter supported by the substrate and configured to demultiplex network channels from a network, identify at least one of the network channels and to direct the identified channel to a drop output port connected to an optical converter card configured to communicate with a client device, and direct other network channels to an express output port connectable to another system optics card;

an add filter supported by the substrate and configured to combine channels from add input ports, at least one of which is connected to the optical converter card, combine the combined client channels with channels received from an express input port, and transmit all of the combined channels to the network;

a power supply supported by the substrate;

dispersion compensation input and output ports supported by the substrate and connectable to a dispersion compensator that receives one or more network channels from a line input port via the dispersion compensation output port, processes the one or more network channels from the line input port to compensate for the chromatic dispersion thereof, and transmits the chromatic-dispersion-compensated network channels through the dispersion compensation input port to the drop filter; and a mechanical front panel supported by the substrate and having at least one of the express output and input ports, the chromatic-dispersion-compensated network channel destined for the client device being transmitted from the drop filter to the drop output port connected to the optical converter card.

25. A system optics card comprising:

a substrate;

an electrical backplane connector supported by the substrate and connectable to a card-holding chassis;

a drop filter supported by the substrate and configured to demultiplex network channels from a network, identify at least one of the network channels and to direct the identified channel to a drop output port connected to an optical converter card configured to communicate with a client device, and direct other network channels to an express output port connectable to another system optics card;

at least one expansion input port supported by the substrate and connectable to at least one expansion circuit pack comprising a plurality of add ports;

an add filter supported by the substrate and connected to the expansion input port, the add filter being configured to combine one or more channels received from add ports of the system optics card, at least one of which is connected to the optical converter card, and one or more channels received from the add ports of the expansion circuit pack via the expansion input port, and to transmit the combined channels to the network via a line output port;

a mechanical front panel supported by the substrate and having the express output port; and a power supply supported by the substrate.

26. A system optics card comprising:

a drop filter including
at least one express output port configured to provide channels to a plurality of other system optics cards,
at least one express input port configured to receive channels from a plurality of other system optics cards,
a light distributor configured to (i) receive a multiplexed signal, including a network channel identified as destined for a client device configured to provide information to and receive information from an optical converter card, and received from a network via a first optical transport link and (ii) demultiplex the multiplexed signal into a plurality of different network channels,
a plurality of variable optical attenuators, each configured to attenuate a different network channel demultiplexed by the light distributor,
a plurality of light combiners at least one of which is connected to the optical converter card, and
a plurality of optical switches, each configured to receive at least one corresponding attenuated, different network channel and to assign that channel to at least one corresponding light combiner, the system optics card being configured to transport information over a second optical transport link, and to identify at least one network channel on the first optical transport link destined for the client device, the drop filter being configured to deliver the identified network channel to the optical converter card for delivery to the client device, and the system optics card being configured to receive client channels from the optical converter card generated by the client device, and to transport the client channels of the client device over the second optical transport link.

27. A system optics card comprising:

at least one express output port configured to provide channels to a plurality of other system optics cards;

a plurality of input ports including at least one express input port configured to receive channels from a plurality of other system optics cards, and at least two add input ports, at least one of which is connected to an optical converter card configured to provide information to and receive information from a client device; and an add filter having a first light combiner, configured to deliver client channels of any wavelength from each add input port to a network via a first optical transport link and to prevent the transmission of client channels of the same wavelength from different add input ports to the network, and a second light combiner configured to receive the client channels from the add input ports, to combine the received client channels into a combined client-channel signal, and to transmit the combined client-channel signal to the first light combiner, the system optics card being configured to transport information over the first optical transport link to the network, to receive information over a second optical transport link, to identify at least one network channel on the second optical transport link destined for the client device, and to provide the identified network channel to the optical converter card for delivery to the client device, the add filter being configured to receive client channels from the optical converter card generated by the client device, and the system optics card also being configured to transport the client channels of the client device received by the add filter over the first optical transport link.

28. A system optics card configured to receive information over a first optical transport link from a network and to identify at least one network channel on the first optical transport link destined for a client device, the system optics card comprising:

a substrate;

an electrical backplane connector supported by the substrate and connectable to a card-holding chassis;

at least one express output port supported by the substrate and configured to provide channels to a plurality of other system optics cards;

a drop filter supported by the substrate and configured to deliver the identified network channel to an optical converter card, configured to provide information to the client device, for delivery to the client device by demultiplexing all network channels received by the drop filter from the first optical transport link from the network, and thereafter directing at least one of the network channels destined for the client device to a drop output port connected to the optical converter card and directing the network channels destined for one of the other system optics card to the express output port;

a mechanical front panel supported by the substrate and having the express output port; and a power supply supported by the substrate.

29. A system optics card according to claim 28, further comprising at least one express input port configured to receive channels from a plurality of other system optics cards, and the optical converter card, the system optics card also being configured to transport information over a second optical transport link, to receive client channels from the optical converter card generated by the client device, and to transport the client channels of the client device over the second optical transport link.

30. A system optics card, connectable to a network and an optical converter card configured to provide information to and receive information from a client device, and configured to receive information over a first optical transport link from the network and to identify at least one network channel on the first optical transport link destined for the client device, the system optics card comprising:

a substrate;

a mechanical front panel supported by the substrate and having express input and output ports configured to, respectively, receive channels from and provide channels to from a plurality of other system optics cards;

a drop filter supported by the substrate and configured to demultiplex network channels from the network and deliver the identified network channel to the optical converter card for delivery to the client device;

an electrical backplane connector supported by the substrate and connectable to a chassis for housing the system optics card, other system optics cards, and/or other optics cards; and a power supply supported by the substrate.

31. A system optics card according to claim 30, further comprising:

at least one express output port configured to provide channels to the plurality of other system optics cards; and an express input port configured to receive channels from a plurality of other system optics cards, the system optics card also being configured to transport information over a second optical transport link, to receive client channels from the optical converter card generated by the client device, and to transport the client channels over the second optical transport link.

32. A system optics card, connectable to a network and an optical converter card, configured to receive client channels from the optical converter card generated by a client device and to transport the client channels of the client device over a first optical transport link to the network, the system optics card comprising:

a substrate;

a mechanical front panel supported by the substrate and having express input and output ports configured to, respectively, receive channels from and provide channels to a plurality of other system optics cards;

an add filter supported by the substrate and configured to combine channels from add input ports, at least one of which is connected to the optical converter card, combine the combined client channels with channels from the express input port, and transmit all of the combined channels to the network over the first optical transport link;

an electrical backplane connector supported by the substrate and connectable to a chassis for housing the system optics card, other system optics cards, and/or other optics cards; and a power supply supported by the substrate.

33. A system optics card according to claim 32, wherein the add filter includes a first light combiner configured to combine client channels from the add input ports and transmit the combined client channels to a second light combiner configured to combine the combined client channels with channels received from the express input port and transmit all the combined channels to the network over the first optical transport link.

34. A system optics card according to claim 33, the second light combiner also being configured to combine the optical power of a) the combined client channels received from the first light combiner and b) the channels received from the express input port.

35. A system optics card according to claim 34, the second light combiner also being configured to prevent the transmission of client channels of the same wavelength from different add input ports.

* * * * *